US008938772B2

(12) United States Patent
Shirasuka et al.

(10) Patent No.: US 8,938,772 B2
(45) Date of Patent: Jan. 20, 2015

(54) DIGITAL BROADCAST RECEPTION DEVICE AND DIGITAL BROADCAST RECEPTION METHOD

(75) Inventors: Keiichi Shirasuka, Tokyo (JP); Daiki Matsuura, Tokyo (JP); Soichiro Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/388,652

(22) PCT Filed: Apr. 1, 2010

(86) PCT No.: PCT/JP2010/002406
§ 371 (c)(1),
(2), (4) Date: Feb. 2, 2012

(87) PCT Pub. No.: WO2011/030475
PCT Pub. Date: Mar. 17, 2011

(65) Prior Publication Data
US 2012/0133840 A1 May 31, 2012

(30) Foreign Application Priority Data

Sep. 11, 2009 (JP) ................................. 2009-210448

(51) Int. Cl.
H04N 7/16 (2011.01)
H04N 21/44 (2011.01)
H04B 7/08 (2006.01)
H04B 7/12 (2006.01)
(Continued)

(52) U.S. Cl.
CPC ........... H04N 21/44016 (2013.01); H04B 7/08 (2013.01); H04B 7/12 (2013.01); H04N 21/4383 (2013.01); H04N 21/44209 (2013.01); H04N 21/4263 (2013.01); H04N 21/4524 (2013.01)
USPC ...................... 725/139; 455/414.1; 455/414.2

(58) Field of Classification Search
CPC ........................................................ H04W 4/02
See application file for complete search history.

(56) References Cited

U.S. PATENT DOCUMENTS 8,294,830 B2 * 10/2012 Furutani ....................... 348/732
8,719,147 B1 * 5/2014 Broyles et al. .................. 705/37
(Continued)

FOREIGN PATENT DOCUMENTS

DE 10 2005 041 049 A1 4/2006
EP 1 608 149 A2 12/2005
(Continued)

Primary Examiner — Jefferey Harold
Assistant Examiner — Samira Monshi
(74) Attorney, Agent, or Firm — Birch, Stewart, Kolasch & Birch, LLP

(57) ABSTRACT

Disclosed is a digital broadcast reception device that includes a plurality of tuner/demodulator units; a tuning control unit; a current position detection unit for detecting a current position; a channel scan control unit that has one of the plurality of tuner/demodulator units perform tuning for program viewing or listening, and has another one of the plurality of tuner/demodulator units perform a channel scan by tuning to the physical channels sequentially and detecting receivable physical channels; a broadcast area map generation unit for generating broadcast area maps including the receivable physical channels when the channel scan is executed, broadcast service information regarding broadcast content of the physical channels, and receivable position information; and a broadcast area map storage unit for storing the generated broadcast area maps.

23 Claims, 32 Drawing Sheets

(51) Int. Cl.
*H04N 21/438* (2011.01)
*H04N 21/442* (2011.01)
*H04N 21/426* (2011.01)
*H04N 21/45* (2011.01)

(56) References Cited

U.S. PATENT DOCUMENTS

| | | | |
|---|---|---|---|
| 2006/0225109 A1* | 10/2006 | Seo | 725/100 |
| 2007/0015546 A1 | 1/2007 | Ito | |
| 2008/0134280 A1 | 6/2008 | Kim | |
| 2009/0262253 A1* | 10/2009 | Ieda | 348/732 |
| 2010/0220818 A1* | 9/2010 | Yamamoto et al. | 375/340 |
| 2012/0208558 A1* | 8/2012 | Bajko et al. | 455/456.1 |

FOREIGN PATENT DOCUMENTS

| | | |
|---|---|---|
| EP | 1 928 168 A1 | 6/2008 |
| JP | 11-053445 | 2/1999 |
| JP | 2001-230689 A | 8/2001 |
| JP | 2003-158690 | 5/2003 |
| JP | 2005-217681 A | 8/2005 |
| JP | 2005-236453 A | 9/2005 |
| JP | 2005-274344 | 10/2005 |
| JP | 2006-186701 A | 7/2006 |
| JP | 2006-262126 | 9/2006 |
| JP | 2006-279742 A | 10/2006 |
| JP | 2007-251791 A | 9/2007 |
| JP | 2007-312052 A | 11/2007 |
| JP | 2008-42743 A | 2/2008 |
| JP | 2008-78875 A | 4/2008 |
| JP | 2009-81558 A | 4/2009 |
| JP | 2009-105882 A | 5/2009 |
| JP | 2009-118516 A | 5/2009 |
| JP | 2009-124639 A | 6/2009 |
| JP | 2009-171168 A | 7/2009 |
| JP | 2009-188492 A | 8/2009 |
| WO | WO 2007/135942 A1 | 11/2007 |
| WO | WO 2009/028025 A1 | 3/2009 |
| WO | WO 2009/064468 A1 | 5/2009 |

* cited by examiner

| GENERATED AREA NAME | DATE OF UPDATE | VERTEX COORDINATES OF BROADCAST AREA MAP GENERATED AREA | | | |
|---|---|---|---|---|---|
| A | 2009/6/25 | $(X_{a0}, Y_{a0})$ | $(X_{a1}, Y_{a1})$ | ...... | $(X_{am}, Y_{am})$ |
| B | 2009/6/26 | $(X_{b0}, Y_{b0})$ | $(X_{b1}, Y_{b1})$ | ...... | $(X_{bm}, Y_{bm})$ |
| ... | ... | ... | ... | ...... | ... |
| ... | ... | ... | ... | ...... | ... |

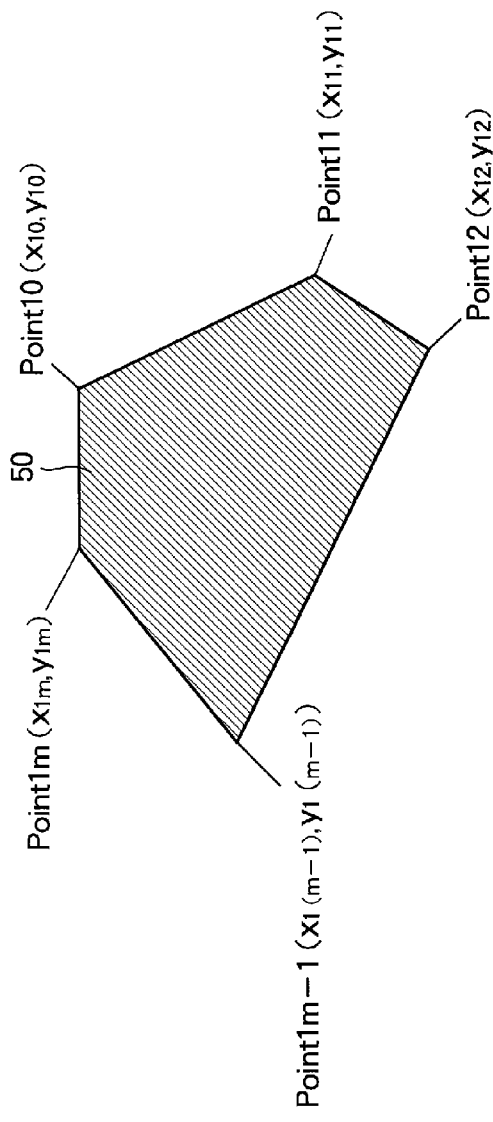

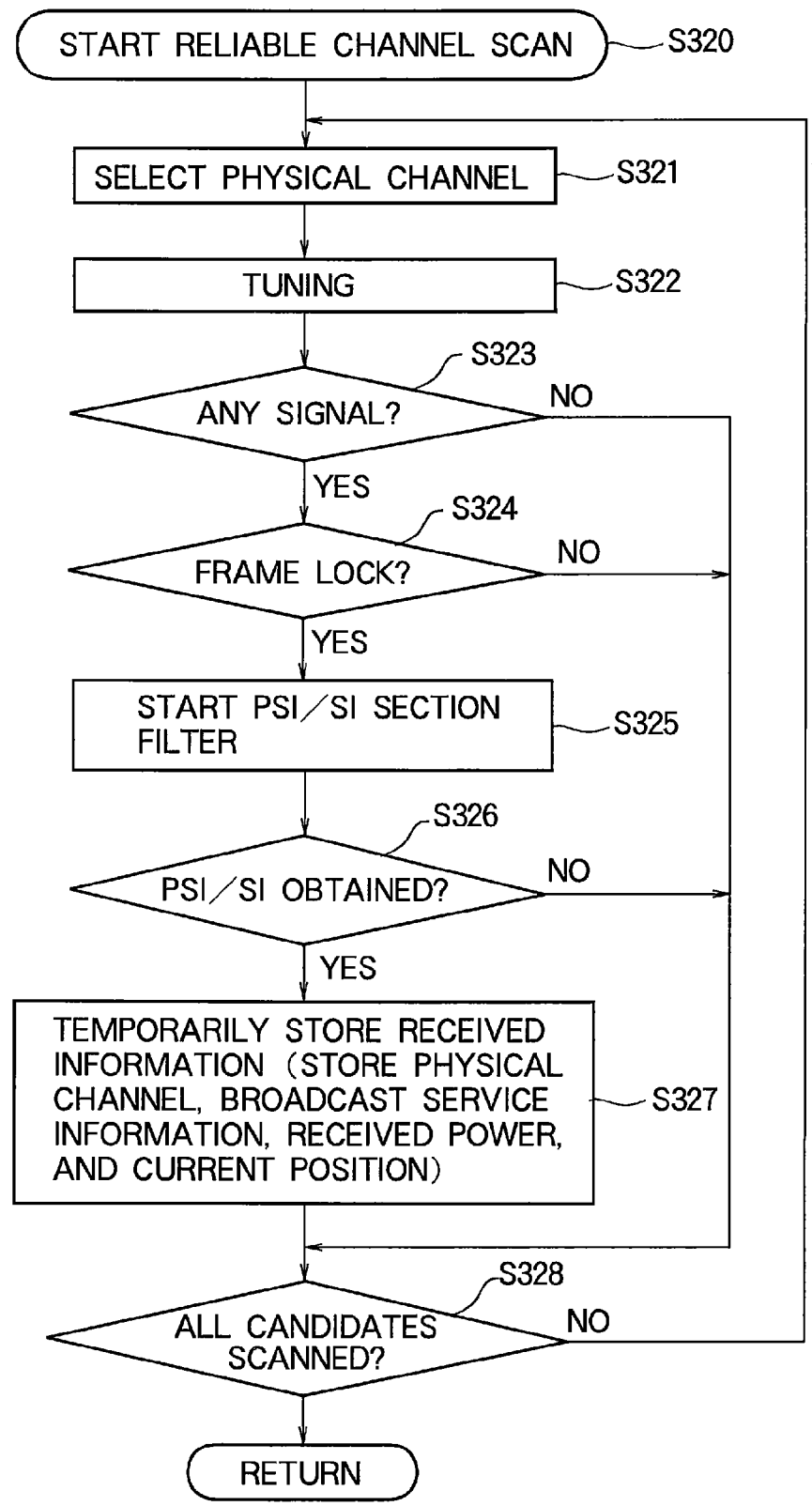

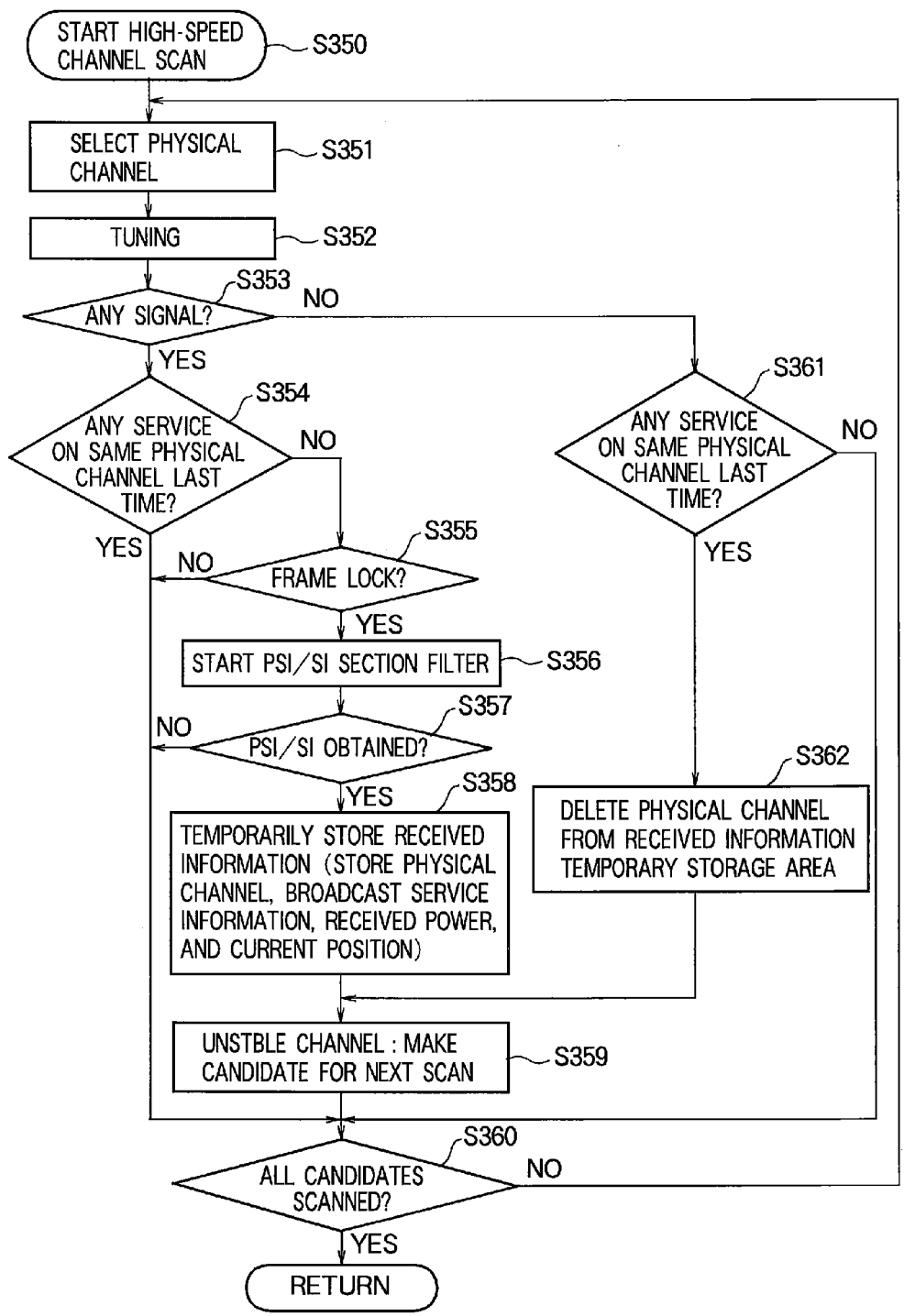

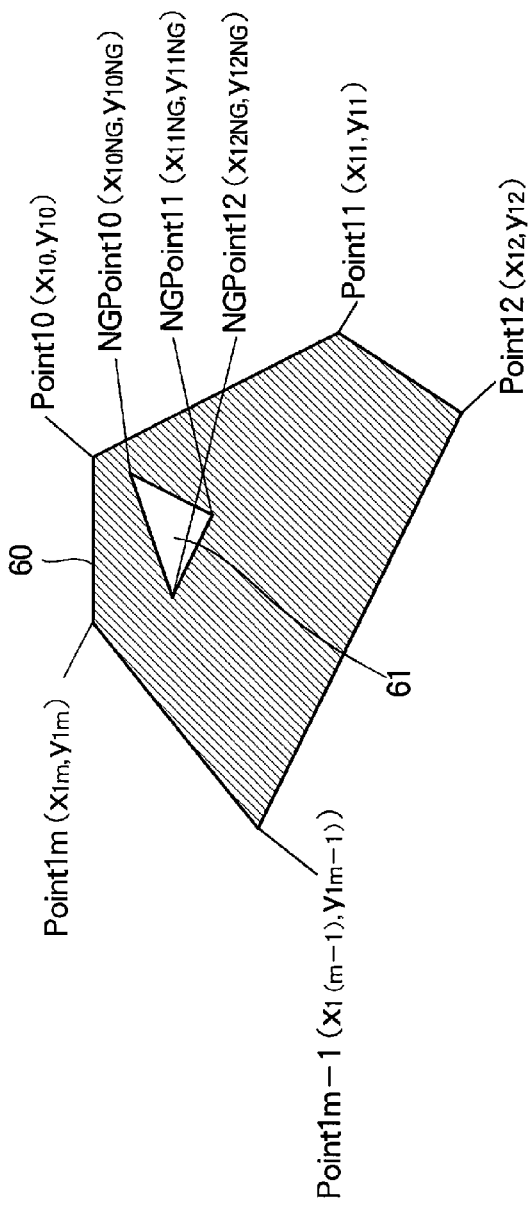

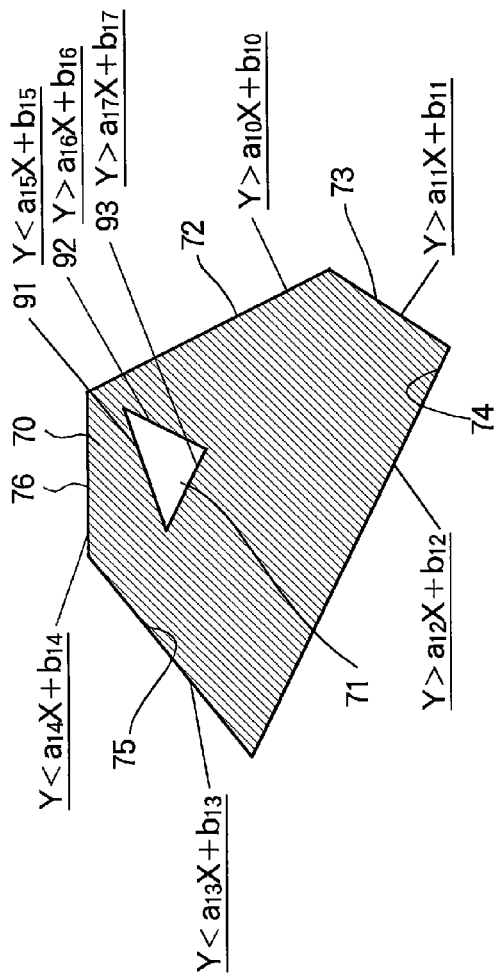

FIG.16

| AREA NUMBER | DATE OF UPDATE | VERTEX COORDINATES | | | PARAMETERS OF LINEAR EXPRESSION | | |
|---|---|---|---|---|---|---|---|
| 1 | 2009/6/25 09:14:32 | $(x_{1,1,1}, y_{1,1,1})$ | ... | $(x_{1,1,n1}, y_{1,1,n1})$ | $a_{1,1,1}, b_{1,1,1}, c_{1,1,1}, d_{1,1,1}$ | ... | $a_{1,1,n1}, b_{1,1,n1}, c_{1,1,n1}, d_{1,1,n1}$ |
| 2 | 2009/6/26 17:05:43 | $(x_{1,2,1}, y_{1,2,1})$ | ... | $(x_{1,2,n2}, y_{1,2,n2})$ | $a_{1,2,1}, b_{1,2,1}, c_{1,2,1}, d_{1,2,1}$ | ... | $a_{1,2,n2}, b_{1,2,n2}, c_{1,2,n2}, d_{1,2,n2}$ |
| ... | ... | ... | ... | ... | ... | ... | ... |

FIG.17

| AREA NUMBER | PHYSICAL CH | TS NAME /ENSEMBLE NAME | BROADCAST SERVICE NAME | VERTEX COORDINATES | | | | PARAMETERS OF LINEAR EXPRESSION | | | |
|---|---|---|---|---|---|---|---|---|---|---|---|
| 1 | 13ch | ○○○○ | △△△ | $(x_{2,1,1}, y_{2,1,1})$ | $(x_{2,1,1}, y_{2,1,1})$ | ... | $(x_{2,1,n1}, y_{2,1,n1})$ | $a_{2,1,1}, b_{2,1,1}, c_{2,1,1}, d_{2,1,1}$ | ... | $a_{2,1,n1}, b_{2,1,n1}, c_{2,1,n1}, d_{2,1,n1}$ |
| 2 | 14ch | □□□□ | ×××  | $(x_{2,2,1}, y_{2,2,1})$ | | ... | $(x_{2,2,n2}, y_{2,2,n2})$ | $a_{2,2,1}, b_{2,2,1}, c_{2,2,1}, d_{2,2,1}$ | ... | $a_{2,2,n2}, b_{2,2,n2}, c_{2,2,n2}, d_{2,2,n2}$ |
| 3 | 18ch | ◇◇◇◇ | ▽▽▽ | $(x_{2,3,1}, y_{2,3,1})$ | | ... | $(x_{2,3,n3}, y_{2,3,n3})$ | $a_{2,3,1}, b_{2,3,1}, c_{2,3,1}, d_{2,3,1}$ | ... | $a_{2,3,n3}, b_{2,3,n3}, c_{2,3,n3}, d_{2,3,n3}$ |
| ... | | | | | | ... | | ... | ... | ... |

FIG.18

| AREA NUMBER | RELEVANT RECEIVABLE AREA NUMBER | VERTEX COORDINATES | | | | PARAMETERS OF LINEAR EXPRESSION | | | |
|---|---|---|---|---|---|---|---|---|---|
| 1 | 1 | $(x_{3,1,1}, y_{3,1,1})$ | $(x_{3,2,1}, y_{3,2,1})$ | $(x_{3,3,1}, y_{3,3,1})$ | ... | $(x_{3,1,n1}, y_{3,1,n1})$ | ... | $a_{3,1,1}, b_{3,1,1}, c_{3,1,1}, d_{3,1,1}$ | ... | $a_{3,1,n1}, b_{3,1,n1}, c_{3,1,n1}, d_{3,1,n1}$ |
| 2 | 3 | | | | | $(x_{3,2,n2}, y_{3,2,n2})$ | | $a_{3,2,1}, b_{3,2,1}, c_{3,2,1}, d_{3,2,1}$ | | $a_{3,2,n2}, b_{3,2,n2}, c_{3,2,n2}, d_{3,2,n2}$ |
| 3 | 1 | | | | | $(x_{3,3,n3}, y_{3,3,n3})$ | | $a_{3,3,1}, b_{3,3,1}, c_{3,3,1}, d_{3,3,1}$ | | $a_{3,3,n3}, b_{3,3,n3}, c_{3,3,n3}, d_{3,3,n3}$ |
| ... | | | | | | ... | | | ... |

Note: the table as drawn has columns: AREA NUMBER | RELEVANT RECEIVABLE AREA NUMBER | VERTEX COORDINATES (multiple sub-columns) | PARAMETERS OF LINEAR EXPRESSION (multiple sub-columns). Row 1 lists vertex coordinates $(x_{3,1,1}, y_{3,1,1}), \ldots, (x_{3,1,n1}, y_{3,1,n1})$ and parameters $a_{3,1,1}, b_{3,1,1}, c_{3,1,1}, d_{3,1,1}, \ldots, a_{3,1,n1}, b_{3,1,n1}, c_{3,1,n1}, d_{3,1,n1}$. Row 2 lists $(x_{3,2,1}, y_{3,2,1}), \ldots, (x_{3,2,n2}, y_{3,2,n2})$ and $a_{3,2,1}, b_{3,2,1}, c_{3,2,1}, d_{3,2,1}, \ldots, a_{3,2,n2}, b_{3,2,n2}, c_{3,2,n2}, d_{3,2,n2}$. Row 3 lists $(x_{3,3,1}, y_{3,3,1}), \ldots, (x_{3,3,n3}, y_{3,3,n3})$ and $a_{3,3,1}, b_{3,3,1}, c_{3,3,1}, d_{3,3,1}, \ldots, a_{3,3,n3}, b_{3,3,n3}, c_{3,3,n3}, d_{3,3,n3}$.

FIG.29

| AREA NUMBER | DATE OF UPDATE | COORDINATES OF VERTEX | | | IN-AREA FLAG | PARAMETERS OF LINEAR EXPRESSION | | |
|---|---|---|---|---|---|---|---|---|
| 1 | 2009/6/25 09:14:32 | $(x_{1,1,1}, y_{1,1,1})$ | ... | $(x_{1,1,n1}, y_{1,1,n1})$ | OFF | $a_{1,1,1}, b_{1,1,1}, c_{1,1,1}, d_{1,1,1}$ | ... | $a_{1,1,n1}, b_{1,1,n1}, c_{1,1,n1}, d_{1,1,n1}$ |
| 2 | 2009/6/26 17:05:43 | $(x_{1,2,1}, y_{1,2,1})$ | ... | $(x_{1,2,n2}, y_{1,2,n2})$ | ON | $a_{1,2,1}, b_{1,2,1}, c_{1,2,1}, d_{1,2,1}$ | ... | $a_{1,2,n2}, b_{1,2,n2}, c_{1,2,n2}, d_{1,2,n2}$ |
| ... | ... | ... | ... | ... | ... | ... | ... | ... |

FIG.30

| AREA NUMBER | PHYSICAL CH | TS NAME /ENSEMBLE NAME | BROADCAST SERVICE NAME | COORDINATES OF VERTEX | ... | | IN-AREA FLAG | PARAMETERS OF LINEAR EXPRESSION | ... |
|---|---|---|---|---|---|---|---|---|---|
| 1 | 13ch | ○○○○ | △△△ | $(x_{2,1,1}, y_{2,1,1})$ | ... | $(x_{2,1,n1}, y_{2,1,n1})$ | OFF | $a_{2,1,1}, b_{2,1,1}, c_{2,1,1}, d_{2,1,1}$ | ... | $a_{2,1,n1}, b_{2,1,n1}, c_{2,1,n1}, d_{2,1,n1}$ |
| 2 | 14ch | □□□□ | ×√× | $(x_{2,2,1}, y_{2,2,1})$ | ... | $(x_{2,2,n2}, y_{2,2,n2})$ | ON | $a_{2,2,1}, b_{2,2,1}, c_{2,3,1}, d_{2,3,1}$ | ... | $a_{2,2,n2}, b_{2,2,n2}, c_{2,2,n2}, d_{2,2,n2}$ |
| 3 | 18ch | ◇◇◇◇ | ▽▽▽ | $(x_{2,3,1}, y_{2,3,1})$ | ... | $(x_{2,3,n3}, y_{2,3,n3})$ | OFF | $a_{2,3,1}, b_{2,3,1}, c_{2,1,1}, d_{2,1,1}$ | ... | $a_{2,3,n3}, b_{2,3,n3}, c_{2,3,n3}, d_{2,3,n3}$ |
| ... | | | | ... | | | ... | ... | |

DIGITAL BROADCAST RECEPTION DEVICE AND DIGITAL BROADCAST RECEPTION METHOD

FIELD OF THE INVENTION

The present invention relates to a digital broadcast reception device and a digital broadcast reception method suited for implementation in a mobile facility.

BACKGROUND ART

When a mobile facility in which a digital broadcast reception device is mounted moves from inside an area in which the physical channel (a channel defined in terms of a certain unit frequency bandwidth) that the digital broadcast reception device is receiving is receivable to a location outside the receivable area, viewing of or listening to the broadcast service provided by the physical channel, which was being received normally until then, becomes impossible. The user then performs a manual operation to have the digital broadcast reception device execute a channel scan and detect the receivable physical channels, from among which the user selects a physical channel providing the same broadcast service.

A digital broadcast reception device with a broadcast signal selection function that does not require this manual operation is disclosed in Patent Document 1, for example. This digital broadcast reception device has a function switching means that switches between a first function, which performs diversity reception by use of a plurality of reception means, and a second function, which performs reception for program reproduction (program viewing/listening) by one of the plurality of reception means and periodically (e.g., at fifteen-minute intervals) seeks physical channels with the other reception means to obtain information related to channel selection, thereby performing automatic channel switching (see, for example, claim 2 and the abstract of the cited Patent Document 1).

PRIOR ART REFERENCES

Patent Documents

Patent document 1: Japanese Patent Application Publication No. 2005-217681

SUMMARY OF THE INVENTION

Problem to be Solved by the Invention

The digital broadcast reception device described in Patent Document 1, however, is problematic in that since the other reception means perform physical channel seeking (referred to as channel scan) periodically at fixed time intervals, the channel scan results are out of date by, at maximum, the fixed time interval, so the accuracy of automatic channel switching using the channel scan results is low.

Although the accuracy of automatic channel switching could conceivably be improved by setting a short fixed time interval, when this approach has been taken, it has problematically shortened the periods during which diversity reception, which permits program viewing or listening based on a high-quality received signal, can be carried out.

Other problems with the digital broadcast reception device described in Patent Document 1 are that the channel scan is performed periodically even when the mobile facility in which the device is mounted is not moving, and the shorter the fixed time interval is, the lower the ratio of the number of channel scan result updates to the number of channel scan executions becomes; many channel scans are therefore carried out in vain, without improving the accuracy of automatic channel switching, resulting in inefficient operation.

The present invention addresses these problems of the above prior art, with the objective of providing a digital broadcast reception device and digital broadcast reception method that, by efficient channel scanning, can lengthen periods of program viewing or listening by diversity reception and improve the accuracy of automatic channel switching.

Means for Solving the Problem

A digital broadcast reception device according to one aspect of the present invention comprises: a plurality of tuner/demodulator units for tuning to physical channels and demodulating broadcast signals on the physical channels; a tuning control unit for controlling operation of the plurality of tuner/demodulator units; a reception mode switching unit for switching an operating mode of the plurality of tuner/demodulator units between a first operating mode in which the plurality of tuner/demodulator units cooperatively perform diversity processing and a second operating mode in which the plurality of tuner/modulator units operate independently; a current position detection unit for detecting a current position; a channel scan control unit that has the reception mode switching unit switch the operating mode of the plurality of tuner/demodulator units to the second operating mode, has one of the plurality of tuner/demodulator units perform tuning for program viewing or listening, and has another one of the plurality of tuner/demodulator units perform a channel scan by tuning to the physical channels sequentially and detecting receivable physical channels; a broadcast area map generation unit for generating broadcast area maps including the receivable physical channels when the channel scan is executed, broadcast service information regarding broadcast content of the physical channels, and receivable position information; and a broadcast area map storage unit for storing the generated broadcast area maps. The broadcast area map generation unit generates broadcast area map generated area information indicating areas in which broadcasting station detection processing has been executed by the channel scan and stores the broadcast area map generated area information in the broadcast area map storage unit. The digital broadcast reception device further comprises a broadcast area map non-generated area decision unit for deciding, by reference to the broadcast area map generated area information stored in the broadcast area map storage unit, whether or not the current position is located in a broadcast area map non-generated area for which no area map has been generated. When the broadcast area map non-generated area decision unit decides that the current position is in the broadcast area map non-generated area, the reception mode switching unit switches the operating mode of the plurality of tuner/demodulator units to the second operating mode and the broadcast area map generation unit generates a broadcast area map and updates the broadcast area maps stored in the broadcast area map storage unit. When the broadcast area map non-generated area decision unit decides that the current position is in a broadcast area map generated area, the reception mode switching unit switches the operating mode of the plurality of tuner/demodulator units to the first operating mode.

A digital broadcast reception device according to another aspect of the invention comprises: a plurality of tuner/demodulator units for tuning to physical channels and demodulating broadcast signals on the physical channels; a tuning control unit for controlling operation of the plurality of tuner/demodulator units; a reception mode switching unit for switching an operating mode of the plurality of tuner/demodulator units between a first operating mode in which the plurality of tuner/demodulator units cooperatively perform diversity processing and a second operating mode in which the plurality of tuner/modulator units operate independently; a current position detection unit for detecting a current position; a channel scan control unit that has the reception mode switching unit switch the operating mode of the plurality of tuner/demodulator units to the second operating mode, has one of the plurality of tuner/demodulator units perform tuning for program viewing or listening, and has another one of the plurality of tuner/demodulator units perform a channel scan by tuning to the physical channels sequentially and detecting receivable physical channels; a broadcast area map generation unit for generating broadcast area maps including the receivable physical channels when the channel scan is executed, broadcast service information regarding broadcast content of the physical channels, and current position information; a broadcast area map storage unit for storing the generated broadcast area maps; and a broadcast service list generation unit for generating a broadcast service list including broadcast service information of currently receivable physical channels from the broadcast area maps stored in the broadcast area map storage unit and the current position detected by the current position detection unit. The broadcast area map generation unit records vertices of polygons indicating receivable areas by their coordinates in an orthogonal coordinate system in the broadcast area map storage unit.

A digital broadcast reception device according to another aspect of the invention comprises: a plurality of tuner/demodulator units for tuning to physical channels and demodulating broadcast signals on the physical channels; a tuning control unit for controlling operation of the plurality of tuner/demodulator units; a reception mode switching unit for switching an operating mode of the plurality of tuner/demodulator units between a first operating mode in which the plurality of tuner/demodulator units cooperatively perform diversity processing and a second operating mode in which the plurality of tuner/modulator units operate independently; a current position detection unit for detecting a current position; a channel scan control unit that has the reception mode switching unit switch the operating mode of the plurality of tuner/demodulator units to the second operating mode, has one of the plurality of tuner/demodulator units perform tuning for program viewing or listening, and has another one of the plurality of tuner/demodulator units perform a channel scan by tuning to the physical channels sequentially and detecting receivable physical channels; a broadcast area map generation unit for generating broadcast area maps including the receivable physical channels when the channel scan is executed, broadcast service information regarding broadcast content of the physical channels, and the current position; and a broadcast area map storage unit for storing the generated broadcast area maps. The broadcast area map generation unit records vertices of polygons indicating receivable areas by their coordinates in an orthogonal coordinate system in the broadcast area map storage unit. From the broadcast area maps stored in the broadcast area map storage unit and the current position detected by the current position detection unit, the tuning control unit switches a physical channel to which the plurality of tuner/demodulator units are tuned to another physical channel receivable at the current position.

A digital broadcast reception device according to another aspect of the invention comprises: a plurality of tuner/demodulator units for tuning to physical channels and demodulating broadcast signals on the physical channels; a tuning control unit for controlling operation of the plurality of tuner/demodulator units; a reception mode switching unit for switching an operating mode of the plurality of tuner/demodulator units between a first operating mode in which the plurality of tuner/demodulator units cooperatively perform diversity processing and a second operating mode in which the plurality of tuner/modulator units operate independently; a current position detection unit for detecting a current position; a channel scan control unit that has the reception mode switching unit switch the operating mode of the plurality of tuner/demodulator units to the second operating mode, has one of the plurality of tuner/demodulator units perform tuning for program viewing or listening, and has another one of the plurality of tuner/demodulator units perform a channel scan by tuning to the physical channels sequentially and detecting receivable physical channels; a broadcast area map generation unit for generating broadcast area maps including the receivable physical channels when the channel scan is executed, broadcast service information regarding broadcast content of the physical channels, and the current position; a broadcast area map storage unit for storing the generated broadcast area maps; and a broadcast service list generation unit for generating a broadcast service list including broadcast service information of currently receivable physical channels from the broadcast area maps stored in the broadcast area map storage unit and the current position detected by the current position detection unit. The broadcast area map generation unit stores, in the broadcast area map storage unit, slopes of linear functions defining sides of polygons indicating the receivable areas, expressed in an orthogonal coordinate system, positions at which lines represented by the linear functions intersect a coordinate axis, and information indicating whether the receivable areas are located in a positive or negative direction on the coordinate axis with respect to the lines expressed by the linear functions.

A digital broadcast reception device according to another aspect of the invention comprises: a plurality of tuner/demodulator units for tuning to physical channels and demodulating broadcast signals on the physical channels; a tuning control unit for controlling operation of the plurality of tuner/demodulator units; a reception mode switching unit for switching an operating mode of the plurality of tuner/demodulator units between a first operating mode in which the plurality of tuner/demodulator units cooperatively perform diversity processing and a second operating mode in which the plurality of tuner/modulator units operate independently; a current position detection unit for detecting a current position; a channel scan control unit that has the reception mode switching unit switch the operating mode of the plurality of tuner/demodulator units to the second operating mode, has one of the plurality of tuner/demodulator units perform tuning for program viewing or listening, and has another one of the plurality of tuner/demodulator units perform a channel scan by tuning to the physical channels sequentially and detecting receivable physical channels; a broadcast area map generation unit for generating broadcast area maps including the receivable physical channels when the channel scan is executed, broadcast service information regarding broadcast content of the physical channels, and the current position; a broadcast area map storage unit for storing the generated broadcast area maps; and a broadcast service list generation unit for generating a broadcast service list including broadcast service information of currently receivable physical channels from the broadcast area maps stored in the broadcast area map storage unit and the current position detected by the current position detection unit. The broadcast area map generation unit stores, in the broadcast area map storage unit, slopes of linear functions defining sides of polygons indicating the receivable areas, expressed in an orthogonal coordinate system, positions at which lines represented by the linear functions intersect a coordinate axis, and information indicating whether the receivable areas are located in a positive or negative direction on the coordinate axis with respect to the lines expressed by the linear functions. From the broadcast area maps stored in the broadcast area map storage unit and the current position detected by the current position detection unit, the tuning control unit switches a physical channel to which the plurality of tuner/demodulator units are tuned to another physical channel receivable at the current position.

The broadcast area map generation unit may record vertices of polygons indicating non-receivable areas present in the receivable areas in the broadcast area map storage unit by their coordinates in the orthogonal coordinate system.

The broadcast area map generation unit may store, in the broadcast area map storage unit, slopes of other linear functions defining sides of the polygons indicating non-receivable areas present in the receivable areas, expressed in the orthogonal coordinate system, positions at which lines represented by the other linear functions intersect a coordinate axis, and information indicating whether the non-receivable areas are located in a positive or negative direction on the coordinate axis with respect to the lines expressed by the other linear functions.

When a receivable area is expressed by linear inequalities of the sides of a polygon and the current position is newly added as a receivable position, the broadcast area map generation unit in the digital broadcast reception device may determine linear functions connecting the current position and each vertex of the polygon, determine positional relationships between lines represented by the linear functions and vertices of the receivable area, find the linear functions representing lines with respect to which all the vertices of the receivable area are located on the same side, and update the area map to include the linear functions thus found as new sides of the receivable area.

The digital broadcast reception device may represent sides by linear functions, and the broadcast service list generation unit may display a list of broadcast services receivable at the current position by substituting the current coordinate values into the linear inequalities representing the sides of the polygons by which the broadcast areas are approximated and deciding that the current position is in a broadcast area if the linear inequalities of the broadcast area are all satisfied.

The digital broadcast reception device may represent sides by linear functions and the tuning control unit may switch to another physical channel receivable at the current position by substituting the current coordinate values into the linear inequalities representing the sides of the polygons by which the broadcast areas are approximated and deciding that the current position is in a broadcast area if the linear inequalities of the broadcast area are all satisfied.

The digital broadcast reception device may represent sides by linear functions, and the broadcast area map non-generated area decision unit may substitute the current coordinate values into linear inequalities representing the sides of a polygon by which a broadcast area map generated area is approximated and decide that the current position is a point in the broadcast area map generated area if all of the linear inequalities are satisfied.

Effects of the Invention

The present invention has the effect of enabling the frequency of channel scanning to be lessened, thereby lengthening periods of program viewing or listening by diversity reception and, accordingly, periods of program viewing or listening based on high-quality received signals. The present invention also has the effect of enabling the accuracy of automatic channel switching to be improved despite the longer periods of program viewing or listening by diversity reception.

BRIEF DESCRIPTION OF THE DRAWINGS

FIG. 4 is a drawing showing an exemplary broadcast area map stored in the digital broadcast reception device according to the first embodiment.

FIG. 5 is a drawing illustrating, in tabular form, the structure of the broadcast area map stored in the digital broadcast reception device according to the first embodiment.

FIG. 8 is a flowchart illustrating the reliable channel scan operation (subroutine) shown in FIG. 7.

FIG. 9 is a flowchart illustrating the high-speed channel scan operation (subroutine) shown in FIG. 7.

FIG. 10 is a drawing showing an exemplary broadcast area map stored in the digital broadcast reception device according to the second embodiment.

FIG. 11 is a drawing illustrating, in tabular form, the structure of the broadcast area map stored in the digital broadcast reception device according to the second embodiment.

FIG. 12 is a drawing showing an exemplary broadcast area map stored in the digital broadcast reception device according to the third embodiment.

FIG. 13 is a drawing illustrating the structure of a broadcast area map stored in the digital broadcast reception device according to the third embodiment.

FIG. 16 is a drawing showing, in tabular form, an example of information about broadcast area map generated areas stored in the broadcast area map storage unit in the digital broadcast reception device according to the fourth embodiment.

FIG. 17 is a drawing showing, in tabular form, exemplary receivable area information stored in the digital broadcast reception device according to the fourth embodiment.

FIG. 18 is a drawing showing, in tabular form, exemplary non-receivable area information stored in the digital broadcast reception device according to the fourth embodiment.

FIG. 29 is a drawing showing, in tabular form, an example of broadcast area map generated area information stored in the broadcast area map storage unit in the digital broadcast reception device according to the sixth embodiment.

FIG. 30 is a drawing showing, in tabular form, an example of receivable area information stored in the digital broadcast reception device according to the sixth embodiment.

FIG. 31 is a flowchart illustrating the operation of the digital broadcast reception device according to the sixth embodiment after it is turned on.

MODES FOR CARRYING OUT THE INVENTION

First Embodiment

Figure 1:
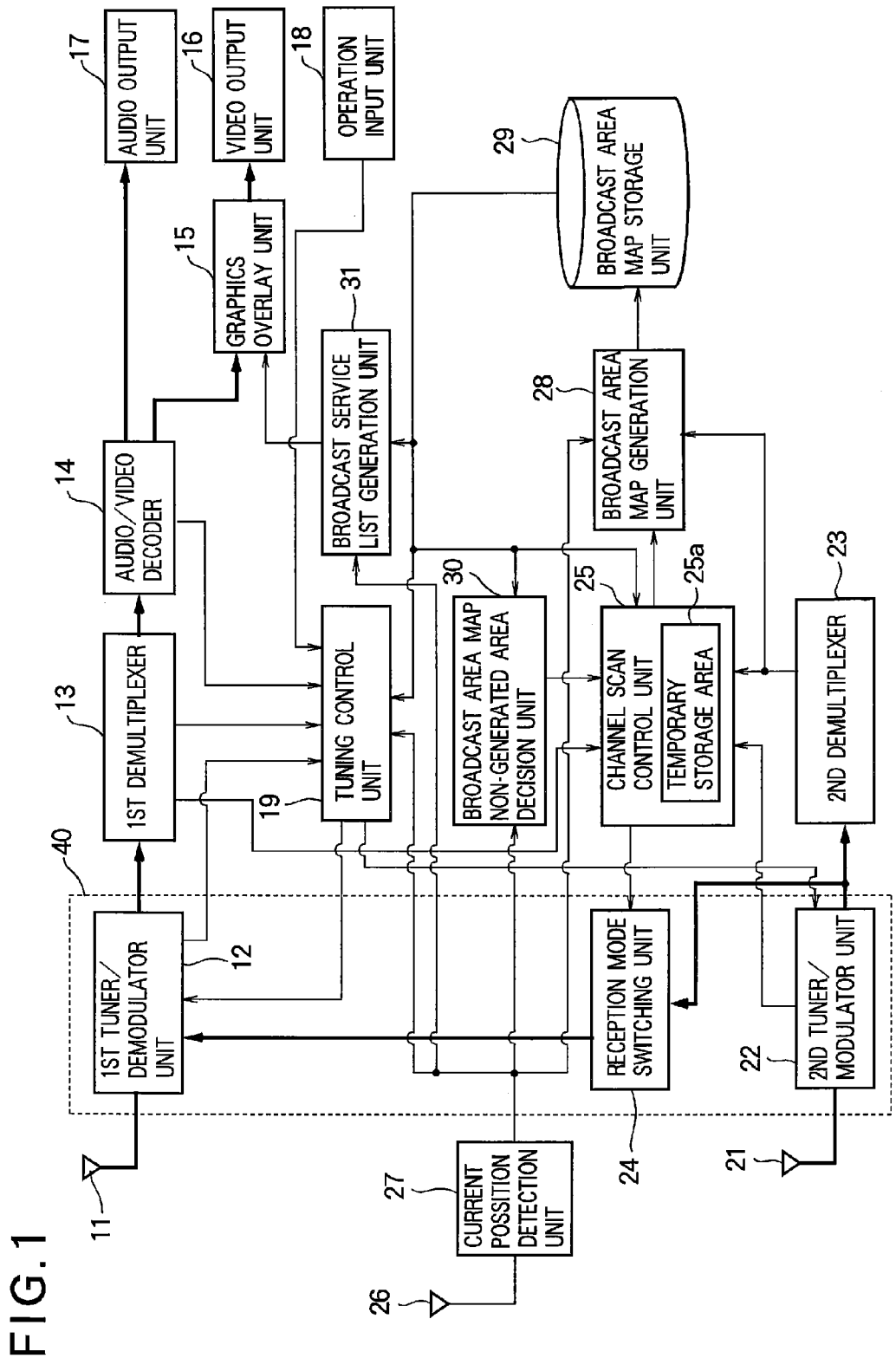
FIG. 1 is a block diagram schematically illustrating the structure of a digital broadcast reception device according to first to eighth embodiments of the present invention.

FIG. 1 is a block diagram schematically illustrating the structure of the digital broadcast reception device according to a first embodiment. As shown in FIG. 1, the digital broadcast reception device includes a first antenna 11, a first tuner/demodulator unit 12, a first demultiplexer 13, an audio/video decoder 14, a graphics overlay unit 15, a video output unit 16, an audio output unit 17, an operation input unit 18, and a tuning control unit 19. The digital broadcast reception device according to the first embodiment also includes a second antenna 21, a second tuner/demodulator unit 22, a second demultiplexer 23, a reception mode switching unit 24, a channel scan control unit 25, an antenna (e.g., a GPS antenna) 26 for use in detecting the current position, a current position detection unit 27 that detects the current position from a signal from antenna 26, a broadcast area map generation unit 28, broadcast area map storage unit 29, a broadcast area map non-generated area decision unit 30, and a broadcast service list generation unit 31.

The first antenna 11 and first tuner/demodulator unit 12 constitute one broadcast reception means or receiver. The second antenna 21 and second tuner/demodulator unit 22 constitute another broadcast reception means or receiver. The receiver formed by the first antenna 11 and first tuner/demodulator unit 12 and the receiver formed by the second antenna 21 and second tuner/demodulator unit 22 can operate independently.

The reception mode switching unit 24 switches between a double tuner mode (a second operating mode) in which a TS is output from each receiver (from the first tuner/demodulator unit 12 and from the second tuner/demodulator unit 22) and a single tuner mode (a first operating mode) that outputs a single TS with high reception stability from the first tuner/demodulator unit 12 by performing diversity processing on the signals received by the antennas of the two receivers. This switching is performed when the reception mode switching unit 24 is directed to perform switching by a switching control signal from the channel scan control unit 25. The first tuner/demodulator unit 12, second tuner/demodulator unit 22, and reception mode switching unit 24 may be included in a single broadcast signal reception unit 40.

In the single tuner mode, the second demultiplexer 23 is not used, and the output from the second tuner/demodulator unit 22 is input to the first tuner/demodulator unit 12. The first tuner/demodulator unit 12 performs diversity processing on the broadcast signal from the first antenna 11 and the broadcast signal input from the first tuner/demodulator unit 12 via the second tuner/demodulator unit 22 and reception mode switching unit 24, thereby generating a highly stable TS, and outputs the generated TS through the first demultiplexer 13 to the audio/video decoder 14. The audio output unit 17 outputs sound, based on an audio signal output from the audio/video decoder 14, from a speaker (not shown), or outputs the audio signal from an output terminal (not shown). The graphics overlay unit 15 combines graphics data with a picture based on a video signal output from the audio/video decoder 14. The video output unit 16 displays a picture, based on a video signal output from the graphics overlay unit 15, on a display unit (not shown), or outputs the video signal from an output terminal (not shown).

In the double tuner mode, while the first tuner/demodulator unit 12 performs tuning for program viewing or listening, the channel scan control unit 25 detects receivable physical channels by performing a channel scan in which physical channels (channels defined in terms of a certain unit frequency bandwidth) are sequentially tuned in. The channel scan by the second tuner/demodulator unit 22 is carried out concurrently with the tuning for program viewing or listening by the first tuner/demodulator unit 12 without the viewer's awareness (carried out in the background of program viewing or listening), so it is also known as a background channel scan. The broadcast area map generation unit 28 generates broadcast area maps including the physical channels that were receivable when channel scans were executed, broadcast service information related to the broadcast content of the physical channels, and the current position, and stores the generated broadcast area maps in the broadcast area map storage unit 29. More specifically, the broadcast area map generation unit 28 generates broadcast area maps including the receivable physical channels on the basis of the broadcast service information obtained by the channel scan and the positional information from the current position detection unit 27, and stores the generated broadcast area map in the broadcast area map storage unit 29 as a database for tuning and/or display of a broadcast service list. For example, the broadcast signal received by the first antenna 11 is converted to a video signal and an audio signal and output via the first tuner/demodulator unit 12, first demultiplexer 13, and audio/video decoder 14. At the direction of the channel scan control unit 25, however, the broadcast signal received by the second antenna 21 is channel-scanned by use of the second tuner/demodulator unit 22 and second demultiplexer 23, and a list of broadcast services receivable at the current location (the current position) is generated in the broadcast area map generation unit 28.

Figures 2, 3:
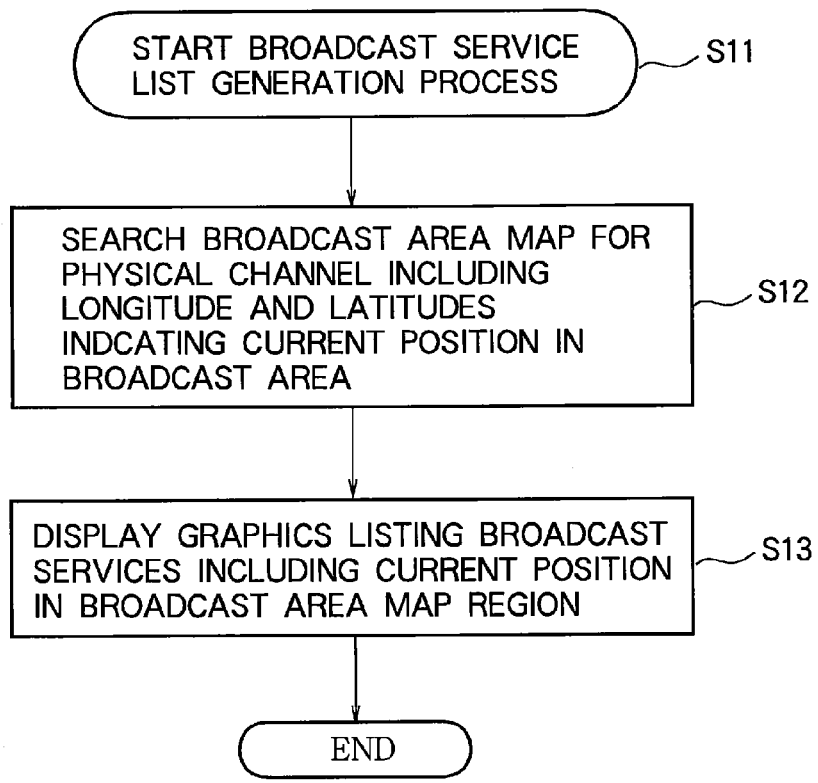
FIG. 2 is a drawing showing, in tabular form, exemplary broadcast area map generated area information held in the broadcast area map storage unit in the digital broadcast reception device according to the first embodiment.
FIG. 3 is a flowchart illustrating broadcast service list generation processing by the broadcast service list generation unit in the digital broadcast reception device according to the first embodiment.

The broadcast area map storage unit 29 stores the broadcast area map generated area information shown in FIG. 2 and the broadcast area maps indicating a receivable area for each broadcasting station shown in FIG. 5. The broadcast area map generated area information indicates areas for which the reception device according to this embodiment has executed a receivable broadcast station detection process by channel scans at relevant positions. Accordingly, even in a broadcast area map generated area, if there are no receivable broadcast stations, it may not be possible to obtain a receivable broadcast station by referring to the broadcast area maps.

FIG. 2 is a drawing showing, in tabular form, exemplary broadcast area map generated area information held in the broadcast area map storage unit 29 of the digital broadcast reception device according to the first embodiment. When a channel scan by the channel scan control unit 25 ends, the broadcast area map generation unit 28 creates and updates broadcast area map generated area information as shown in FIG. 2 regardless of the presence or absence of broadcast services provided by the receivable physical channels. A broadcast area map generated area can be depicted as, for example, the area inside a polygon (a polygonal area). FIG. 2 shows a case in which the name of the polygonal area (generated area name), the coordinates of its vertices, and the date of update are recorded as a broadcast area map. The coordinates of the vertices of the polygonal area are represented by use of an orthogonal coordinate system in which longitude (X-coordinate position) is used as the X-coordinate axis and latitude (Y-coordinate position) is used as the Y-coordinate axis. The polygonal area may be expressed by a plurality of polygons instead of a single polygon. In this case, the vertices of a plurality of polygons are recorded, as shown in FIG. 2 for generated area names A, B, . . . . Vertex coordinates are recorded sequentially in the clockwise direction, in a form such as $(x_{a0}, y_{a0}), x_{a1}, y_{a1}), \ldots, (x_{am}, y_{am})$. Here, m is a positive integer.

The broadcast area map storage unit 29 stores, as a broadcast area map, receivable area information generated by the broadcast area map generation unit 28 for each broadcast service as the mobile facility in which the digital broadcast reception device is mounted moves around. The first purpose of the broadcast area map is to enable a table of broadcast services receivable at the current position (a broadcast service list) to be provided (displayed) to the user without need for the user to execute a channel scan operation.

FIG. 3 is a flowchart illustrating the broadcast service list generation process by the broadcast service list generation unit 31 of the digital broadcast reception device according to the first embodiment. From the broadcast area map stored in the broadcast area map storage unit 29 and a current position detected by the current position detection unit 27, the broadcast service list generation unit 31 generates a broadcast service list including broadcast services provided by currently receivable physical channels. In more concrete terms, as shown in FIG. 3, when the broadcast service list generation unit 31 starts the broadcast service list generation process (step S11), it searches the broadcast area map storage unit 29 based on the current position information from the current position detection unit 27 (step S12), generates a broadcast service list indicating receivable broadcast services at the current position (step S13), outputs a video signal including the broadcast service list to the video output unit 16 via the graphics overlay unit 15, and has the broadcast service list displayed by the video output unit 16. The user refers to the displayed broadcast service list and uses the operation input unit 18 to select a desired broadcast service. The broadcast service selection request from the operation input unit 18 is input to the tuning control unit 19, which refers to the broadcast area map storage unit 29, finds the physical channel to be tuned in, and issues a tuning command to the first tuner/demodulator unit 12. Video and audio are thereby output by the video output unit 16 and audio output unit 17, based on the signal output via the first demultiplexer 13 and audio/video decoder 14.

The second purpose of the broadcast area map is, when the reception state of the broadcast service provided by the physical channel that is being received worsens owing to movement of the mobile facility, to perform an automatic switchover to a physical channel (another physical channel) providing the same program as the program that was being viewed or listened to up until that time. Specifically, for assessment of reception status, the first tuner/demodulator unit 12 notifies the tuning control unit 19 of the C/N ratio, bit error rate, and the tuner's PLL (Phase Locked Loop) lock information or OFDM (Orthogonal Frequency Division Multiplexing) frame lock information. In addition, the tuning control unit 19 is notified of loss of section data (e.g., PSI (Program Specific Information)/SI (Service Information) and the like) by the first demultiplexer 13, decode error rate information from the audio/video decoder 14, etc. When the tuning control unit 19 decides that the broadcast signal reception status has worsened, it searches the broadcast area map storage unit 29 for relay stations or affiliated stations with high likelihoods of broadcasting the same program at the current position, for example, or for a program with the same broadcast service name being broadcast on a different physical channel, and if there is a receivable broadcast service broadcasting the same program, it instructs the first tuner/demodulator unit 12 to switch the tuning automatically.

FIG. 4 is a drawing showing an exemplary broadcast area map stored in the digital broadcast reception device according to the first embodiment. FIG. 4 shows an example of a broadcast service receivable area (shaded area) 50 to which broadcast station A1 sends a broadcast signal with transport stream name (TS name) or ensemble name 'oooo'. FIG. 5 is a drawing illustrating, in tabular form, the structure of the broadcast area map stored in the digital broadcast reception device according to the first embodiment. Broadcast area maps indicating a receivable area for each broadcasting station are shown in FIG. 5. TS names are used here for the ISDB-T (Integrated Services Digital Broadcasting-Terrestrial), DVT-T (Digital Video Broadcasting-Terrestrial), DVB-H (Digital Video Broadcasting-Handheld), DTMB (Digital Terrestrial Multimedia Broadcast), and ATSC (Advanced Television Systems Committee) digital broadcasting standards. Ensemble names are used for the DAB (Digital Audio Broadcast), DAB+ (Digital Audio Broadcast plus), and DMB (Digital Multimedia Broadcasting) digital broadcasting standards. In both cases, one TS or one ensemble is sent over one physical channel and a plurality of broadcast services are present within the broadcast information. The user performs a physical channel tuning operation to select a broadcast service and view or listen to a program. Accordingly, although only one broadcast service name is indicated for each physical channel in the example in FIG. 5, in general, there are a plurality of broadcast service names.

In FIGS. 4 and 5, the shape of the receivable area is polygonal; the receivable area for broadcasting station A1, indicated by reference number 50 in FIG. 4, is the area inside the polygon defined by the points Point10 ($x_{10}$, $y_{10}$) Point11 ($x_{11}$, $y_{11}$), Point12 ($x_{12}$, $y_{12}$), . . . , Point1$m$ ($x_{1m}$, $y_{1m}$), which are shown in clockwise order. The corresponding coordinates of the vertices of the receivable area 50 are recorded in clockwise order in the broadcast area map information 51 for broadcasting station A1 in the broadcast area map storage unit 29 shown in FIG. 5. The vertex coordinates ($x_{10}$, $y_{10}$), ($x_{11}$, $y_{11}$), . . . , ($x_{1m}$, $y_{1m}$) are indicated in an orthogonal coordinate system with longitude used as the X-coordinate axis and latitude used as the Y-coordinate axis. If the physical channels (relay station CHs) of the relay stations and the physical channels of the affiliated stations (affiliated station CHs) are recorded as listed in the right side columns in FIG. 5 from the section data (e.g., PSI/IS information) received in channel scans, an alternative physical channel with high likelihood of broadcasting the same program can be obtained by reference to the table in FIG. 5 and automatic switchover can be achieved in a short time. Since a physical channel with the same broadcast service name is highly likely to be broadcasting the same program, the broadcast area map storage unit 29 preferably also records broadcast service names.

Figure 6:
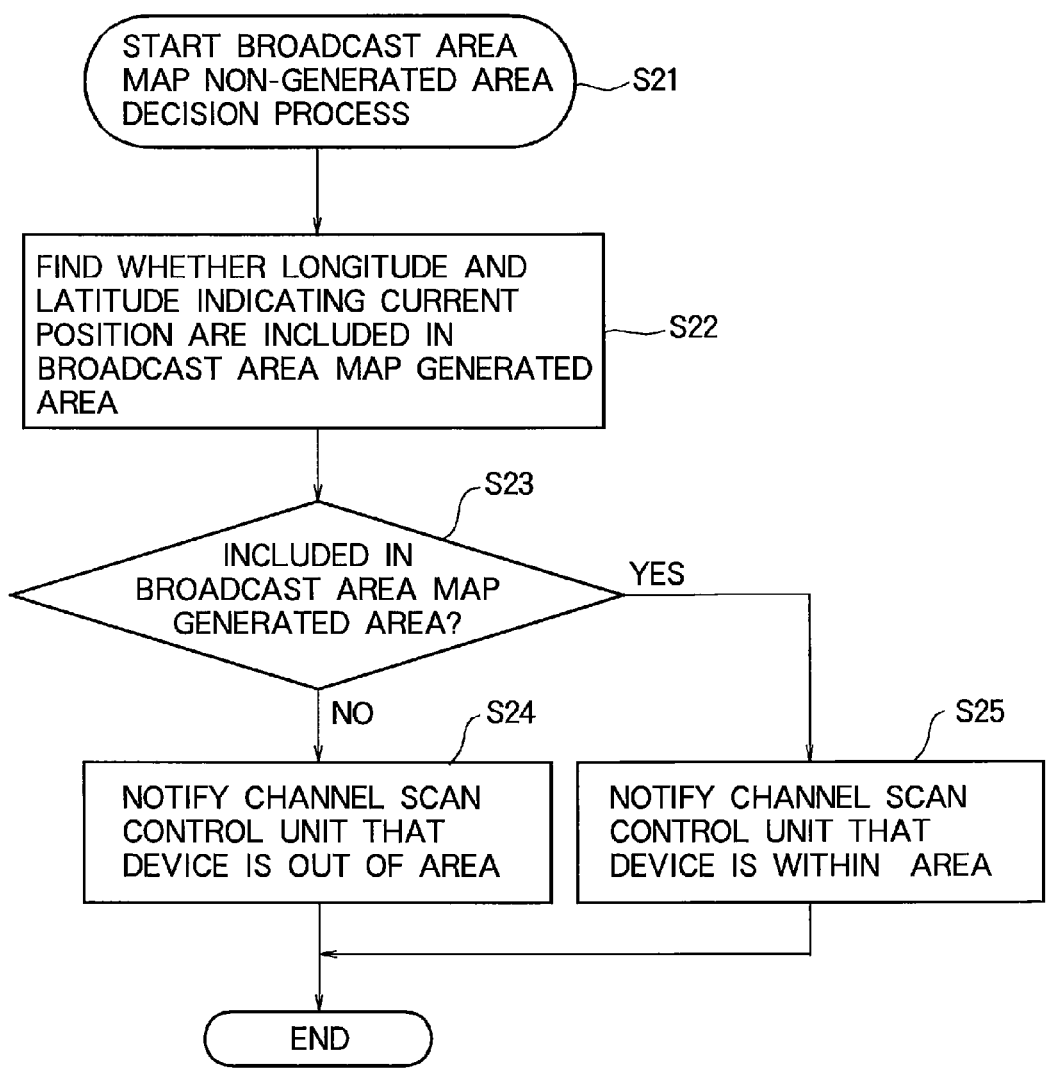
FIG. 6 is a flowchart illustrating broadcast area map non-generated area decision processing by the digital broadcast reception device according to the first embodiment.

FIG. 6 is a flowchart illustrating broadcast area map non-generated area decision process by the digital broadcast reception device according to the first embodiment. When the start of the broadcast area map non-generated area decision process starts (step S21), the broadcast area map non-generated area decision unit 30 receives current position information from the current position detection unit 27 and refers to the broadcast area map generated area information (in FIG. 2, for example) in the broadcast area map storage unit 29, thereby finding whether a broadcast area map corresponding to the current position has already been generated or not (step S22). The broadcast area map non-generated area decision unit 30 thus decides whether or not the current position is included in a broadcast area map generated area (step S23); if it decides that the current position is in the broadcast area map non-generated area, the broadcast area map non-generated area decision unit 30 notifies the channel scan control unit 25 of entry to the broadcast area map non-generated area (step S24). On receiving this notification, the channel scan control unit 25 notifies the reception mode switching unit 24 that it should operate in the double tuner mode, and in parallel with the viewing or listening operations by the first tuner/demodulator unit 12, a channel scan is started by the second tuner/demodulator unit 22. On the other hand, when it decides that the current position has entered a broadcast area map generated area, the broadcast area map non-generated area decision unit 30 notifies the channel scan control unit 25 of entry to a broadcast area map generated area (step S25), stops the channel scan, and starts operation in the single tuner mode. In the single tuner mode, video display and audio output of the program are carried out on the basis of a diversity-processed broadcast signal of high reception stability.

When the broadcast area map non-generated area decision unit 30 decides that the current position is in a broadcast area map generated area, the digital broadcast reception device basically operates in the single tuner mode, but it can be made to execute other operations. During program viewing or listening the channel scan control unit 25 obtains section data (e.g., PSI/SI) from the first demultiplexer 13, from which it obtains network configuration information and broadcast service configuration information. If a change in the network configuration or broadcast service configuration is detected, for example, if a change in configuration information, such as the loss of a broadcast service or a change in its physical channel of transmission, a change in a network identification value or broadcast service identification value, or a change in a network name, TS name, ensemble name, or broadcast service name is detected, the broadcast service configurations on the other physical channels are likely to have changed, so the channel scan control unit 25 notifies the reception mode switching unit 24 that it should operate in the double tuner mode. Then a channel scan is started by the second tuner/demodulator unit 22, which is a broadcast reception means or receiver separate from the first tuner/demodulator unit 12, which is carrying out broadcast signal viewing or listening operations, and based on the results of the channel scan, the broadcast area map stored in the broadcast area map storage unit 29 is updated.

Furthermore, when the broadcast area map non-generated area decision unit 30 decides that the current position is in a broadcast area map generated area, after the elapse of a certain period of time, in order to have the second tuner/demodulator unit 22, which is a broadcast reception means or receiver separate from the first tuner/demodulator unit 12 that is carrying out broadcast signal viewing or listening operations, periodically perform a channel scan, the channel scan control unit 25 may notify the reception mode switching unit 24 that it should operate in the double tuner mode, thereby starting a channel scan, and may monitor whether the broadcast area map is updated or not. Basically, broadcast networks and broadcast service configurations are not changed frequently, and according to the configuration in the first embodiment, a broadcast area map indicating receivable areas for each broadcast service is generated and stored, so this periodic monitoring need not be carried out frequently; it need only be carried out at relatively long intervals, such as once every several days.

Figure 7:
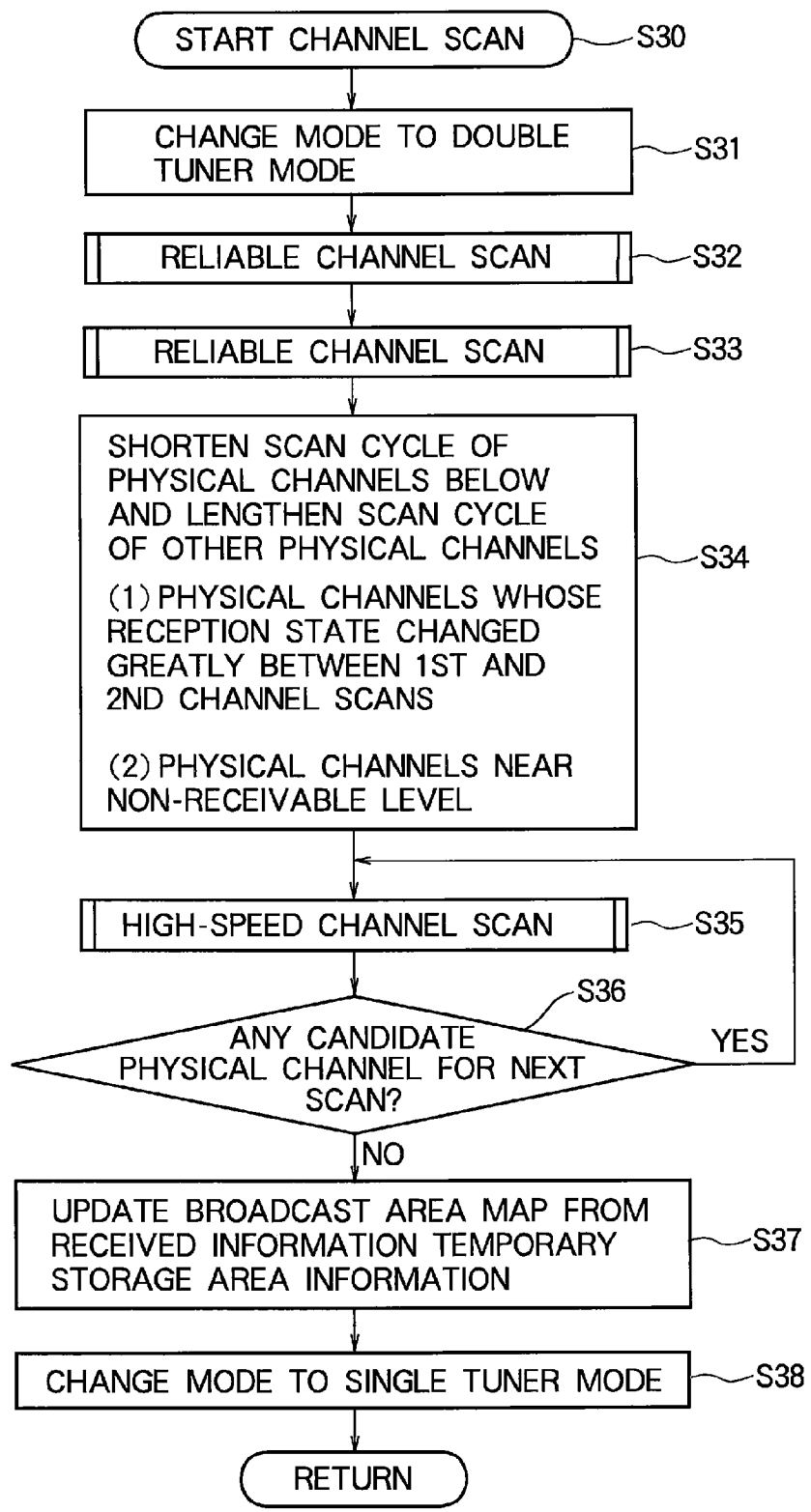
FIG. 7 is a flowchart illustrating operations in channel scanning by the digital broadcast reception device according to the first embodiment.

FIG. 7 is a flowchart illustrating operations in channel scanning by the digital broadcast reception device according to the first embodiment; FIG. 8 is a flowchart illustrating the reliable channel scan operation (subroutine) shown in FIG. 7; FIG. 9 is a flowchart illustrating the high-speed channel scan operation (subroutine) shown in FIG. 7. Reliable channel scan means that all physical channels are scanned. High-speed channel scan means that only some of the physical channels are scanned. A reliable channel scan can obtain highly reliable channel scan results, but the channel scan takes a long time. With a high-speed channel scan, the channel scan can be completed in a short time, but the reliability of the channel scan results is low.

As shown in FIG. 7, when the channel scan control unit 25 decides that the conditions for starting a channel scan are met, the channel scan is started (step S30). When the channel scan starts, first, the channel scan control unit 25 instructs the reception mode switching unit 24 to change to the double tuner mode (step S31), and a reliable channel scan is executed twice (steps S32 and S33).

As shown in FIG. 8, when the reliable channel scan operation starts (step S320), the channel scan control unit 25 selects one of the physical channels (step S321) and has the second tuner/demodulator unit 22 execute tuning (step S322). Then the channel scan control unit 25 decides, on the basis of the power level of the received signal, for example, whether or not there is a broadcast signal on the tuned physical channel (step S323). When the channel scan control unit 25 decides that there is no broadcast signal on the tuned physical channel, it decides whether the channel scan of all candidates (all physical channels to be scanned) has been completed (step S328); if the channel scan has not been completed, it decides the next physical channel (step S321) and has the second tuner/demodulator unit 22 execute tuning (step S322). When the channel scan control unit 25 decides that there is a broadcast signal on the tuned physical channel, it makes an additional frame lock decision (step S324). In the frame lock decision, in the case of ISDB-T, for example, the channel scan control unit 25 performs a CRC (Cyclic Redundancy Check) error check or a periodic synchronous word check on the TMCC (Transmission and Multiplexing Configuration and Control) signal to decide whether or not the channel is the desired digital broadcast wave which the device should be receiving. If frame lock fails, it decides whether the channel scan of all candidate physical channels has been completed (step S328); if the channel scan of all candidate physical channels has not been completed, it decides the next physical channel (step S321) and has the second tuner/demodulator unit 22 execute tuning (step S322). When frame lock is acquired, the channel scan control unit 25 further starts a PSI/SI section filtering process (step S325), and obtains PSI/SI information. If the PSI/SI information cannot be obtained in a given period of time (step S326), the channel scan control unit 25 decides whether the channel scan of all candidate physical channels has been completed (step S328); if the channel scan has not been completed, the channel scan control unit 25 decides the next physical channel (step S321) and has the second tuner/demodulator unit 22 execute tuning (step S322). When the PSI/SI information has been received (step S326), the channel scan control unit 25 retrieves broadcast service information from the received PSI/SI information and stores the physical channel, the power level of the received signal, and the current position as received information in the temporary storage area 25a (step S327). The channel scan control unit 25 then decides whether the scan of all candidates has been completed (step S328), and continues repeatedly choosing physical channels (step S321), having the second tuner/demodulator unit 22 execute tuning, and deciding whether or not a broadcast signal is present until the channel scan of all candidate physical channels is complete. When the channel scan of all candidate physical channels is completed (step S328), the process exits the reliable channel scan subroutine and returns to step S33 or S34 in the flowchart in FIG. 7.

After the reliable channel scan has been executed twice (steps S32 and S33), the channel scan control unit 25 selects physical channels whose reception states changed by an amount equal to or greater than a certain reference level in the first and second channel scans as candidate physical channels for the next channel scan (step S34-(1)). Physical channels other than the ones selected in step S34-(1) are also selected by the channel scan control unit 25 as candidate physical channels for the next channel scan if they are near the non-receivable level, more specifically, if their power level is within a certain plus-or-minus range centered on a predetermined threshold power level at which a physical channel is determined to be non-receivable (step S34-2). The channel scan control unit 25 continues by carrying out a high-speed channel scan by scanning only these candidate physical channels (step S35). The channel scan control unit 25 excludes physical channels other than the physical channels satisfying the conditions in steps S34-(1) and S34-(2) from the high-speed channel scan, considering their reception states to be unchanged.

As shown in FIG. 9, in a high-speed channel scan, from among all physical channels, the channel scan control unit 25 selects one (step S351) and has the second tuner/demodulator unit 22 execute tuning (step S352). Then the channel scan control unit 25 decides, from the power level of the received signal, whether there is a broadcast signal on the tuned physical channel (step S353). If there is no broadcast signal on the tuned physical channel, the channel scan control unit 25 refers to the temporary storage area 25a and decides whether or not a broadcast service was present on the same physical channel the previous time (step S361); if no broadcast service was present, it decides whether or not the scan of all candidates is completed (step S360). If the scan is completed, the channel scan control unit 25 decides the next physical channel (step S351) and has the second tuner/demodulator unit 22 execute tuning (step S352). If there was a broadcast service on the same physical channel in step S361, the channel scan control unit 25 deletes the physical channel from the temporary storage area 25a (step S362). In this case, since the signal on the physical channel has changed from receivable to non-receivable, the physical channel that was deleted is treated as having unstable reception and is made a candidate physical channel for the next channel scan, that is, a candidate physical channel to be rechecked (step S359). Then the channel scan control unit 25 decides whether or not the scan of all candidates is completed (step S360), and if any candidate physical channel is left, it executes tuning on the next physical channel.

If the channel scan control unit 25 decides that a broadcast signal is present on the tuned physical channel in step S353, it refers to the temporary storage area 25a and decides whether or not there was a broadcast service on the same physical channel in the previous scan of the same physical channel (step S354); if there was, the channel scan control unit 25 decides that there has been no change in the reception state and has the second tuner/demodulator unit 22 execute tuning to the next physical channel. When the channel scan control unit 25 decides whether a broadcast service was present on the same physical channel the previous time (step S354), if no broadcast service was present, then since a new signal has been detected, the channel scan control unit 25 makes a frame lock decision (step S355). If frame lock fails, and if the scan of all candidate physical channels is not completed (step S360), the channel scan control unit 25 has the second tuner/demodulator unit 22 execute tuning on the next physical channel (steps S351 and S352). When frame lock is acquired, the channel scan control unit 25 starts a PSI/SI section filtering process (step S356), and obtains PSI/SI information (step S357). If the PSI/SI information cannot be obtained in a given period of time, and if the channel scan has not been completed, the channel scan control unit 25 has the second tuner/demodulator unit 22 execute tuning on the next physical channel (steps S351 and S352). If the PSI/SI information can be received in step S357, the channel scan control unit 25 retrieves broadcast service information from the received PSI/SI information and stores the physical channel, the power level of the received signal, and the current position as received information (step S358). Since a broadcast service that was not present the previous time has been newly detected, the channel has unstable reception and the channel scan control unit 25 makes it a candidate for the next channel scan, thus making the physical channel a candidate for reconfirmation (step S359). If the scan is not completed (step S360), the channel scan control unit 25 has the second tuner/demodulator unit 22 execute tuning on the next physical channel (step S351 and S352). When the scan of all candidates is completed (step S360), the channel scan control unit 25 returns the process from the high-speed channel scan subroutine to step S36 in FIG. 7.

If there is a physical channel that was determined to be a candidate for the next channel scan in step S359 in FIG. 9, after the completion of the high-speed channel scan subroutine processing (step S35) in the flowchart in FIG. 7, the channel scan control unit 25 executes a high-speed channel scan again. If there is no candidate physical channel for the next channel scan, the channel scan control unit 25 notifies the broadcast area map generation unit 28, which generates broadcast area maps from the information generated by the channel scan in the temporary storage area 25a, and updates the broadcast area maps in the broadcast area map storage unit 29 (step S37). The channel scan control unit 25 also notifies the reception mode switching unit 24 that it should operate in the single tuner mode (step S38), and ends the channel scan.

As described above, with the digital broadcast reception device according to the first embodiment, the timings at which a channel scan is executed are the times when the device is moving within a broadcast area map non-generated area, the times when the device is moving in a broadcast area map generated area but a change in network configuration or broadcast service configuration is detected on the physical channel being viewed or listened to, and the times of periodic channel scans, which take place at relatively long intervals such as once every several days; this timing policy can extend the periods of program viewing or listening by diversity reception with highly stable received signals, and by improving reception performance, can provide high quality pictures and sound.

Even while moving within a broadcast area map generated area, the digital broadcast reception device according to the first embodiment starts a channel scan in the double tuner mode when a change in the network configuration or broadcast service configuration is detected on the physical channel being viewed or listened to, so the broadcast area maps can also be updated when the network configuration and broadcast service configuration change, and can accordingly be kept up-to-date.

Moreover, even while moving within a broadcast area map generated area, the digital broadcast reception device according to the first embodiment executes periodic channel scans at relatively long intervals such as once every several days, so even if the network configuration or broadcast service configuration of a broadcast service other than the one being viewed or listened to changes, the change can be detected the broadcast area map can be updated; since the intervals between periodic channel scan executions can be made relatively long, the periods of diversity reception in the single tuner mode can be lengthened.

Furthermore, since a broadcast area map of each broadcast service is automatically created by the channel scans, when the digital broadcast reception device according to the first embodiment is moving within a broadcast area map generated area, a list of receivable broadcast services at the current position can be presented to the user without requiring any user channel scan operations, providing improved convenience when mounted on a mobile facility.

In addition, since a broadcast area map of each broadcast service is automatically created by the channel scans and is recorded together with the physical channels and broadcast service names of relay stations and affiliated stations, when the digital broadcast reception device according to the first embodiment is moving within a broadcast area map generated area but is leaving the receivable area of the broadcast service being viewed or listened to, when the reception state becomes unstable, the device can automatically switch over to a relay station or an affiliated station with a high likelihood of broadcasting the same program, or to a physical channel on which a broadcast service with the same name is broadcasting, providing seamless program viewing/listening.

Moreover, with the digital broadcast reception device according to the first embodiment, in the operation of the channel scan control unit 25, the previous channel scan result is compared with the current channel scan result and a follow-up scan is carried out only on physical channels with reception states that have changed by a certain reference level or more and physical channels near the threshold receiving power level; the reception state sampling cycle of physical channels that are in an unstable reception state because the device is near the boundary of their receivable areas is thus shortened, whereby the accuracy of the results of channel scanning can be improved near the boundaries of receivable areas with a comparatively short channel scanning time.

Furthermore, in the above follow-up scan, if it was decided in the previous channel scan that there was a broadcast service and it is also decided from the received signal power level in the current channel scan that a broadcast signal is present, the same broadcast service as in the previous channel scan is decided to be present without executing the frame lock decision and PSI/SI information acquisition decision that would normally be executed next, so the decision ends within the time required for the signal presence check, and the frame lock confirmation and PSI/SI information acquisition decisions can be omitted. The signal presence check generally takes a few hundred milliseconds, whereas the frame lock decision takes about a second and the PSI/SI acquisition decision takes several seconds, so the channel scan can be greatly speeded up by omitting the frame lock decision and PSI/SI acquisition decision, the channel scan finishes in a short time, the signals from all antennas can therefore be used for program viewing or listening more often, and a reception device with high reception stability and high sound and picture quality can be provided.

In addition, in the above follow-up channel scan, when no broadcast service was present in the previous channel scan and no broadcast signal is determined to be present from the power level of the received signal in the current channel scan, it is decided that no broadcast service is present, so the channel scan can be speeded up, and in a short time the channel scan is finished and the signals from all antennas can be used for viewing and listening, whereby a device with high reception stability and high sound and picture quality can be provided.

Moreover, in the above follow-up channel scan, when no broadcast service was present in the previous channel scan but a broadcast signal is determined to be present from the power level of the received signal in the current channel scan, even if frame lock and PSI/SI information can be acquired, the channel is scanned as an unstable channel in the next channel scan, whereby the accuracy of channel scan results in the vicinity of an unstable channel area boundary can be improved.

Furthermore, in the above follow-up channel scan, when a broadcast service was present in the previous channel scan but no broadcast signal is determined to be present from the power level of the received signal in the current channel scan, the channel is scanned as an unstable channel in the next channel scan, whereby the accuracy of channel scan results in the vicinity of an unstable channel area boundary can be improved.

When making a database of broadcast service information and receivable areas for the physical channels, the digital broadcast reception device according to the first embodiment also expresses them as polygonal areas, using a coordinate system with longitude and latitude as the coordinate axes, and only has to record the coordinates of the vertices of the polygonal areas; accordingly, the required memory size can be reduced as compared with recording data by partitioning the coordinate plane represented by longitude and latitude into a mesh.

Second Embodiment

FIG. 10 is a drawing showing an exemplary broadcast area map stored in the digital broadcast reception device according to the second embodiment; FIG. 11 is a drawing illustrating, in tabular form, the structure of the broadcast area map stored in the digital broadcast reception device according to the second embodiment. The difference from the first embodiment is that a non-receivable area (the white area in the shaded area) is added inside the receivable area (shaded area) of the broadcast area map generated by the digital broadcast reception device according to the first embodiment. The description of the second embodiment will also refer to FIG. 1.

In FIG. 10, an example of the receivable area 60 of a broadcast service being transmitted by a certain broadcast station A1 with TS name or an ensemble name 'oooo' is shown; in FIG. 11, the receivable area of each broadcasting station is shown in tabular form. FIGS. 10 and 11 depict a case in which the receivable area 60 includes a non-receivable area 61. In FIG. 10, the non-receivable area 61 is represented as the area (white) inside a polygon (a triangle in FIG. 10) having vertices NGPoint10 ($x_{10NG}$, $y_{10NG}$) NGPoint11 ($x_{11NG}$, $y_{11NG}$), and NGPoint12 ($x_{12NG}$, $y_{12NG}$), indicated in clockwise order. The non-receivable area corresponding to broadcasting station A1 is recorded as indicated by reference numeral 62 in FIG. 11, by recording the vertices of the non-receivable area as well as the receivable area in clockwise order. Each vertex is represented in the orthogonal coordinate system represented by longitude as the X-coordinate axis and latitude as the Y-coordinate axis; the vertex coordinates ($x_{10NG}$, $y_{10NG}$), ($x_{11NG}$, $y_{11NG}$), ($x_{12NG}$, $y_{12NG}$) are stored. In addition, although not shown, the physical channels of the relay stations and affiliated stations are recorded as in the first embodiment from the section data (e.g., PSI/SI information) received in channel scans, so that when the broadcast signal reception state worsens, an alternative physical channel with a high likelihood of broadcasting the same program can be recognized by referring to the table in FIG. 11, and quick automatic switching can be implemented. Since the same program is very likely to be broadcast with the same broadcast service name, the broadcast service name is preferably recorded in the broadcast area map.

Since, as described above, the digital broadcast reception device according to the second embodiment represents a broadcast area as a polygonal area even when the receivable area includes a non-receivable area, the required memory size can be reduced as compared with recording data by partitioning the coordinate plane represented by longitude and latitude into a mesh.

Regarding points other than the above, the second embodiment is the same as the first embodiment.

Third Embodiment

FIG. 12 is a drawing showing an exemplary broadcast area map stored in the digital broadcast reception device according to the third embodiment; FIG. 13 is a drawing illustrating the structure of the broadcast area maps stored in the digital broadcast reception device according to the third embodiment. The structure of the broadcast area maps in the digital broadcast reception device according to the third embodiment differs from the structure of the broadcast area maps generated by the digital broadcast reception device according to the first embodiment. The description of the third embodiment will also refer to FIG. 1.

In FIG. 12, an example of a receivable area 70 of the broadcast service being transmitted by a certain broadcast station A1 with the TS name or ensemble name 'oooo' is shown; in FIG. 13, the receivable area of each broadcasting station is shown in tabular form. The digital broadcast reception device according to the third embodiment is the same as in the first and second embodiments in that receivable areas, and non-receivable areas inside receivable areas, are represented as polygons, but differs from the digital broadcast reception devices in the first and second embodiment in that instead of recording the vertices of the polygon defining an area, it represents the sides defining the polygon by linear functions. For example, when the linear function defining a side of the polygon indicating the receivable area 70 is represented in an orthogonal coordinate system, information indicating the slope, information indicating the position at which the line represented by the linear function intersects a coordinate axis (e.g., the Y-axis), and information indicating whether the receivable area is located in the positive direction or negative direction on a coordinate axis (e.g., the Y-axis) with respect to the line represented by the linear function is stored in the broadcast area map generation unit 28. When another linear function defining a side of the polygon indicating the non-receivable area 71 in the receivable area 70 is represented in the orthogonal coordinate system, information indicating the slope, information indicating the position at which the line represented by the linear function intersects a coordinate axis (e.g., the Y-axis), and information indicating whether the non-receivable area 71 is located in the positive direction or negative direction on the coordinate axis (e.g., Y-axis) with respect to the line represented by the linear function is also stored in the broadcast area map generation unit 28.

More specifically, side 72 in FIG. 12 is represented by the linear function $Y=a_{10}X+b_{10}$, side 73 by the linear function $Y=a_{11}X+b_{11}$, side 74 by the linear function $Y=a_{12}X+b_{12}$, side 75 by the linear function $Y=a_{13}X+b_{13}$, and side 76 by the linear function $Y=a_{14}X+b_{14}$. The receivable area 70 is part of the area enclosed by sides 72 to 76. Accordingly, the receivable area 70 is the area below side 72 (the area represented by $Y<a_{10}X+b_{10}$), above side 73 (the area represented by $Y>a_{11}X+b_{11}$), above side 74 (the area represented by $Y>a_{12}X+b_{12}$), below side 75 (the area represented by $Y<a_{13}X+b_{13}$), and below side 75 (the area represented by $Y<a_{14}X+b_{14}$).

Side 91 of the non-receivable area 71 is represented by the linear function $Y=a_{15}X+b_{15}$, side 92 by the linear function $Y=a_{16}X+b_{16}$, and side 93 by the linear function $Y=a_{17}X+b_{17}$. The non-receivable area 71 is the area enclosed by sides 91 to 93. Accordingly, the non-receivable area 71 includes the area below side 91 (the area represented by $Y<a_{15}X+b_{15}$), above side 92 (the area represented by $Y>a_{16}X+b_{16}$), and above side 93 (the area represented by $Y>a_{17}X+b_{17}$).

The recording format shown in FIG. 13, for example, is used to record the broadcast area map in the operation input unit 18. The symbol '<' on the left in the entry '<, $a_{10}$, $b_{10}$' indicated by reference numeral 94, for example, means that the latitudes Y of the receivable area are located in the latitude area below the line represented by $a_{10}X+b_{10}$. The other values in the entry '<, $a_{10}$, $b_{10}$' mean that the slope of side 72 is $a_{10}$ and the intercept (intersection with the Y-axis) is $b_{10}$. The following sides 73 to 76 are recorded similarly, in clockwise order. The data of the non-receivable area inside the receivable area are recorded in the same way, as indicated by reference numerals 96 and 97 in FIG. 13. Furthermore, the broadcast area map generated area information, which was recorded by using the vertices of polygons in FIG. 2, may also be denoted by the slopes and intercepts (intersections with the Y-axis) of the sides connecting the vertices, with inequality signs to indicate the area, as shown in FIG. 13.

Figure 14:
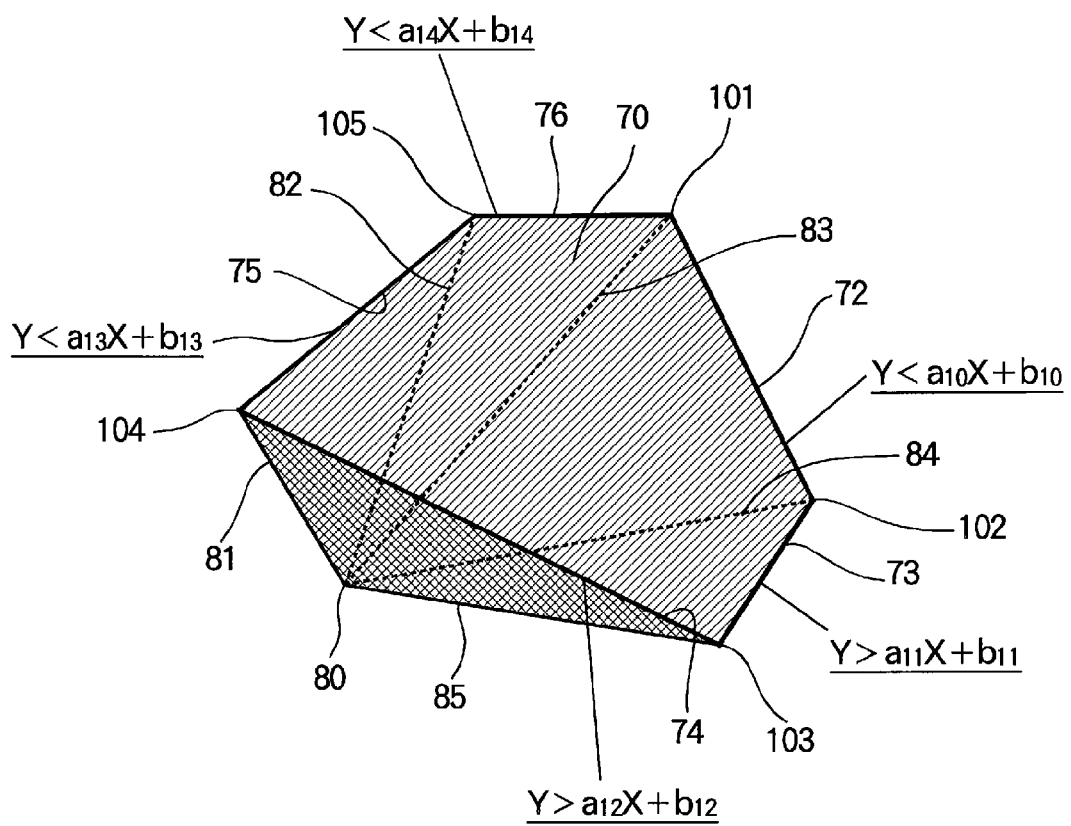
FIG. 14 is a drawing showing an exemplary broadcast area map to which a current position is newly added as a receivable point in the digital broadcast reception device according to the third embodiment.
Figure 15:
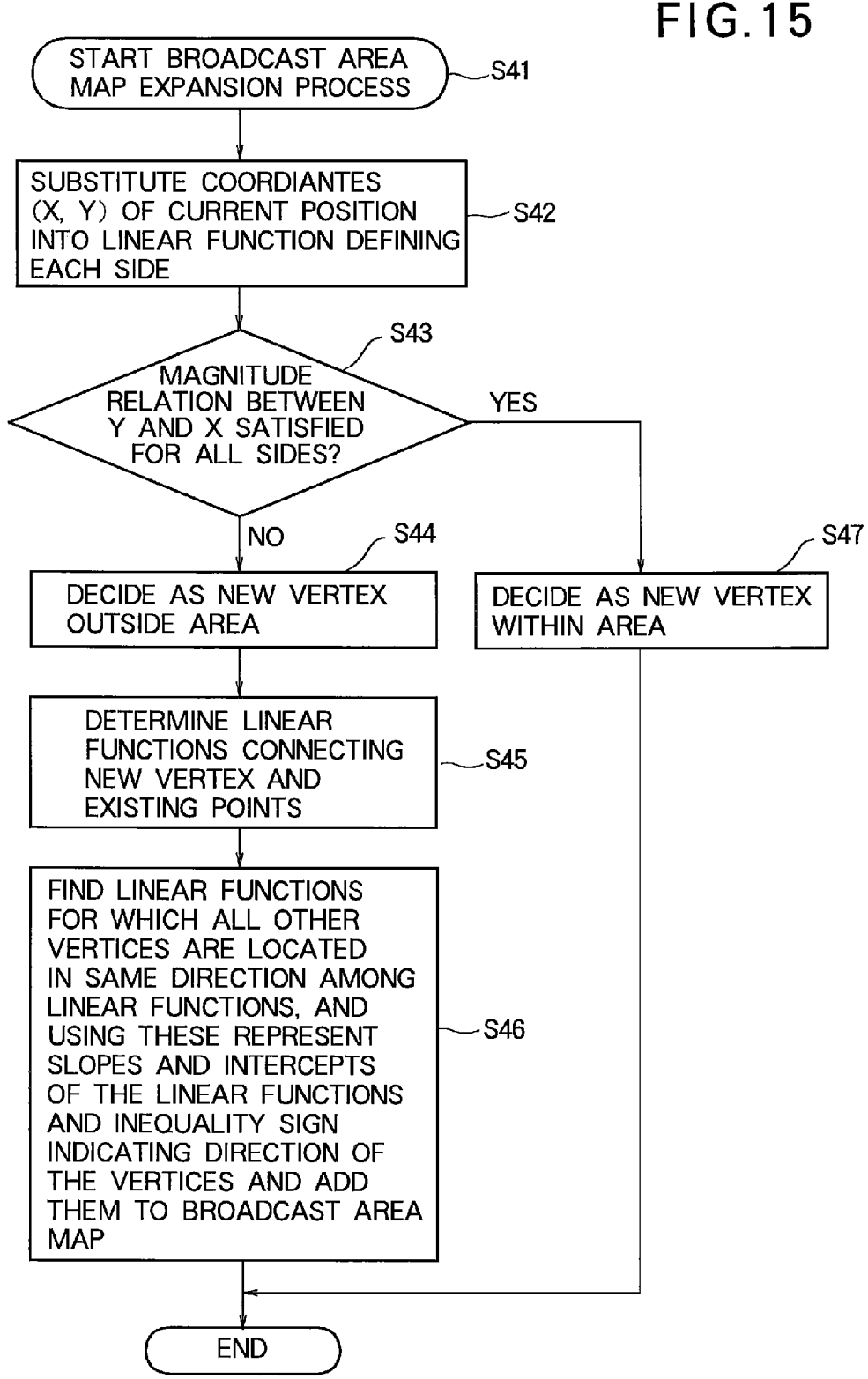
FIG. 15 is a flowchart illustrating the broadcast area map expansion process in the digital broadcast reception device according to the third embodiment.

FIG. 14 is a drawing showing an exemplary broadcast area map to which a current position is newly added as a receivable point in the digital broadcast reception device according to the third embodiment. FIG. 15 is a flowchart illustrating the broadcast area map expansion process in the digital broadcast reception device according to the third embodiment. FIG. 14 illustrates a case in which an existing receivable area 70 is already recorded and the current position 80 is found to be in the receivable area as a result of a channel scan at the current position 80. In this case, the area (cross-hatched area) enclosed by sides 81, 74, and 85 is newly added as a receivable area. FIG. 15 illustrates the operation of the broadcast area map generation unit 28 in the broadcast area map expansion process at this time. When the broadcast area map expansion process is started (step S41), the broadcast area map generation unit 28 substitutes the coordinates of the current position 80 into the linear functions defining the sides (72, 73, 74, 75, 76 in FIG. 14) of the receivable area 70 (step 42). Next, the broadcast area map generation unit 28 decides from the substitution results whether or not the magnitude relations relating Y to X are satisfied for all sides (step S43); if they are satisfied, it decides that the current position is inside the existing receivable area 70 (step S47), and does not carry out the process of adding information to the broadcast area map. When the broadcast area map generation unit 28 decides whether or not the magnitude relations relating Y to X are satisfied for all the sides, if they are not all satisfied, the current position is decided to be a new vertex outside the existing receivable area (step S44), and the linear functions of lines connecting it to each vertex of the existing receivable area 70 are determined (step S45). Then the broadcast area map generation unit 28 checks the positional relations between the lines indicated by the determined linear functions and the vertices of the receivable area 70, and finds the linear functions for which all vertices of the receivable area 70 are located on the same side relative to the indicated line. For example, in FIG. 14, among the lines (sides) connecting the current position 80 to vertices 101 to 105, indicated by corresponding linear functions, because vertex 104 is located in the positive direction of the Y-axis relative to line 82 but vertices 101 to 103 are located in the negative direction of the Y-axis, the linear function of line 82 is not a linear function of a line relative to which the vertices of the receivable area 70 are all located on the same side (e.g., in the positive direction or negative direction of the Y-axis). Similarly, because vertices 104 and 105 are located in the positive direction of the Y-axis relative to line 83 but vertices 102 and 103 are located in the negative direction of the Y-axis, the linear function of line 83 is not a linear function of a line relative to which the vertices of the receivable area 70 are all located on the same side (e.g., in the positive direction or negative direction of the Y-axis). Also in FIG. 14, because vertices 104, 105, and 101 are located in the positive direction of the Y-axis relative to line 84 but vertex 103 is located in the negative direction of the Y-axis, the linear function of line 84 is not the linear function of a line relative to which the vertices of the receivable area 70 are all located on the same side (e.g., in the positive direction or negative direction of the Y-axis). On the other hand, because vertices 101 to 103 and 105 in FIG. 14 are located in the positive direction of the Y-axis relative to line 81 and there is no vertex in the negative direction, the linear function of line 81 is the linear function of a line relative to which the vertices of the receivable area 70 are all located on the same side (e.g., in the positive direction or negative direction of the Y-axis). Similarly, in FIG. 14, because vertices 101, 102, 104 and 105 are located in the positive direction of the Y-axis relative to line 85 and there is no vertex in the negative direction, the linear function of the line 85 is the linear function of a line relative to which the vertices of the receivable area 70 are all located on the same side (e.g., in the positive direction or negative direction of the Y-axis). In this way, lines (sides) 81 and 85 are decided to be sides of the expanded portion of the receivable area, so the slopes and intercepts (e.g., intersections with the Y-axis) of these sides and an inequality sign indicating the direction of the area are added to the broadcast area map.

As described above, with the digital broadcast reception device according to the third embodiment, receivable areas 70 and non-receivable areas 71 inside the receivable areas are represented as polygonal areas defined by vertices with longitude and latitude used as the coordinate axes, the sides of each polygon are represented by linear functions, and the slopes and intercepts (intersections with the Y-axis) of the sides and information indicating whether the area lies above or below the linear function are recorded, so the required memory size can be reduced as compared with recording data by partitioning the coordinate plane represented by longitude and latitude into a mesh.

Regarding points other than the above, the third embodiment is the same as the first and second embodiments.

Fourth Embodiment

When vertex 80 (the current position) is added as a new vertex of the area in FIG. 14, which is related to the third embodiment, and lines 81 and 85 are added as new lines (sides of this polygonal area), line 74 becomes unnecessary, but the digital broadcast reception device according to the third embodiment does not delete unnecessary lines. Accordingly, the recording space in the memory used for storing the parameters of the linear inequality expressing the unnecessary line is wasted, and the memory capacity may have to be increased. Moreover, since the linear expression representing the no longer needed line 74 remains as a side indicating a boundary of the area, the expansion of the polygonal area does not change the area satisfying all the linear inequalities indicating the polygonal area; this area is still the area enclosed by points 101, 102, 103, 104, and 105 in FIG. 14. Therefore, if the 'determined area' is determined to be the area satisfying all the linear inequalities defining the polygonal area, then after a new receivable point of the broadcast wave from a certain broadcasting station A1, for example, has been found and the receivable area of the broadcast wave from broadcasting station A1 has been expanded to include that point as a new vertex, on return to that point again, it will not be decided that the broadcast wave from broadcasting station A1 is receivable and broadcasting station A1 will not be treated as a broadcasting station to which reception can be switched. The digital broadcast reception device according to the fourth embodiment additionally solves this problem. The description of the fourth embodiment will also refer to FIG. 1.

FIG. 16 is a drawing showing, in tabular form, an example of information about broadcast area map generated areas stored in the broadcast area map storage unit in the digital broadcast reception device according to the fourth embodiment. The broadcast area map generated area information includes the area number, the date of update, the coordinates of the vertices constituting the area, and the parameters of its linear expressions (the linear expressions or linear functions expressing the sides (boundary lines) of the polygonal area). The linear expressions here are linear equations when expressing the boundary of an area, but when expressing conditions satisfied within the area (the range of the area) the linear expressions are linear inequalities in which the equal sign of the linear equation is replaced with an inequality sign (a strict inequality sign '>' or '<', or a non-strict inequality sign '≥' or '≤'). The number of linear expressions of the area is the same as the number of vertices of the area; the case in which the lower limit of this number is three will now be described.

In the coordinates, denoted $(x_{i,j,k}, y_{i,j,k})$, of the vertices of the area and the parameters, denoted $a_{i,j,k}$, $b_{i,j,k}$, $c_{i,j,k}$, and $d_{i,j,k}$, of the linear expressions of the area, the first (leftmost) subscript i has the following meanings: i=1 means that the parameter is a parameter of a broadcast area map generated area; i=2 means that the parameter is a parameter of a receivable area; i=3 means that the parameter is a parameter of a non-receivable area. The second (middle) subscript j indicates the number of the area to which the parameter belongs. The third (rightmost) subscript k indicates that the parameter is the k-th parameter of the area. The coordinates of the vertices of the area are recorded in clockwise or counterclockwise order.

Among the parameters $a_{i,j,k}$, $b_{i,j,k}$, $c_{i,j,k}$, and $d_{i,j,k}$ representing the linear expressions of an area, parameter $c_{i,j,k}$ is zero ($c_{i,j,k}=0$) if the line is parallel to the longitude line and one ($c_{i,j,k}=1$) otherwise. Parameter $b_{i,j,k}$ can take any value. When $c_{i,j,k}=0$, $a_{i,j,k}$ is one ($a_{i,j,k}=1$); when $c_{i,j,k}=1$, parameter $a_{i,j,k}$ can take any value. Parameter $d_{i,j,k}$ indicates the inequality sign '≤' or '≥'. When $d_{i,j,k}$ indicates '≥', the linear expression is represented by the following expression (1)

$$c_{i,j,k}y \geq a_{i,j,k}x + b_{i,j,k} \tag{1}$$

The area satisfying all the linear expressions of the area represents the range of the area.

The following expression (2) represents the line connecting the k-th vertex and the (k+1)-th vertex.

$$c_{i,j,k}y = a_{i,j,k}x + b_{i,j,k} \tag{2}$$

When (k+1) exceeds the number of the vertices n, however, this expression represents the line connecting the k-th vertex and the first vertex.

Among the broadcast area map generated area information, the area number, the update time, and the coordinates of the vertices of the area are stored not only in volatile memory but also in a flash memory or another non-volatile memory, thereby preventing the loss of these data when the power of the digital broadcast reception device is turned off. The parameters of the linear expressions need only be stored in volatile memory; they need not necessarily be stored in nonvolatile memory. The volatile memory and nonvolatile memory are provided in, for example, the broadcast area map storage unit 29.

FIG. 17 is a drawing showing, in tabular form, exemplary receivable area information stored in the digital broadcast reception device according to the fourth embodiment. The receivable area information includes the area number, the TS name or ensemble name, the broadcast service name, the coordinates of the vertices of the area, and the parameters of the linear expressions of the area.

Among the receivable area information, the area number, physical CH, TS name or ensemble name, and coordinates of the vertices of the area are stored in both volatile memory and flash memory or another type of nonvolatile memory to prevent the loss of these data even when the power of the digital broadcast reception device is off. The parameters of the linear expressions of the area need only be stored in volatile memory and need not necessarily be stored in nonvolatile memory.

FIG. 18 is a drawing showing, in tabular form, exemplary non-receivable area information stored in the digital broadcast reception device according to the fourth embodiment. The non-receivable area information includes the area number, the area number of the receivable area to which the area belongs, the coordinates of the vertices of the area, and the parameters of the linear expressions of the area. Duplication of receivable area numbers is allowed. More specifically, in the non-receivable area information, one receivable area may have a plurality of non-receivable areas.

Among the non-receivable area information, the area number, the number of the receivable area to which the area belongs, and the coordinates of the vertices of the area are stored in both volatile memory and flash memory or another type of nonvolatile memory to prevent the loss of these data when the power of the digital broadcast reception device is off. The parameters of the linear expressions of the area need only be stored in volatile memory and need not necessarily be stored in nonvolatile memory.

Figure 19:
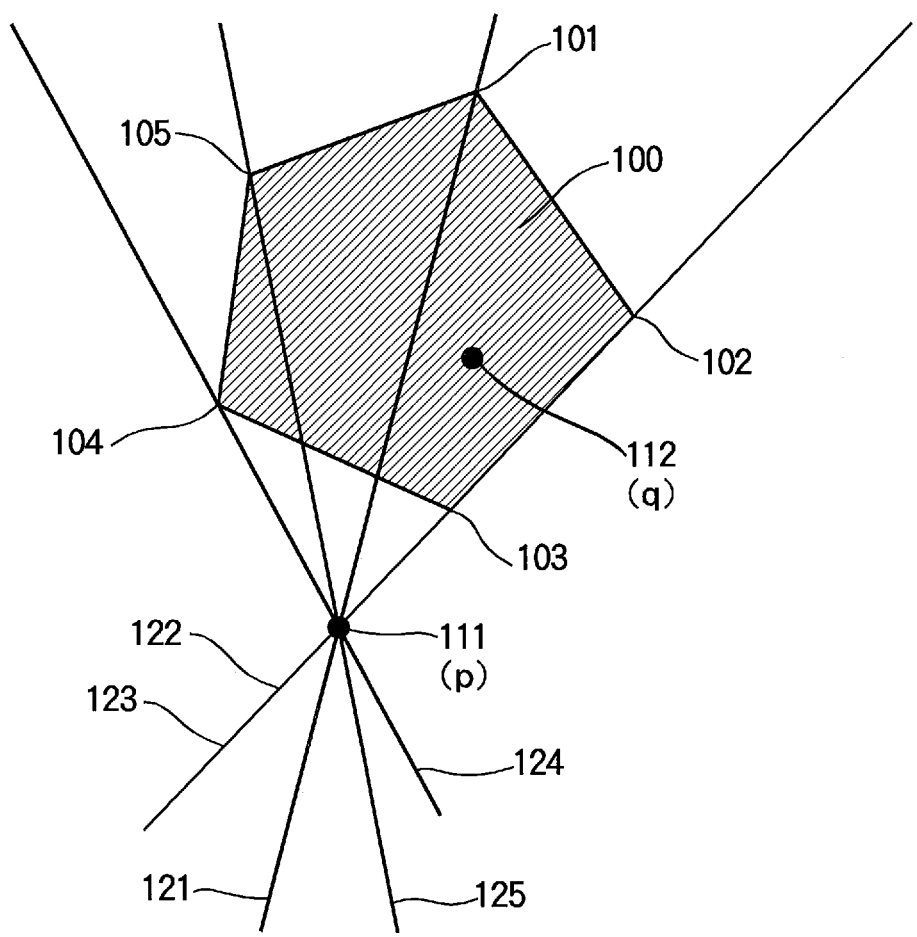
FIG. 19 is a drawing showing an exemplary area expansion in the digital broadcast reception device according to the fourth embodiment.

FIG. 19 is a drawing showing an exemplary area expansion in the digital broadcast reception device according to the fourth embodiment. The pentagonal hatched area 100 in FIG. 19 represents the unexpanded area. Point 101 indicates the first vertex of area 100; point 102 indicates the second vertex of area 100; point 103 indicates the third vertex of area 100; point 104 indicates the fourth vertex of area 100; point 105 indicates the fifth vertex of area 100. The coordinates of the k-th (k=1, 2, . . . , 5) vertex are expressed as $(x_{i,j,k}, y_{i,j,k})$. The linear expression (linear equation) representing the line connecting the k-th vertex and the (k+1)-th vertex (or, if (k+1) exceeds 5, the line connecting the k-th vertex and the first vertex) is the following expression (3).

$$c_{i,j,k}y = a_{i,j,k}x + b_{i,j,k} \tag{3}$$

The linear expressions of the area are the following expressions (4) to (8).

$$c_{i,j,1}y \leq a_{i,j,1}x + b_{i,j,1} \tag{4}$$

$$c_{i,j,2}y \geq a_{i,j,2}x + b_{i,j,2} \tag{5}$$

$$c_{i,j,3}y \geq a_{i,j,3}x + b_{i,j,3} \tag{6}$$

$$c_{i,j,4}y \leq a_{i,j,4}x + b_{i,j,4} \quad (7)$$

$$c_{i,j,5}y \leq a_{i,j,5}x + b_{i,j,5} \quad (8)$$

Point 111 indicates the current position p, and point 112 indicates another current position q. Let the coordinates of current position p be $(x_p, y_p)$ and the coordinates of current position q be $(x_q, y_q)$. Line 121 indicates a line connecting current position p and the first vertex 101; line 122 indicates a line connecting current position p and the second vertex 102; line 123 indicates a line connecting current position p and the third vertex 103; line 124 indicates a line connecting current position p and the fourth vertex 104; line 125 indicates a line connecting current position p and the fifth vertex 105. Lines 122 and 123 coincide; both are the same line. The linear expression (linear equation) representing the line connecting current position p and the k-th vertex is the following expression (9).

$$c'_{i,j,k}y = a'_{i,j,k}x + b'_{i,j,k} \quad (9)$$

The linear expressions to be added by area expansion are the following expressions (linear inequalities) (10) and (11).

$$c'_{i,j,2}y \geq a'_{i,j,2}x + b'_{i,j,2} \quad (10)$$

$$c'_{i,j,4}y \geq a'_{i,j,4}x + b'_{i,j,4} \quad (11)$$

The linear expressions to be deleted in the area expansion are the following expressions (linear inequalities) (12) and (13).

$$c_{i,j,2}y \geq a'_{i,j,2}x + b'_{i,j,2} \quad (12)$$

$$c_{i,j,3}y \geq a'_{i,j,3}x + b'_{i,j,3} \quad (13)$$

The vertex to be deleted in the area expansion is vertex 103.

Figure 20:
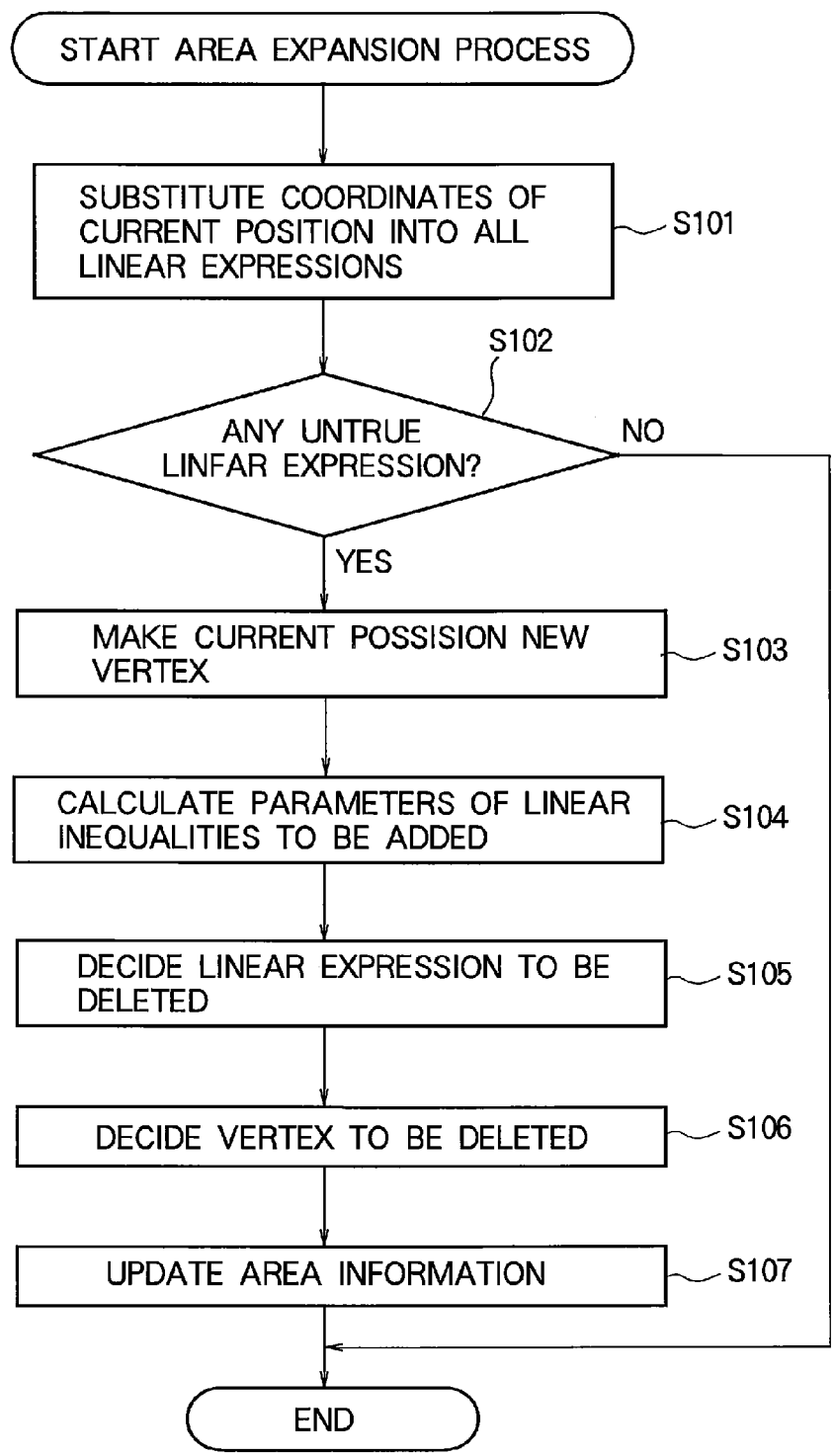
FIG. 20 is a flowchart illustrating the area map expansion process in the digital broadcast reception device according to the fourth embodiment.

FIG. 20 is a flowchart illustrating the area map expansion process in the digital broadcast reception device according to the fourth embodiment. This area map expansion process is applicable to the expansion of a broadcast area map generated area, the expansion of a receivable area, and the expansion of a broadcast area map non-generated area. First, in step S101, the broadcast area map non-generated area decision unit 30 (FIG. 1) substitutes the coordinates of the current position into all the linear expressions of the area and advances the process to step S102.

If substitution of the coordinates of the current position into any of the linear expressions makes the linear expression untrue, from step S102 the broadcast area map non-generated area decision unit 30 advances the process to step S103; if all the resulting linear expressions are true, the process ends. For example, at current position p in FIG. 19, the process proceeds to step S103 because, among the linear expressions obtained by the substitution of the coordinates $(x_p, y_p)$ of current position p into expressions (4) to (8), the following expression (14) obtained by substitution into expression (7) is untrue.

$$c_{i,j,4}y_p \leq a_{i,j,4}x_p + b'_{i,j,4} \quad (14)$$

At current position q in FIG. 19, however, all the linear expressions obtained by substitution of the coordinates $(x_q, y_q)$ of current position q into expressions (4) to (8) are true, so the process ends.

In step S103, the broadcast area map generation unit 28 (FIG. 1) treats the current position as a new vertex and advances the process to step S104.

In step S104, the broadcast area map generation unit 28 calculates the parameters of the linear expressions to be added. In FIG. 19, for example, the linear expressions to be added are the following expressions (15) and (16), $$c'_{i,j,2}y \geq a'_{i,j,2}x + b'_{i,j,2} \quad (15)$$

$$c'_{i,j,4}y \geq a'_{i,j,4}x + b'_{i,j,4} \quad (16)$$

The broadcast area map generation unit 28 determines $a'_{i,j,2}$, $b'_{i,j,2}$, $c'_{i,j,2}$, and $d'_{i,j,2}$ (the '$\geq$' inequality sign) and $a'_{i,j,4}$, $b'_{i,j,4}$, $c'_{i,j,4}$, and $d'_{i,j,4}$ (the '$\geq$' inequality sign), which are the parameters of expressions (15) and (16). The details of the process of calculating the parameters of the linear expressions to be added will be described later by use of the flowchart in FIG. 21.

In step S105, the broadcast area map generation unit 28 determines the linear expressions to be deleted. In the processing for FIG. 19, for example, the following expressions (17) and (18) (corresponding to expressions (5) and (6)) are designated for deletion.

$$c_{i,j,2}y \geq a_{i,j,2}x + b_{i,j,2} \quad (17)$$

$$c_{i,j,3}y \geq a_{i,j,3}x + b_{i,j,3} \quad (18)$$

The details of the process for determining the linear expressions to be deleted will be described later by use of the flowchart in FIG. 22.

In step S106, the broadcast area map generation unit 28 determines the vertices to be deleted. A vertex is to be deleted when both of its linear expressions are deleted. For example, points 101 and 105 in FIG. 19 are not determined to be vertices to be deleted because none of their linear expressions are deleted. As for point 102, although the following expression (17), which is one of its linear expressions, is deleted, $$c_{i,j,2}y \geq a_{i,j,2}x + b_{i,j,2} \quad (17)$$

the following expression (19), which is its other linear expression, is not deleted, $$c_{i,j,1}y \leq a_{i,j,1}x + b_{i,j,1} \quad (19)$$

so the broadcast area map generation unit 28 does not decide that point 102 is a vertex to be deleted.

The broadcast area map generation unit 28 decides that point 103 is a vertex to be deleted because both of its linear expressions, which are the following expressions (17) and (18), are deleted.

$$c_{i,j,2}y \geq a_{i,j,2}x + b_{i,j,2} \quad (17)$$

$$c_{i,j,3}y \geq a_{i,j,3}x + b_{i,j,3} \quad (18)$$

As for point 104, although the following expression (18), which is one of its linear expressions, is deleted $$c_{i,j,3}y \geq a_{i,j,3}x + b_{i,j,2} \quad (18)$$

the following expression (20), which is its other linear expression, is not deleted, $$c_{i,j,4}y \leq a_{i,j,4}x + b_{i,j,4} \quad (20)$$

so the broadcast area map generation unit 28 does not decide that point 104 is a vertex to be deleted.

In step S107, the broadcast area map generation unit 28 updates the area information and terminates the process. For example, in the example in FIG. 19, the broadcast area map generation unit 28 deletes the coordinates $(x_{i,j,3}, y_{i,j,3})$ of point 103 and adds the coordinates $(x_p, y_p)$ of point 111. The broadcast area map generation unit 28 deletes the parameters $a_{i,j,2}$, $b_{i,j,2}$, $c_{i,j,2}$, and $d_{i,j,2}$ (the '$\geq$' inequality sign) and $a_{i,j,3}$, $b_{i,j,3}$, $c_{i,j,3}$, and $d_{i,j,3}$ (the '$\geq$' inequality sign) of the following expressions (17) and (18) from the set of parameters of linear expressions of the area $$c_{i,j,2}y \geq a_{i,j,2}x + b_{i,j,2} \quad (17)$$

$$c_{i,j,3}y \geq a_{i,j,3}x + b_{i,j,3} \quad (18)$$

and adds the parameters $a'_{i,j,2}$, $b'_{i,j,2}$, $c'_{i,j,2}$, and $d'_{i,j,2}$ (the '≥' inequality sign) and $a'_{i,j,4}$, $b'_{i,j,4}$, $c'_{i,j,4}$, and $d'_{i,j,4}$ (the '≥' inequality sign) of the following expressions (21) and (22) to the set of parameters of linear expressions of the area.

$$c'_{i,j,2}y \geq a'_{i,j,2}x + b'_{i,j,2} \qquad (21)$$

$$c'_{i,j,4}y \geq a'_{i,j,4}x + b'_{i,j,4} \qquad (22)$$

Figure 21:
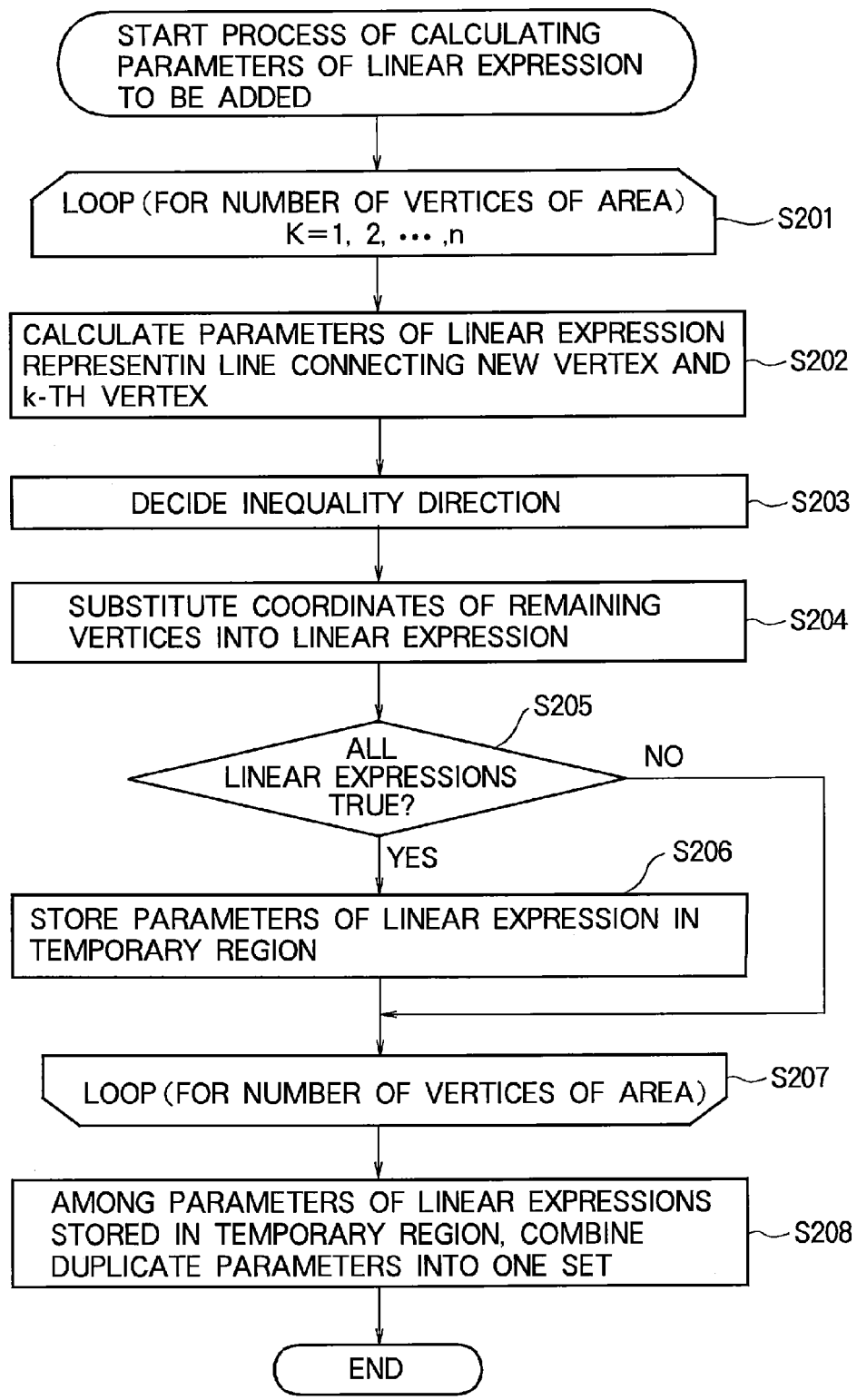
FIG. 21 is a flowchart illustrating details of the process of calculating parameters of a linear inequality to be added in step S104 in FIG. 20.

FIG. 21 is a flowchart illustrating the details of the 'calculate parameters of linear inequalities to be added' step S104 in FIG. 20. Step S201 indicates the start of a loop and step S207 indicates the end of the loop; the loop process from steps S202 to S206 is iterated a number of times equal to the number of the vertices of the area.

In step S202 the broadcast area map generation unit 28 calculates the parameters $a'_{i,j,k}$, $b'_{i,j,k}$, and $c'_{i,j,k}$ of the linear expression representing the line connecting the new vertex with the k-th vertex and advances the process to step S203.

In step S203 the broadcast area map generation unit 28 determines the direction of the inequality sign from the parameters $a'_{i,j,k}$, $b'_{i,j,k}$, and $c'_{i,j,k}$ calculated in step S202 and the coordinates of the remaining vertices, and advances the process to step S204. More specifically, when substitution of the coordinates $(x_{i,j,k+1}, y_{i,j,k+1})$ of the (k+1)-th vertex into the linear expression makes the following expression (23) true, the broadcast area map generation unit 28 determines the direction of the inequality sign to be '≤'.

$$c'_{i,j,k}y_{i,j,k+1} < a'_{i,j,k}x_{i,j,k+1} + b'_{i,j,k} \qquad (23)$$

If the following expression (24) is true, the broadcast area map generation unit 28 determines the direction of the inequality sign to be '≥'.

$$c'_{i,j,k}y_{i,j,k+1} > a'_{i,j,k}x_{i,j,k+1} + b'_{i,j,k} \qquad (24)$$

When the following expression (25) is true, $$c'_{i,j,k}y_{i,j,k+1} = a'_{i,j,k}x_{i,j,k+1} + b'_{i,j,k} \qquad (25)$$

the broadcast area map generation unit 28 executes a similar process by using the coordinates of the (k+2)-th vertex and iterates this processing until an inequality is obtained.

In step S204, the broadcast area map generation unit 28 substitutes the remaining coordinates into the linear expression the parameters of which were calculated in steps S202 and S203, and advances the process to step S205.

In step S205, if the substitutions in step S204 make all of the linear expressions true, the broadcast area map generation unit 28 advances the process to step S206; if the substitutions in step S204 make any of the linear expressions untrue, the broadcast area map generation unit 28 advances the process to step S207.

In step S206 the broadcast area map generation unit 28 stores the parameters of the linear expressions in a temporary region.

The processing in steps S202 to S206 will now be described by using the example in FIG. 19, starting with the loop for k=1. First, in step S202, the broadcast area map generation unit 28 calculates the parameters $a'_{i,j,1}$, $b'_{i,j,1}$, and $c'_{i,j,1}$ of the linear expression representing the line connecting the coordinates $(x_p, y_p)$ of point 111, which is the new vertex, and the coordinates $(x_{i,j,1}, y_{i,j,1})$ of point 101, which is the first vertex. Next, when the coordinates $(x_{i,j,2}, y_{i,j,2})$ of point 102, which is the second vertex, are substituted into the linear expression, the following expression (26) is true, so in step S203 the broadcast area map generation unit 28 determines the direction of the inequality sign to be '≤'.

$$c'_{i,j,1}y_{i,j,2} < a'_{i,j,1}x_{i,j,2} + b'_{i,j,1} \qquad (26)$$

Next, in step S204, the broadcast area map generation unit 28 substitutes the coordinates of the remaining vertices (the third, fourth, and fifth vertices) into the following linear expression (27).

$$c'_{i,j,1}y \leq a'_{i,j,1}x + b'_{i,j,1} \qquad (27)$$

Among the resulting linear expressions, the following expressions (28) and (29), which are obtained by substitution of the coordinates $(x_{i,j,4}, y_{i,j,4})$ of point 104, which is the fourth vertex and the coordinates $(x_{i,j,5}, y_{i,j,5})$ of point 105, which is the fifth vertex, are untrue.

$$c'_{i,j,1}y_{i,j,4} \leq a'_{i,j,1}x_{i,j,4} + b'_{i,j,1} \qquad (28)$$

$$c'_{i,j,1}y_{i,j,5} \leq a'_{i,j,1}x_{i,j,5} + b'_{i,j,1} \qquad (29)$$

Accordingly, the broadcast area map generation unit 28 does not store the parameters $a'_{i,j,1}$, $b'_{i,j,1}$, $c'_{i,j,1}$, and $d'_{i,j,1}$ (direction of inequality sign: ≤) in the temporary region. When similar processing is iterated for k=2, 3, 4, 5, the following expressions (30) (31) and (32) obtained in the k=2, 3, 4 loops are true, $$c_{i,j,2}y \geq a_{i,j,2}x + b_{i,j,2} \qquad (30)$$

$$c_{i,j,3}y \geq a_{i,j,3}x + b_{i,j,3} \qquad (31)$$

$$c_{i,j,4}y \geq a_{i,j,4}x + b_{i,j,4} \qquad (32)$$

so the broadcast area map generation unit 28 stores the parameters $a'_{i,j,1}$, $b'_{i,j,1}$, $c'_{i,j,1}$, and $d'_{i,j,1}$ (direction of inequality sign: ≤); $a'_{i,j,3}$, $b'_{i,j,3}$, $c'_{i,j,3}$, and $d'_{i,j,3}$ (direction of inequality sign: '≤'); $a'_{i,j,4}$, $b'_{i,j,4}$, $c'_{i,j,4}$, and $d'_{i,j,4}$ (direction of inequality sign: '≤') in the temporary region.

In step S208 the broadcast area map generation unit 28 combines duplicate sets of parameters among the parameters of the linear expressions that have been stored in the temporary region into a single set, and ends the process. For example, since the set of parameters $a'_{i,j,2}$, $b'_{i,j,2}$, $c'_{i,j,2}$, and $d'_{i,j,2}$ matches the set of parameters $a'_{i,j,3}$, $b'_{i,j,3}$, $c'_{i,j,3}$, and $d'_{i,j,3}$ the broadcast area map generation unit 28 leaves only the set of parameters $a'_{i,j,2}$, $b'_{i,j,2}$, $c'_{i,j,2}$, and $d'_{i,j,2}$ in the temporary region.

Figure 22:
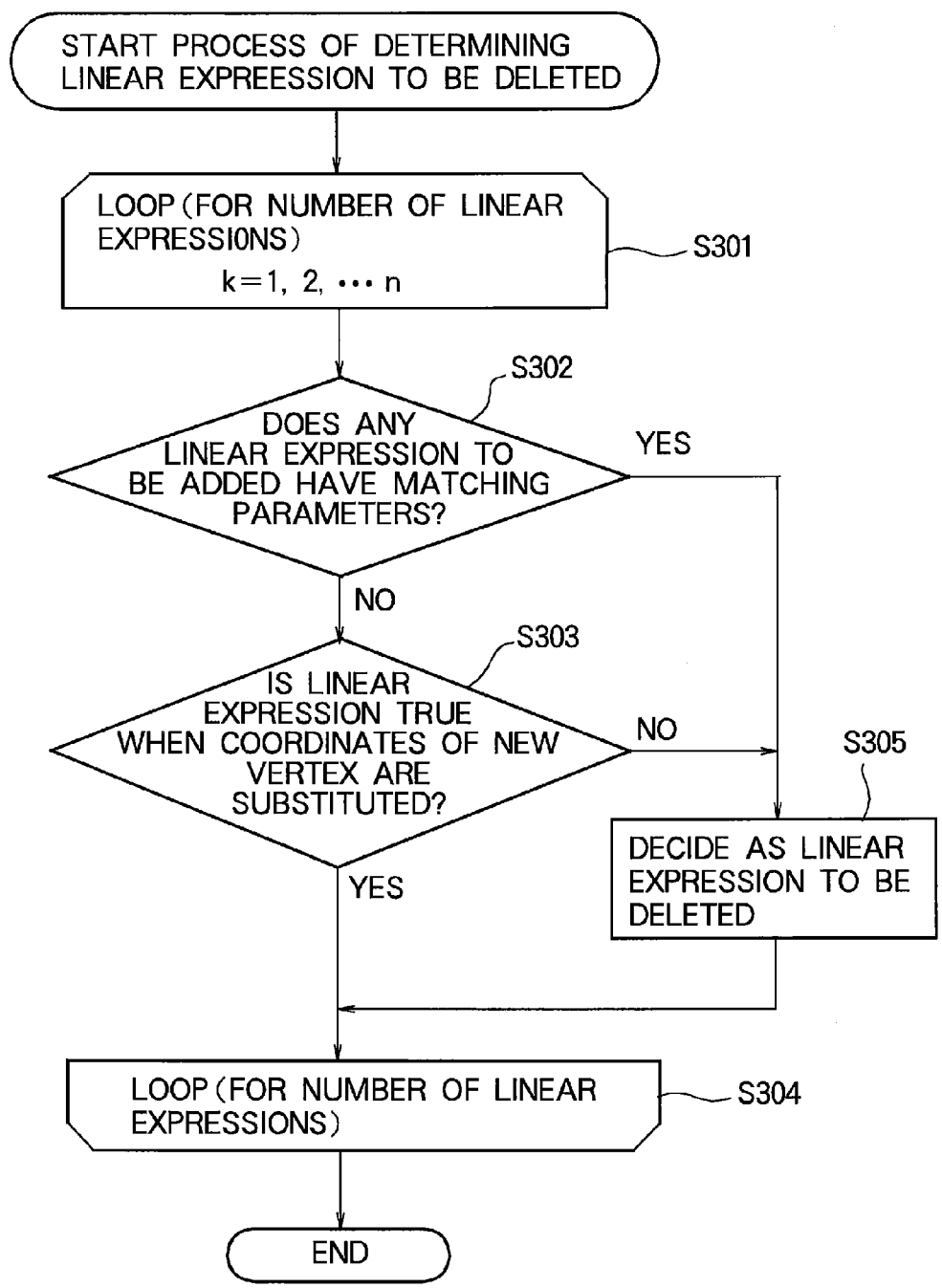
FIG. 22 is a flowchart illustrating details of the process of calculating parameters of a linear inequality to be deleted in step S105 in FIG. 20.

FIG. 22 is a flowchart illustrating details of the process of calculating the parameters of a linear inequality to be deleted in step S105 in FIG. 20. Step S301 indicates the start of a loop; step S304 indicates the end of the loop; the loop in steps S302, S303, and S305 is executed once for each linear expression representing the area.

In step S302, the broadcast area map generation unit 28 decides whether or not the parameters of the linear expression match the parameters of any of the linear expressions to be added; if so, the broadcast area map generation unit 28 advances the process to step S305; otherwise, the broadcast area map generation unit 28 advances the process to step S303. In FIG. 19, for example, since the parameters of expression (33) below, which is one of the linear expressions of the area, match the parameters of expression (34) below, which is a linear expression to be added, the broadcast area map generation unit 28 treats expression (35) below (i.e., expression (33)) as an expression to be deleted.

$$c_{i,j,2}y \geq a_{i,j,2}x + b_{i,j,2} \qquad (33)$$

$$c'_{i,j,2}y \geq a'_{i,j,2}x + b'_{i,j,2} \qquad (34)$$

$$c_{i,j,2}y \geq a_{i,j,2}x + b_{i,j,2} \qquad (35)$$

Except for the above, none of the linear expressions of the area are treated as linear expressions to be deleted in step S302.

In step S303, the broadcast area map generation unit 28 substitutes the coordinates of the new vertex into the linear expression representing the area and decides whether or not this substitution makes the linear expression true; if not, the broadcast area map generation unit 28 advances the process to step S305; if so, the broadcast area map generation unit 28 advances the process to step S304. In FIG. 19, for example, when the new coordinates $(x_p, y_p)$ of point 111 are substituted into the following expression (36) among the linear expressions of the area, $$c'_{i,j,3} y \geq a'_{i,j,3} x + b'_{i,j,3} \quad (36)$$

the linear expression (37) below that results from the substitution is not true, $$c'_{i,j,3} y_p \geq a'_{i,j,3} x_p + b'_{i,j,3} \quad (37)$$

so the broadcast area map generation unit 28 treats expression (38) below (i. e., expression (36)) as an expression to be deleted.

$$c'_{i,j,3} y \geq a'_{i,j,3} x + b'_{i,j,3} \quad (38)$$

Except for the above, none of the linear expressions of the area are treated as linear expressions to be deleted in step S303.

As described above, with the digital broadcast reception device according to the fourth embodiment, the vertices made unnecessary by area expansion and the linear expressions expressing the lines made unnecessary by area expansion are deleted, so the problem of waste of memory space by the storing of parameters of linear inequalities representing lines that are no longer required can be solved. In addition, with the digital broadcast reception device according to the fourth embodiment, since the linear expressions expressing the no longer necessary lines are deleted, when the area satisfying all the linear inequalities defining the polygonal area is determined to be the 'determined area', the range of the area can be expanded. As a result, when a point at which the broadcast wave from a certain broadcasting station A1 can be received is found, after the receivable area of the broadcast wave from broadcasting station A1 is expanded by using this point as a new vertex, if the mobile facility returns to this point again, the broadcast wave from broadcasting station A1 will be determined to be receivable and broadcasting station A1 will be treated as a broadcasting station to which a switchover can be made.

Fifth Embodiment

The digital broadcast reception devices according to the first to fourth embodiments assume that the number of vertices defining an area is three or more. When a broadcasting station having a TS name or ensemble name that is not present in the receivable area information is found, however, the only point that can be determined to be capable of receiving the broadcast wave from the broadcasting station at that time is the current position, and the digital broadcast reception devices according to the first to fourth embodiments cannot handle area information in which an area is represented by only one vertex. Accordingly, the digital broadcast reception devices according to the first to fourth embodiments cannot add new area information for the newly found broadcasting station. The digital broadcast reception device according to the fifth embodiment solves this further problem. The description of the fifth embodiments also refers to FIG. 1.

The broadcast area map generated area information and the data format of the receivable area information and non-receivable area information in the digital broadcast reception devices according to the fifth embodiment are substantially the same as the broadcast area map generated area information and the data format of the receivable area information and non-receivable area information in the digital broadcast reception devices according to the fourth embodiment. With the digital broadcast reception device according to the fifth embodiment, however, the lower limit of the number of vertices of an area is one. When an area has just one vertex, it has no linear expression. When an area has just two vertices, it has one linear expression, and the parameter $d'_{i,j,k}$ indicating the direction of the inequality sign indicates an equal sign (=) instead of an inequality sign. When an area has three or more vertices, it has the same number of linear expressions as the number of vertices and the parameter $d'_{i,j,k}$ indicating the direction of the inequality sign indicates the inequality sign '≤' or '≥'.

Figure 23:
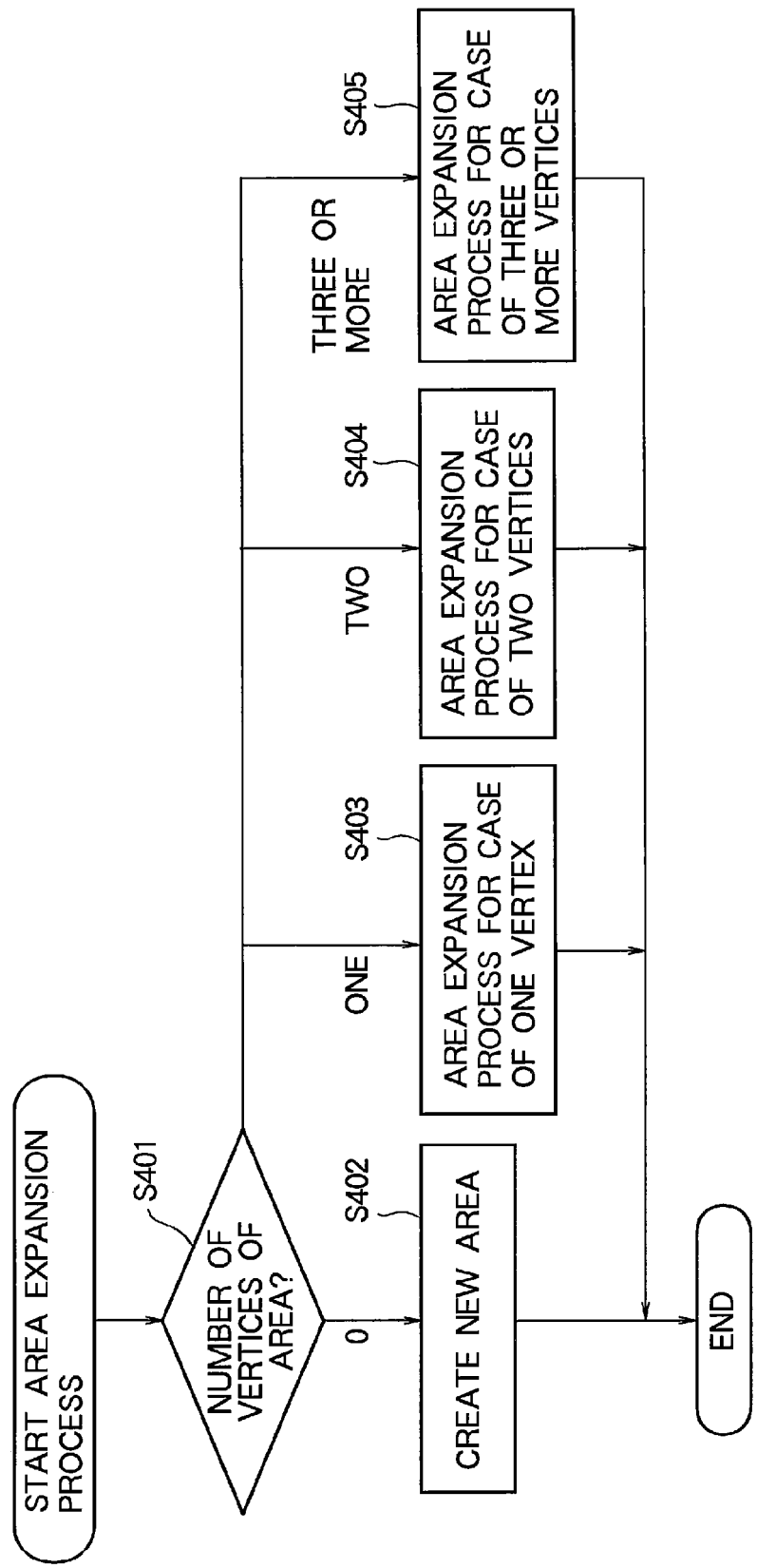
FIG. 23 is a flowchart illustrating the area map expansion process in the digital broadcast reception device according to the fifth embodiment.

FIG. 23 is a flowchart illustrating the area map expansion process in the digital broadcast reception device according to the fifth embodiment. This area map expansion process is applicable to the expansion of a broadcast area map generated area, the expansion of a receivable area, and the expansion of a non-receivable area. First, in step S401, if the number of the vertices of the area is zero, the broadcast area map generation unit 28 advances the process to step S402; if the number of the vertices is one, it advances the process to step S403; if the number of the vertices is two, it advances the process to step S404; if the number of the vertices is three or more, it advances the process to step S405.

In step 402, the broadcast area map generation unit 28 adds new area information and terminates the process. The only vertex coordinates of the area are the coordinates of the current position, and the area has no linear expression. If the area information to be updated is broadcast area map generated area information, the broadcast area map generation unit 28 inserts the current date as the date of update. If the area information to be updated is receivable area information, the broadcast area map generation unit 28 inserts the results obtained by a background channel scan as the physical CH, TS name, ensemble name, and broadcast service name. If the area information to be updated is non-receivable area information, the broadcast area map generation unit 28 inserts the information number of the receivable area to which the non-receivable area belongs.

In step S403, the broadcast area map generation unit 28 executes area expansion process for the case of one vertex, and terminates the process. Details of the area expansion process for the case of one vertex will be given later.

In step S404, the broadcast area map generation unit 28 executes area expansion process for the case of two vertices, and terminates the process. Details of the area expansion process for the case of two vertices will be given later.

In step S405, the broadcast area map generation unit 28 executes area expansion process for the case of three or more vertices, and terminates the process. The details of the area expansion process for the case of three or more vertices are as described in the flowchart in FIG. 20 for the digital broadcast reception device according to the fourth embodiment.

Figure 24:
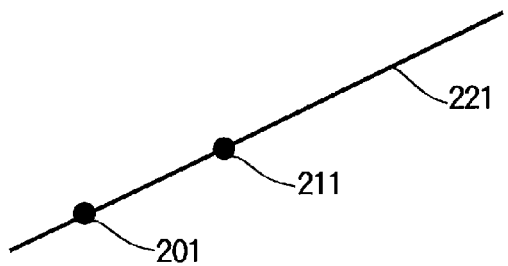
FIG. 24 is a drawing showing an exemplary area expansion when the number of vertices defining the area is one in the digital broadcast reception device according to the fifth embodiment.

FIG. 24 is a drawing showing an example of the expansion of an area having only one vertex in the digital broadcast reception device according to the fifth embodiment. In FIG. 24, point 201 indicates the single vertex of the area. Let the coordinates of the vertex of the area be $(x_{i,j,k}, y_{i,j,k})$. Point 201 indicates the area before expansion. Point 221 indicates the current position p. Let the coordinates of the current position p be $(x_p, y_p)$. Line 221 represents the line connecting the current position p and the vertex of the area. Let the linear expression representing line 221 be the following expression (39).

$$c'_{i,j,1}y = a'_{i,j,1}x + b'_{i,j,1} \qquad (39)$$

Figure 25:
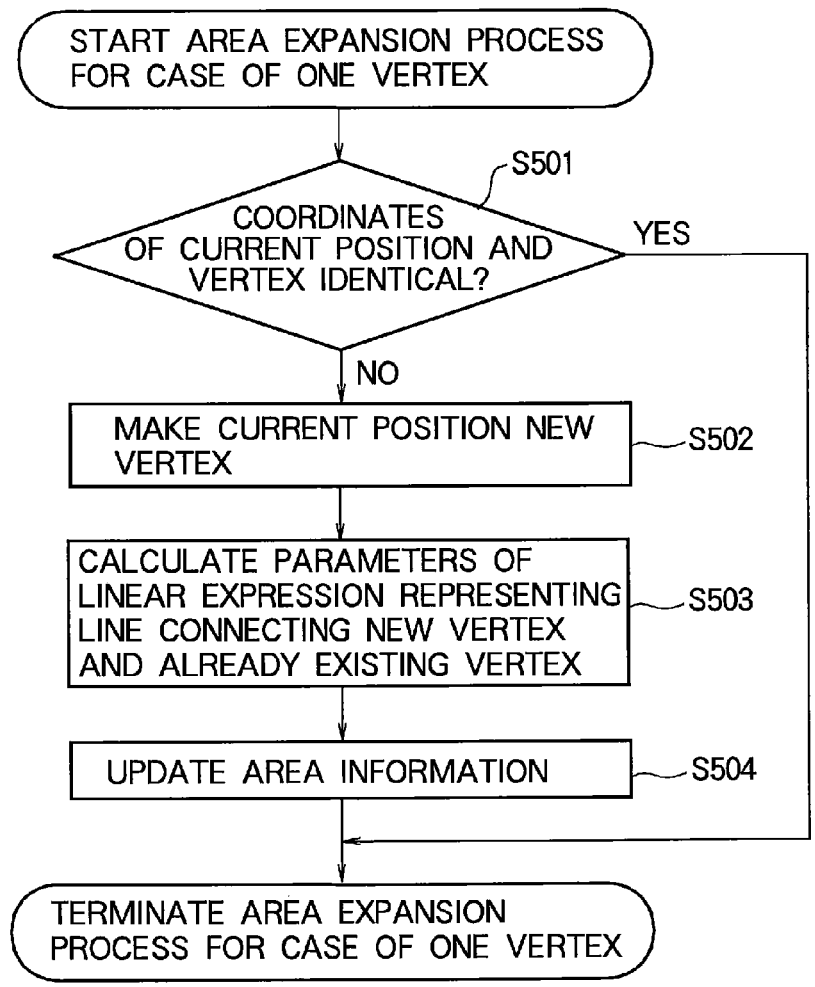
FIG. 25 is a flowchart illustrating the area map expansion process when the number of vertices is one in the digital broadcast reception device according to the fifth embodiment.

FIG. 25 is a flowchart illustrating the area map expansion process when the number of vertices is one in the digital broadcast reception device according to the fifth embodiment. First, in step S501, the broadcast area map generation unit 28 decides whether or not the coordinates of the vertex at the current position match the coordinates of the vertex of the area, terminates the process if they match, and advances the process to step S502 if they do not match. In the example in FIG. 24, the coordinates of the point 201 indicating the vertex of the area do not match the coordinates of the point 211 indicating the current position p, so the process proceeds to step S502.

In step S502, the broadcast area map generation unit 28 regards the current position as a new vertex and advances the process to step S503.

In step S503, the broadcast area map generation unit 28 calculates the parameters of the linear expression representing the line connecting the new vertex and the already existing vertex, and advances the process to step S504. In the example for FIG. 24, the broadcast area map generation unit 28 obtains the parameters $a'_{i,j,2}$, $b'_{i,j,2}$, and $c'_{i,j,2}$ of the following expression (39) representing line 221.

$$c'_{i,j,k}y = a'_{i,j,k}x + b'_{i,j,k} \qquad (39)$$

In step S504, the broadcast area map generation unit 28 adds the coordinates of the new vertex and the parameters of the linear expression representing the line connecting the new vertex and the already existing vertex, thereby updating the area information, and terminates the process.

Figure 26:
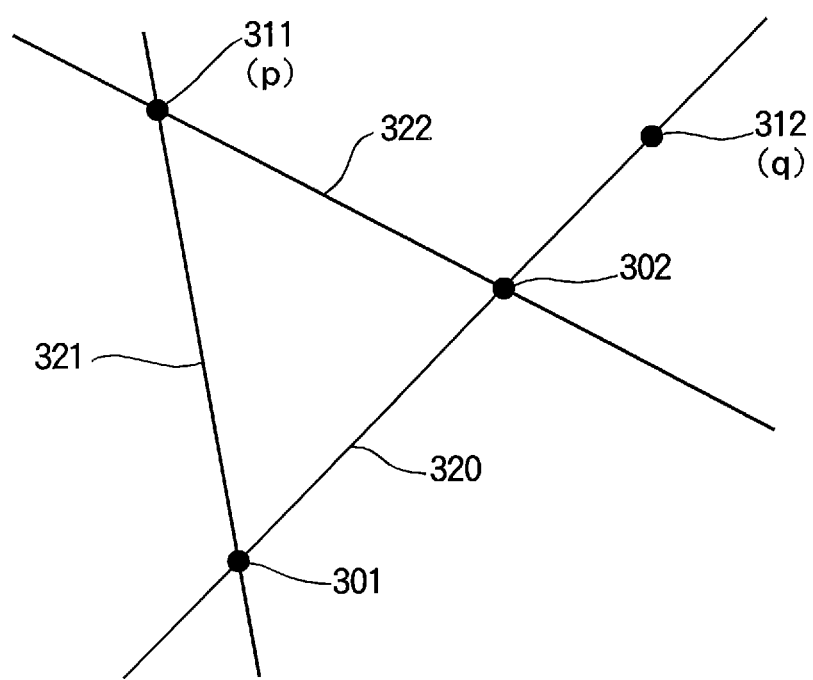
FIG. 26 is a drawing showing an example of area expansion when the number of vertices defining the area is two in the digital broadcast reception device according to the fifth embodiment.

FIG. 26 is a drawing showing an example of area expansion when the number of vertices defining the area is two in the digital broadcast reception device according to the fifth embodiment. In FIG. 26, point 301 indicates the first vertex of the area and point 302 indicates the second vertex. Let the coordinates of the k-th (k=1, 2) vertex be $(x_{i,j,k}, y_{i,j,k})$. The linear expression representing the line 320 connecting points 301 and 302 is the following expression (40).

$$c_{i,j,k}y = a_{i,j,k}x + b_{i,j,k} \qquad (40)$$

Point 311 indicates one current position p and point 312 indicates another current position q. Let the coordinates of the one current position p be $(x_p, y_p)$ and the coordinates of the other current position q be $(x_q, y_q)$. Line 321 indicates a line connecting current position p and the first vertex 301, and line 322 indicates a line connecting current position p and the second vertex 302. Let the linear expression representing the line connecting current position p and the k-th vertex be the following expression (41).

$$c'_{i,j,k}y = a'_{i,j,k}x + b'_{i,j,k} \qquad (41)$$

Let the linear expressions to be added by area expansion be the following expressions (42) and (43)

$$c'_{i,j,1}y \geq a'_{i,j,1}x + b'_{i,j,1} \qquad (42)$$

$$c'_{i,j,2}y \geq a'_{i,j,2}x + b'_{i,j,2} \qquad (43)$$

Figure 27:
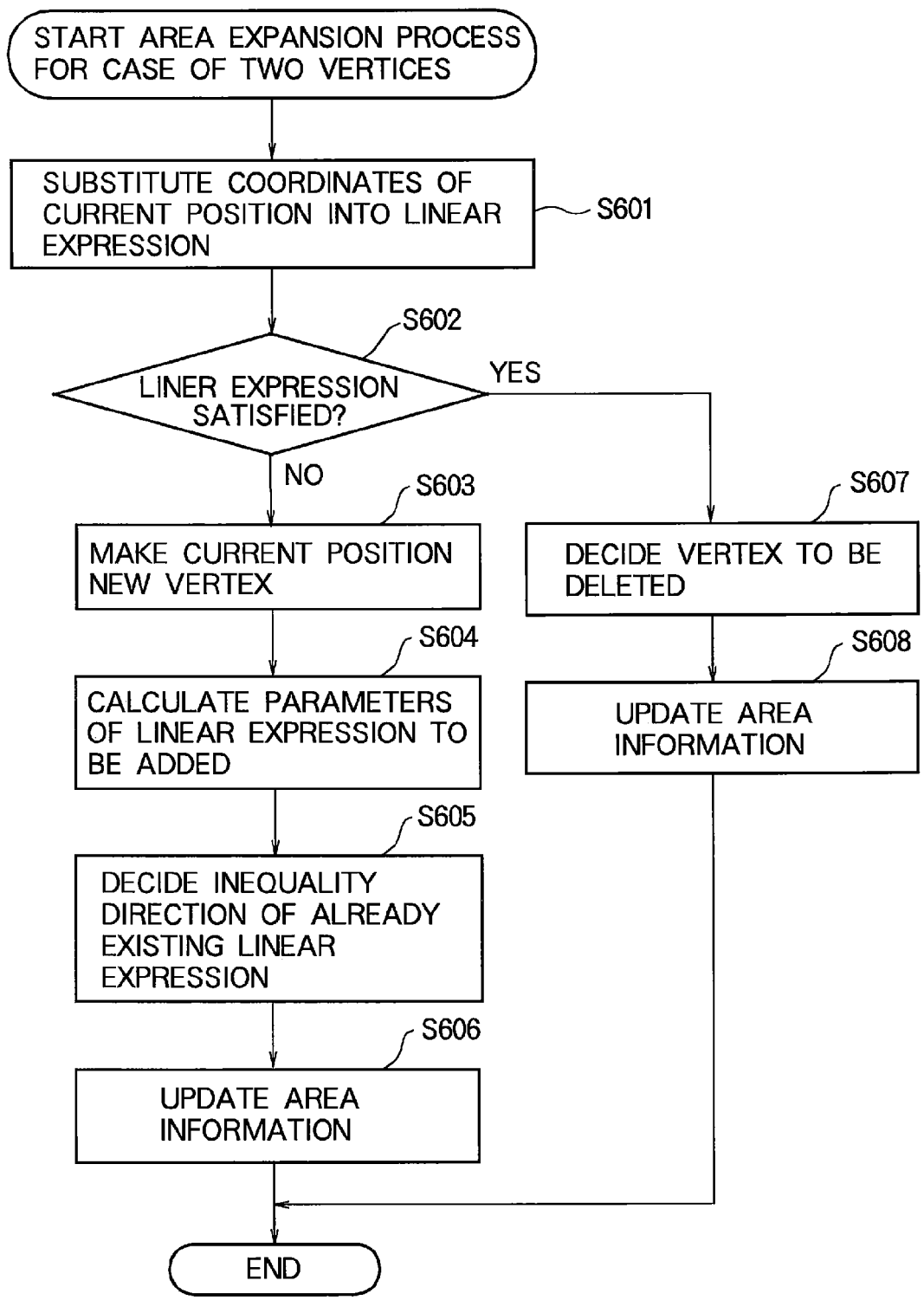
FIG. 27 is a flowchart illustrating the area map expansion process when the number of vertices is two in the digital broadcast reception device according to the fifth embodiment.

FIG. 27 is a flowchart illustrating the area map expansion process when the number of vertices is two in the digital broadcast reception device according to the fifth embodiment. First, in step S601, the broadcast area map generation unit 28 substitutes the coordinates of the current position into the linear expression representing the area and advances the process to step S602.

In step S602, if the linear expression is made true by the substitution of the coordinates of the current position, the broadcast area map generation unit 28 advances the process to step S607; otherwise, the broadcast area map generation unit 28 advances the process to step S603. For example, when the current position is point 311 in FIG. 26, the substitution of the coordinates $(x_p, y_p)$ of the current position makes the following expression (44) untrue, $$c_{i,j,1}y_p = a_{i,j,1}x_p + b_{i,j,1} \qquad (44)$$

so the broadcast area map generation unit 28 advances the process to step S603. When the current position is point 312 in FIG. 26, however, the substitution of the coordinates $(x_q, y_q)$ of the current position makes the following expression (45) true $$c_{i,j,1}y_q = a_{i,j,1}x_q + b_{i,j,1} \qquad (45)$$

so the broadcast area map generation unit 28 advances the process to step S607.

In step S603, the broadcast area map generation unit 28 regards the current position as a new vertex and advances the process to step S604.

In step S604, the broadcast area map generation unit 28 calculates the parameters of the linear expressions to be added, and advances the process to step S605. The details of the process of calculating the parameters of the linear expressions to be added are the same as in the flowchart in FIG. 21 for the digital broadcast reception device according to the fourth embodiment.

In step S605, the broadcast area map generation unit 28 substitutes the coordinates of the current position into the linear expressions of the area, thereby determining the direction of the inequality sign, and advances the process to step S606. For example, when the current position is point 311 in FIG. 26, substitution of the coordinates of point 311 into the following expression (46)

$$c_{i,j,1}y = a_{i,j,1}x + b_{i,j,1} \qquad (46)$$

yields the following expression (47)

$$c_{i,j,k}y_p > a_{i,j,k}x_p + b_{i,j,k} \qquad (47)$$

so the broadcast area map generation unit 28 changes the equal sign '=' in expression (46) to the inequality sign '≥' having the same direction as the inequality sign '>' in expression (47).

In step s606, the broadcast area map generation unit 28 adds the new vertex and terminates the process. For example, when the current position is point 311 in FIG. 26, the broadcast area map generation unit 28 adds the coordinates $(x_p, y_p)$ of point 311 as the coordinates of a new vertex. The broadcast area map generation unit 28 also adds the parameters $a'_{i,j,2}$, $b'_{i,j,2}$, $c'_{i,j,2}$, and $d'_{i,j,2}$ (direction of inequality sign: '≥'); $a'_{i,j,4}$, $b'_{i,j,4}$, $c'_{i,j,4}$, and $d'_{i,j,4}$ (direction of inequality sign: '≤') of linear expressions (48) and (49) as the parameters of the linear expressions of the area.

$$c'_{i,j,1}y \geq a'_{i,j,1}x + b'_{i,j,1} \qquad (48)$$

$$c'_{i,j,2}y \leq a'_{i,j,2}x + b'_{i,j,2} \qquad (49)$$

In addition, the broadcast area map generation unit 28 changes parameter $d_{i,j,1}$ of the existing linear expression (50) of the area from the equal sign '=' to the inequality sign '≥'.

$$c_{i,j,1}y = a_{i,j,1}x + b_{i,j,1} \qquad (50)$$

In step S607, the broadcast area map generation unit 28 determines which among the current position and the two vertices of the area is the vertex to be deleted and advances the process to step S608. The vertex to be deleted is the vertex with the second smallest x-coordinate. For example, if the current position is point 312 in FIG. 26, then among the current position 312 and the vertices of the area at point 301 and point 302, point 302 has the second smallest x-coordinate, so the broadcast area map generation unit 28 deletes point 302.

In step S608, the broadcast area map generation unit 28 updates the area information and terminates the process. For example, when the current position is point 312 in FIG. 26, the broadcast area map generation unit 28 adds point 312 as a vertex of the area and deletes point 302.

As described above, the digital broadcast reception device according to the fifth embodiment can process even areas having only one vertex.

In addition, if a broadcasting station with a TS name or ensemble name not present in the receivable area information is found, the digital broadcast reception device according to the fifth embodiment can add a new receivable area in which the broadcast wave from the broadcasting station can be received.

Sixth Embodiment

With the digital broadcast reception devices according to the first to fifth embodiments, when the range in which the same broadcast can be received on the same physical channel is separated into a plurality of ranges, these separate areas may be combined into a single range. In this case, it is possible that intermediate areas disposed between the areas in which the same broadcast can be received may be regarded as broadcast receivable areas even though they are areas in which the broadcast is not receivable. If a situation arises in which a non-receivable range is regarded as a receivable range, the digital broadcast reception device may attempt to tune automatically to a broadcast that it cannot receive. The digital broadcast reception device according to the sixth embodiment solves this further problem. The description of the sixth embodiment also refers to FIG. 1.

Figure 28:
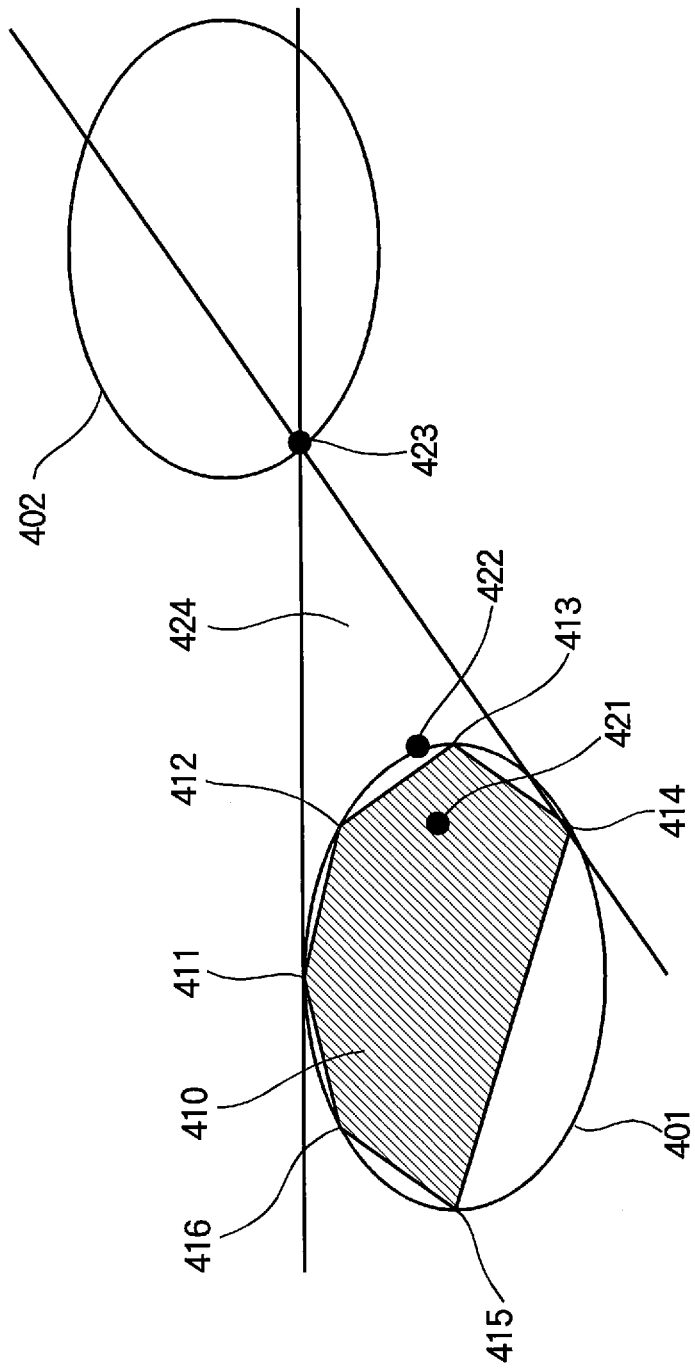
FIG. 28 is a drawing showing an example in which the digital broadcast reception devices according to the first to fifth embodiments recognize multiple separate ranges in which a broadcast is receivable as a single range.

FIG. 28 is a drawing showing an example in which the digital broadcast reception devices according to the first to fifth embodiments recognize multiple separate ranges in which a broadcast is receivable as a single range. In FIG. 28, circular areas 401 and 402 indicate ranges in which the broadcast wave from broadcast station A1 can be received. The broadcast wave from broadcast station A1 can be received on the same physical channel in both areas 401 and 402. The hatched area 410 represents a range that has been recorded as an area in which the digital broadcast reception device can receive the broadcast wave from broadcast station A1. Points 411, 412, 413, 414, 415, and 416 represent the vertices of the area recorded as the receivable area. The range recorded as the broadcast area map generated area is the same as the range recorded as the receivable area of the broadcast wave from broadcast station A1. If the mobile facility in which the digital broadcast reception device is mounted travels from point 421 through point 422 to point 423, when it reaches point 423, the digital broadcast reception device decides that the broadcast wave from broadcast station A1 can be received and expands the area in which the broadcast wave from broadcast station A1 can be received to the range surrounded by points 423, 414, 415, 416, and 411. The digital broadcast reception device thus decides that area 424 is a range in which the broadcast wave from broadcast station A1 can be received, even though the broadcast wave from broadcast station A1 cannot be received.

FIG. 29 is a drawing showing, in tabular form, an example of the broadcast area map generated area information stored in the broadcast area map storage unit in the digital broadcast reception device according to the sixth embodiment. FIG. 30 is a drawing showing, in tabular form, an example of receivable area information stored in the digital broadcast reception device according to the sixth embodiment. The broadcast area map generated area information and receivable area information are substantially the same as in the digital broadcast reception device according to the fourth embodiment, but differ from the fourth embodiment in that in-area flags are stored. The in-area flags only need to be stored in volatile memory; they need not necessarily be stored in flash memory or another type of nonvolatile memory.

Figure 31:
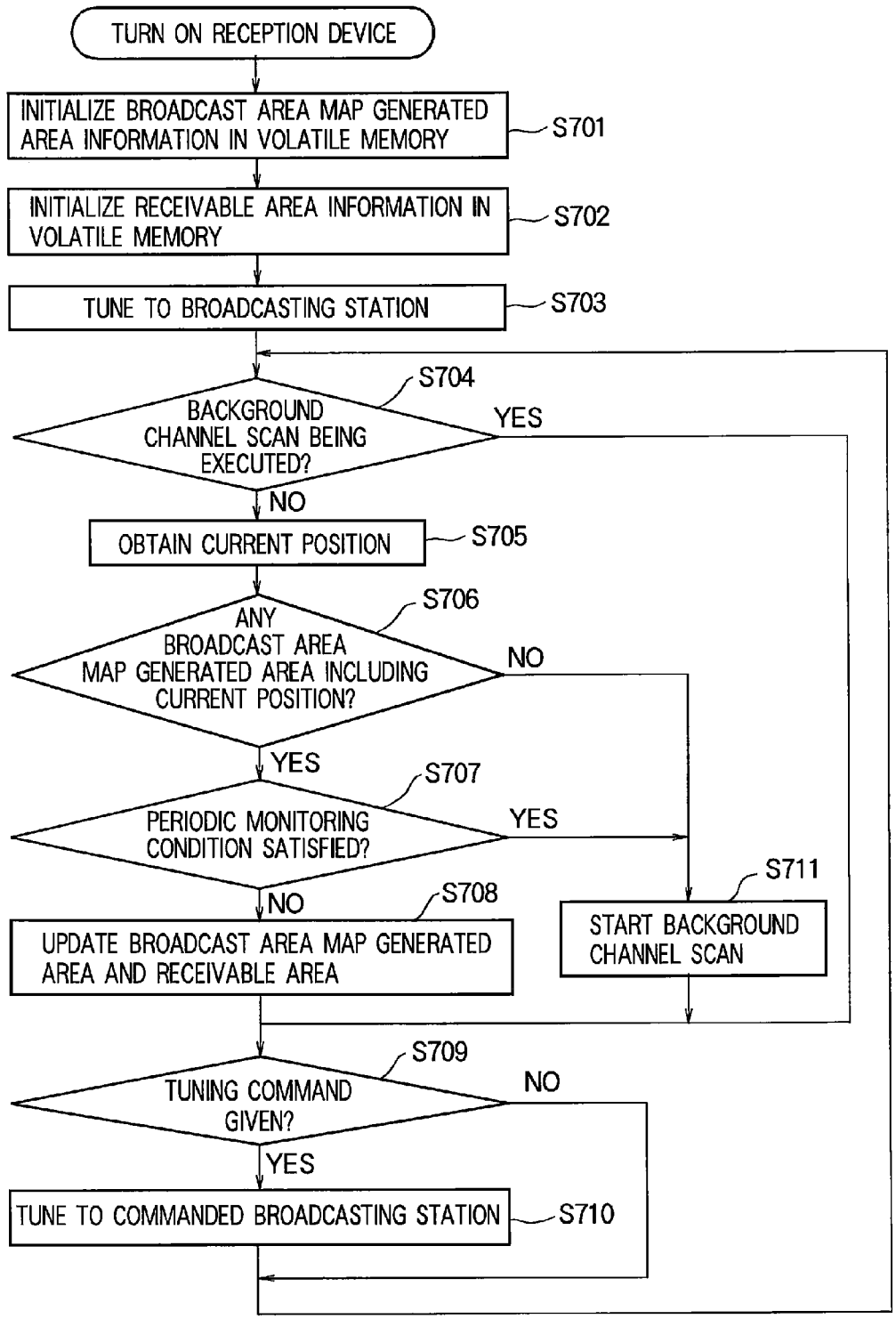

FIG. 31 is a flowchart illustrating the operation of the digital broadcast reception device according to the sixth embodiment after it is turned on. First, in step S701, the broadcast area map generation unit 28 initializes the broadcast area map generated area information in the volatile memory and advances the process to step S702. Next in step S702, the broadcast area map generation unit 28 initializes the receivable area information in the volatile memory and advances the process to step S703. The details of the processing in steps S701 and S702 will be described later.

In step S703, the broadcast area map storage unit 29 obtains information from the nonvolatile memory for tuning to the broadcasting station that was tuned in immediately before power-off, tunes to this broadcasting station, and advances the process to step S704.

In step S704, the channel scan control unit 25 checks whether or not a background channel scan is in progress; if one is in progress, the channel scan control unit 25 advances the process to step S709; otherwise it advances the process to step S705. In step S705, the current position detection unit 27 obtains the current position, and the process proceeds to step S706.

In step S706, the broadcast area map non-generated area decision unit 30 checks whether or not area information including the current position is present in the broadcast area map generated information; if such information is present, the broadcast area map non-generated area decision unit 30 advances the process to step S707; otherwise it advances the process to step S711.

In step S707, the broadcast area map non-generated area decision unit 30 checks whether or not the condition for periodic monitoring is satisfied. Whether or not the condition for periodic monitoring is satisfied is determined by comparing the date of update of the area information including the current position in the broadcast area generated area information with the current date: if the difference is more than a given interval, it is determined that the condition for periodic monitoring is satisfied. If the condition for periodic monitoring is satisfied, the process proceeds to step S711; otherwise the process proceeds to step S708.

In step S708, the broadcast area map non-generated area decision unit 30 updates the broadcast area map generated area information and receivable area information and advances the process to step S709. More specifically, the broadcast area map non-generated area decision unit 30 updates the in-area flags of area information including the current position in the broadcast area map generated area information to 'on' and updates the in-area flags of area information not including the current position to 'off'. The broadcast area map non-generated area decision unit 30 also updates the in-area flags of area information including the current position in the receivable area information to 'on', and updates the in-area flags of area information not including the current position to 'off'.

In step S709, if there is a tuning command from the user, an automatic tuning command from the tuning control unit 19, or an automatic tuning command from the broadcast area map non-generated area decision unit 30, the process proceeds to step S710; otherwise, the process proceeds to step S704.

In step S710, the broadcast signal reception unit 40 tunes to the designated broadcasting station and the process advances to step S704.

In step S711, the channel scan control unit 25 starts a background channel scan and the process advances to step S709. In the digital broadcast reception device according to the sixth embodiment, however, the process advances to step S709 immediately after the background channel scan operation is started by use of the second antenna 21, second tuner/demodulator unit 22, and second demultiplexer 23, without waiting for the background channel scan process to be completed. In other words, during a background channel scan operation, the background channel scan operation shown in FIG. 7 is executed by the second antenna 21, second tuner/demodulator unit 22, and second demultiplexer 23 while the processing from steps S701 to S710 is executed by the first antenna 11, first tuner/demodulator unit 12, and first demultiplexer 13.

Figure 32:
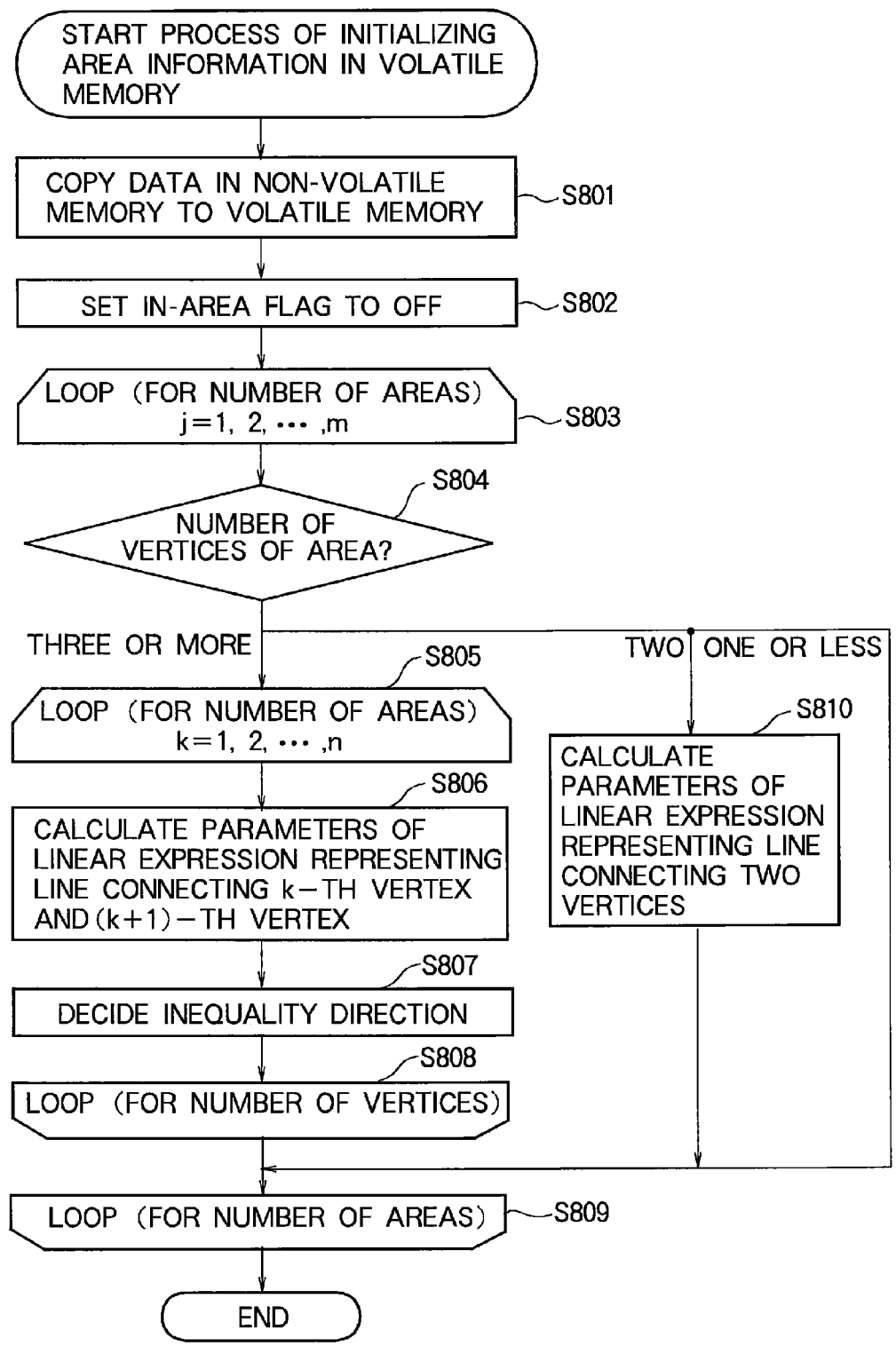
FIG. 32 is a flowchart detailing the processing in steps S701 and S702 in FIG. 31.

FIG. 32 is a flowchart detailing the processing in steps S701 and S702 in FIG. 31. First, in step S801, the broadcast area map generation unit 28 copies the area information stored in the nonvolatile memory of the broadcast area map storage unit 29 to the volatile memory and advances the process to step S802. The items of area information copied from the nonvolatile memory to the volatile memory are, for broadcast area map generated area information, the area number, the date of update, and the coordinates of the vertices of the area; for receivable area information, the items copied are the area number, the physical CH, TS name or ensemble name, the broadcast service name, and the coordinates of the vertices of the area.

In step S802, the broadcast area map generation unit 28 sets all the in-area flags of the area information to 'off', and advances the process to step S803.

Step S803 indicates the start of a loop, step S808 indicates the end of the loop, and the loop from steps S804 to S808, including step S810, is iterated a number of times equal to the number of areas.

In step S804, if the number of the vertices of the area is three or more, the broadcast area map generation unit 28 advances the process to step S805; if the number of the vertices of the area is two, the broadcast area map generation unit 28 advances the process to step S810; if the number of the vertices of the area is one or less, the broadcast area map generation unit 28 advances the process to step S809.

Step S805 indicates the start of a loop, step S808 indicates the end of the loop, and the loop (steps S806 and S807) is iterated a number of times equal to the number of the vertices of the area.

The broadcast area map generation unit 28 calculates the parameters $a_{i,j,k}$, $b_{i,j,k}$, and $c_{i,j,k}$ of the linear expression representing the line connecting the coordinates of the k-th vertex and the (k+1)-th vertex of the area and advances the process to step S807.

In step S807, the broadcast area map generation unit 28 determines the direction of the inequality sign $d_{i,j,k}$ from the parameters $a_{i,j,k}$, $b_{i,j,k}$, and $c_{i,j,k}$ calculated in step S806 and the (k+2)-th coordinates $(x_{i,j,k+2}, y_{i,j,k+2})$ of the area, and advances the process to step S808. More specifically, if the following is true $$c_{i,j,k} y_{i,j,k+2} > a_{i,j,k} x_{i,j,k+2} + b_{i,j,k} \tag{51}$$

the broadcast area map generation unit 28 sets $d_{i,j,k}$ to '≥', and if the following is true $$c_{i,j,k} y_{i,j,k+2} < a_{i,j,k} x_{i,j,k+2} + b_{i,j,k} \tag{52}$$

the broadcast area map generation unit 28 sets $d_{i,j,k}$ to '≤'.

Figure 33:
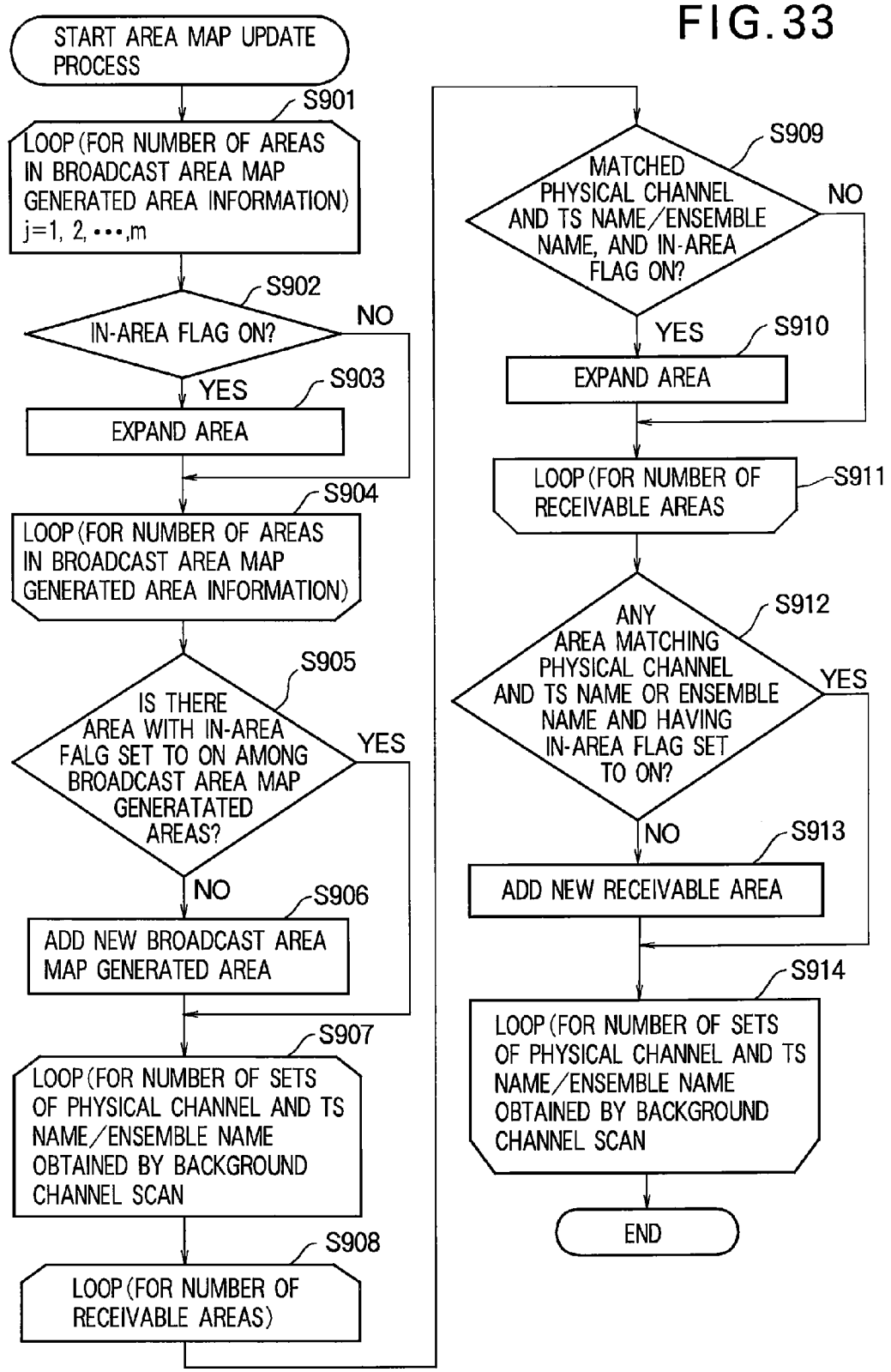
FIG. 33 is a flowchart illustrating processing in step S37 in FIG. 7.

In step S711 in FIG. 31, the background channel scan process after the background channel scan is started is substantially the same as in the flowchart in FIG. 7, except for the processing in step S37 in FIG. 7. In the digital broadcast reception device according to the sixth embodiment, the process in the flowchart shown in FIG. 33 is executed in step S37 in FIG. 7. In FIG. 33, step S901 indicates the start of a loop, step S904 indicates the end of the loop, and the loop (steps S902 and S903) is iterated a number of times equal to the number of broadcast area map generated areas present.

In step S902, the broadcast area map generation unit 28 checks whether or not the in-area flag of the j-th area of the broadcast area map generated area is 'on'; if it is 'on', the broadcast area map generation unit 28 advances the process to step S903; if it is 'off', the broadcast area map generation unit 28 advances the process to step S904.

In step S903, the broadcast area map generation unit 28 expands the j-th area of the broadcast area map generated area and advances the process to step S904. The method of expanding the area is similar to the process shown in the flowchart in FIG. 23 for the digital broadcast reception device in the fifth embodiment.

In step S905, the broadcast area map generation unit 28 checks whether or not there is an area with an in-area flag set to 'on' among the broadcast area map generated areas; if there is an 'on' area, the broadcast area map generation unit 28 advances the process to step S906; otherwise, it advances the process to step S907.

In step S906, the broadcast area map generation unit 28 generates new area information for the broadcast area map generated area and advances the process to step S907.

Step S907 indicates the start of a loop; step S914 indicates the end of the loop; the loop in steps S908 to S913 is iterated a number of times equal to the number of combinations of physical CH and TS names or ensemble names obtained by the background channel scan.

Step S908 indicates the start of a loop; step S911 indicates the end of the loop; the loop (steps S909 and S910) is iterated a number of times equal to the number of areas in the receivable area information.

In step S909, the broadcast area map generation unit 28 checks i) whether the combination of the i-th physical CH and TS name or ensemble name matches the combination of the j-th physical CH and TS name or ensemble name, obtained by the background channel scan, and ii) whether or not the in-area flag of the j-th area in the receivable area information is 'on'.

If the decision in i) above is that the combinations match and the decision in ii) above is 'on', the broadcast area map generation unit 28 advances the process to step S910; otherwise it advances the process to step S911.

In step S910, the broadcast area map generation unit 28 expands the j-th area information of the receivable area, and advances the process to step S911. The area expansion method is similar to the process shown in the flowchart in FIG. 23 for the digital broadcast reception device in the fifth embodiment.

In step S912, the broadcast area map generation unit 28 checks whether or not a combination matching the combination of the i-th physical CH and TS name or ensemble name obtained by the background channel scan is present in the receivable area information; if this combination is present, the broadcast area map generation unit 28 advances the process to step S914; if this combination is not present, the process advances to step S913.

In step S913, the broadcast area map generation unit 28 adds a new area to the receivable area information and advances the process to step S914.

With the digital broadcast reception device according to the sixth embodiment, when the digital broadcast reception device moves from point 421 to point 423 via point 422 in the example shown in FIG. 28, when it reaches point 422, where the broadcast wave from broadcasting station A1 cannot be received, the in-area flag of area 410, which is an area in which the broadcast wave from broadcasting station A1 can be received, is updated to 'off'. Accordingly, when it later moves to point 423, which is another point at which the broadcast wave from broadcasting station A1 can be received, area 410 is not expanded. This prevents the area 424 in which the broadcast wave from broadcasting station A1 cannot be received from being regarded as a receivable area.

As described above, the digital broadcast reception device according to the sixth embodiment, unlike the digital broadcast reception devices according to the first to fifth embodiments, can avoid combining a plurality of separate broadcast receivable ranges into a single range and treating a broadcast non-receivable range as a receivable range. Accordingly, the digital broadcast reception device according to the sixth embodiment does not perform automatic tuning to a broadcast that it cannot receive.

Seventh Embodiment

Figure 34:
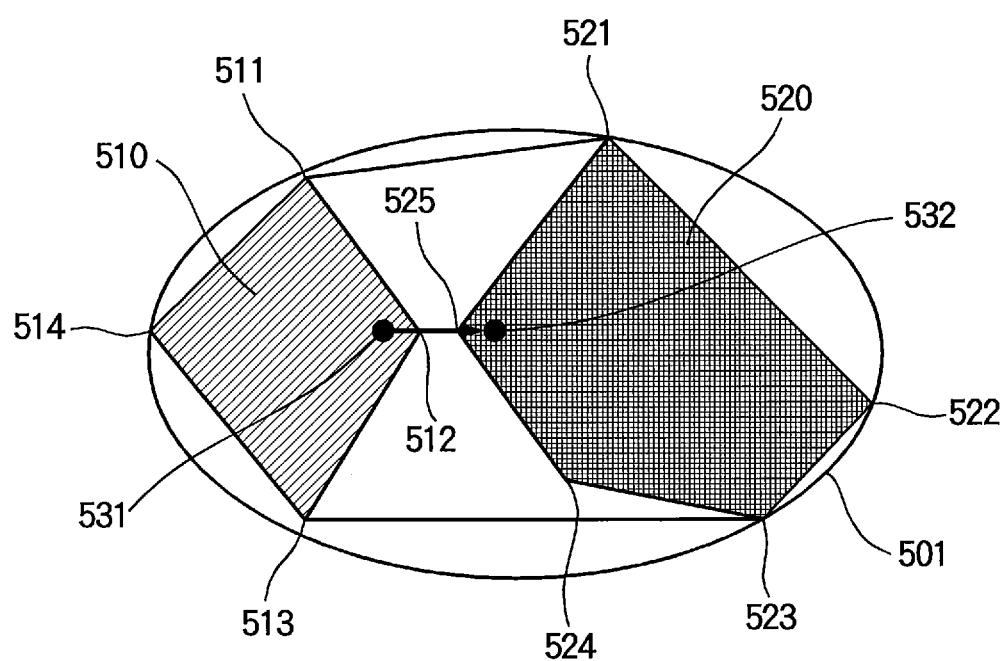
FIG. 34 is a drawing illustrating an example in which a receivable area is divided into a plurality of areas that are registered separately in the digital broadcast reception device according to the sixth embodiment.

In the digital broadcast reception device according to the sixth embodiment, there is a possibility that one receivable area may be registered as a plurality of separate receivable areas. FIG. 34 is a drawing showing an example in which a receivable area is divided into a plurality of areas that are registered separately in the digital broadcast reception device according to the sixth embodiment. In FIG. 34, the circular area 501 indicates the range in which the broadcast wave from a broadcasting station A1 can be received. In this case, first, when a mobile facility in which the digital broadcast reception device according to the sixth embodiment is mounted moves through the range surrounded by points 511, 512, 513, and 514 while tuned to broadcasting station A1, the area 510 surrounded by points 511, 512, 513, and 514 is registered as a receivable area for the broadcast wave from broadcasting station A1. The digital broadcast reception device is then turned off, moves to point 525, is turned on again at that point, and moves through the area surrounded by points 521, 522, 523, 524, and 525 while still tuned to broadcasting station A1. The area 520 surrounded by points 521, 522, 523, 524, and 525 is now registered as a receivable area of the broadcast wave from broadcasting station A1. When a plurality of receivable areas 510 and 520 are registered in this way, even if these areas are expanded thereafter and come to overlap each other, the overlapping areas are not merged, and this could increase memory usage.

The digital broadcast reception device according to the seventh embodiment merges overlapping areas, thereby reducing memory usage in comparison with the digital broadcast reception device according to the sixth embodiment. The description of the seventh embodiment also refers to FIG. 1.

The data formats of the broadcast area map generated area information, receivable area information, and non-receivable area information of the digital broadcast reception device according to the seventh embodiment are the same as the data formats of the broadcast area map generated area information, receivable area information, and non-receivable area information of the digital broadcast reception device according to the sixth embodiment. The operation of the digital broadcast reception device according to the seventh embodiment after it is turned on is substantially the same as the operation of the digital broadcast reception device according to the sixth embodiment after it is tuned on, except that step S708 in the flowchart in FIG. 31 is different. In the digital broadcast reception device according to the sixth embodiment, only the in-area flags in the broadcast area map generated area information and receivable area information are updated in step S708, but in the digital broadcast reception device according to the seventh embodiment, the operations described in the flowchart in FIG. 35 are carried out in step S708.

Figure 35:
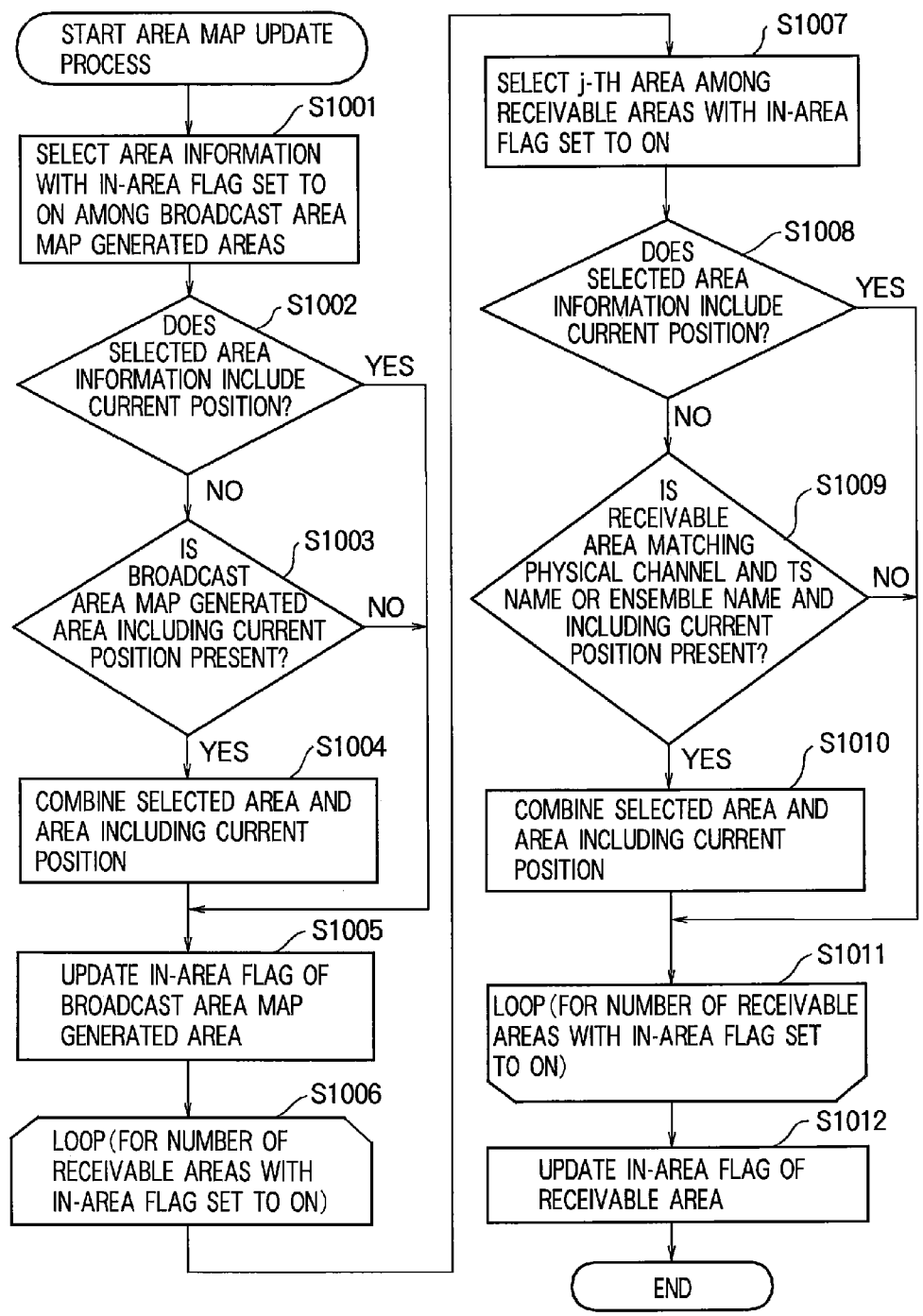
FIG. 35 is a flowchart illustrating an area information update operation in the digital broadcast reception device according to the seventh embodiment.

FIG. 35 is a flowchart illustrating an area information update operation in the digital broadcast reception device according to the seventh embodiment. First, in step S1001, the broadcast area map generation unit 28 selects area information with the in-area flag set to 'on' among the broadcast area map generated area information, and advances the process to step S1002.

In step S1002, the broadcast area map generation unit 28 checks whether or not the selected area information includes the current position; if it includes the current position, the broadcast area map generation unit 28 advances the process to step S1005; otherwise, it advances the process to step S1003.

In step S1003, the broadcast area map generation unit 28 checks whether or not a broadcast area map generated area including the current position is present; if one is present, the broadcast area map generation unit 28 advances the process to step S1004; otherwise, the broadcast area map generation unit 28 advances the process to step S1005.

In step S1004, the broadcast area map generation unit 28 merges the selected area and the area including the current position and advances the process to step S1005. The merging of the selected area and the area including the current position is achieved by expanding the selected area by use of all the vertices of the area including the current position and then deleting the area including the current position. The process of expanding the selected area by use of the vertices of the area including the current position is similar to the process shown in the flowchart in FIG. 23 illustrating the area expansion process by the digital broadcast reception device according to the fifth embodiment.

The processing in steps S1001 to S1004 will now be described by use of the example in FIG. 34. In FIG. 34, the hatched area 510 and cross-hatched area 520 are registered as broadcast area map generated areas, and it is assumed that the mobile facility in which the digital broadcast reception device is mounted is located in area 510, the in-area flag in area 510 is 'on', and the in-area flag of area 520 is 'off'. The processing of the flowchart in FIG. 35 will be assumed to start at the time when the mobile facility in which the digital broadcast reception device is mounted reaches point 532. At this time, the broadcast area map generation unit 28, in step S1001, selects area 510 as an area for which the in-area flag is set to 'on'. Next, in step S1002, the broadcast area map generation unit 28 decides that area 510 does not include the current position and advances the process to step S1003. Then in step S1003, the broadcast area map generation unit 28 selects area 520 as a broadcast area map generated area and advances the process to step S1004. In step S1004, the broadcast area map generation unit 28 merges area 510 and area 520.

In the example in FIG. 34, point 532 is added as a new vertex of area 510 and when area 510 is expanded to the area surrounded by point 511, point 532, point 513, and point 514, the expanded area partially overlaps area 520. In other words, the processing in step S1001 to step S1004 can be regarded as a process of merging mutually overlapping broadcast area map generated areas, thereby making them into one area.

In step S1005, the broadcast area map generation unit 28 updates the in-area flags of the broadcast area map generated areas and advances the process to step S1006. More specifically, the broadcast area map generation unit 28 updates the in-area flags of broadcast area map generated areas including the current position to 'on', and updates the in-area flags of broadcast area map generated areas that do not include the current position to 'off'.

Step S1006 indicates the start of a loop; step S1011 indicates the end of the loop; the loop from step S1007 to step S1010 is iterated a number of times equal to the number of receivable areas with in-area flags set to 'on'.

In step S1007, the broadcast area map generation unit 28 selects the j-th area among receivable areas with in-area flags set to 'on', and advances the process to step S1008.

In step S1008, the broadcast area map generation unit 28 checks whether or not the selected area includes the current position; if it includes the current position, the broadcast area map generation unit 28 advances the process to step S1011; if it does not include the current position, the broadcast area map generation unit 28 advances the process to step S1009.

In step S1009, the broadcast area map generation unit 28 checks whether or not there is a receivable area matching the physical CH and TS name or ensemble name of the selected area and including the current position; if such a receivable area is present, the broadcast area map generation unit 28 advances the process to step S1010; otherwise it advances the process to step S1011.

In step S1010, the broadcast area map generation unit 28 merges the selected area and the area including the current position and advances the process to step S1011. The merging method is the same as in the processing in step S1004.

The processing in step S1007 to step S1010 can be considered similar to the processing in step S1001 to step S1004 and can be regarded as a process of merging two receivable areas having overlapping parts.

In step S1012, the broadcast area map generation unit 28 updates the in-area flags of the receivable areas and terminates the process. More specifically, the broadcast area map generation unit 28 updates the in-area flags of receivable areas including the current position to 'on', and updates the in-area flags of other receivable areas to 'off'.

As described above, the digital broadcast reception device according to the seventh embodiment merges partially overlapping areas, so in comparison with the digital broadcast reception device according to the sixth embodiment, it can reduce memory usage.

Eighth Embodiment

With the digital broadcast reception devices according to the third to seventh embodiments, the number of vertices of an area can increase by repetition of the area expansion process, with a corresponding increase in memory usage.

The digital broadcast reception device according to the eighth embodiment limits the number of the vertices of an area to a certain value or less, thereby reducing memory usage in comparison with the digital broadcast reception devices according to the first to seventh embodiments. The description of the eighth embodiment also refers to FIG. 1.

The data format of the broadcast area map generated area information, receivable area information, and non-receivable area information of the digital broadcast reception device according to the eighth embodiment is the same as the data format of the broadcast area map generated area information, receivable area information, and non-receivable area information of the digital broadcast reception device according to the sixth embodiment. The operation of the digital broadcast reception device according to the eighth embodiment after it is turned on is substantially the same as the operation of the digital broadcast reception device according to the seventh embodiment after it is turned on, except that a process that limits the number of vertices of an area to N or less is performed in each update of the broadcast area map generated area information and receivable area information.

Figure 36:
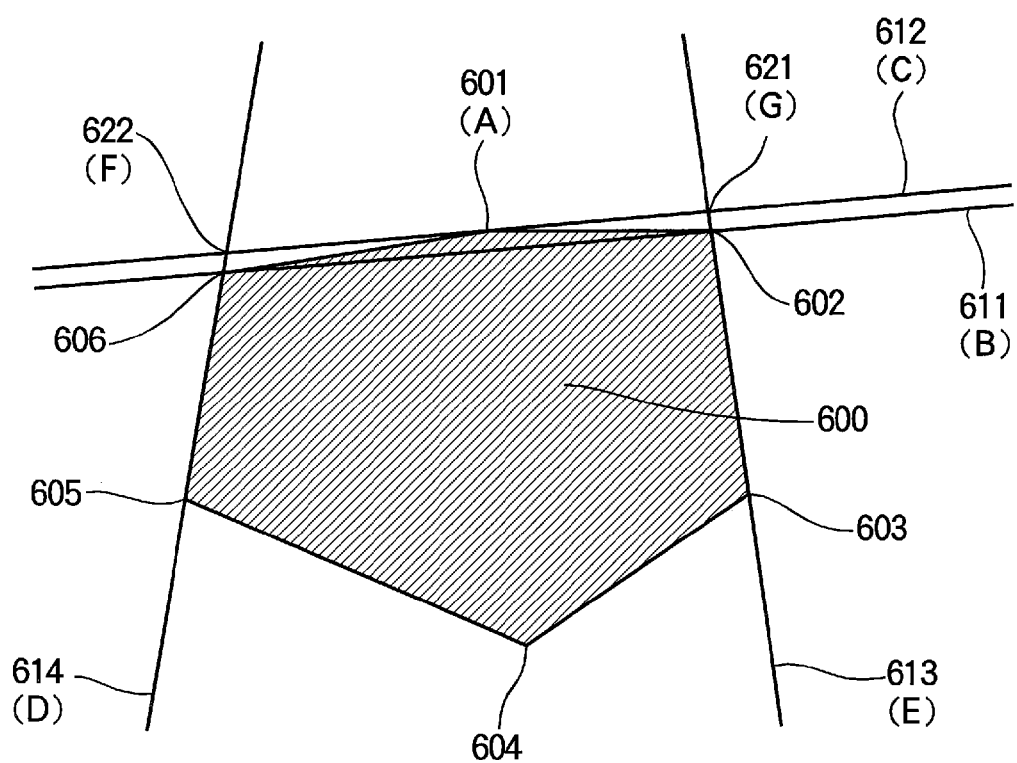
FIG. 36 is a drawing showing an example of processing for reducing the number of vertices of an area in the digital broadcast reception device according to the eighth embodiment.

FIG. 36 is a drawing showing an example of the process that reduces the number of vertices of an area in the digital broadcast reception device according to the eighth embodiment. In FIG. 36, the hatched area 600 represents the range of the area before the number of the vertices is reduced, point 601 represents the first vertex of the area, point 602 represents the second vertex of the area, point 603 represents the third vertex of the area, point 604 represents the fourth vertex of the area, point 606 represents the fifth vertex of the area, and point 606 represents the sixth vertex of the area. The coordinates of the k-th (k=1, 2, . . . , 6) vertex of the area are expressed as $(x_{i,j,k}, y_{i,j,k})$. Line 611 represents a line connecting points 602 and 606; line 612 is parallel to line 611 and represents a line passing through point 601; line 613 represents a line connecting points 602 and 603; line 614 represents a line connecting points 605 and 606. Point 621 represents the point of intersection of lines 612 and 613; point 622 represents the point of intersection of lines 612 and 614. The area surrounded by points 621, 603, 604, 606, and 622 represents the area after the number of vertices is reduced.

Figure 37:
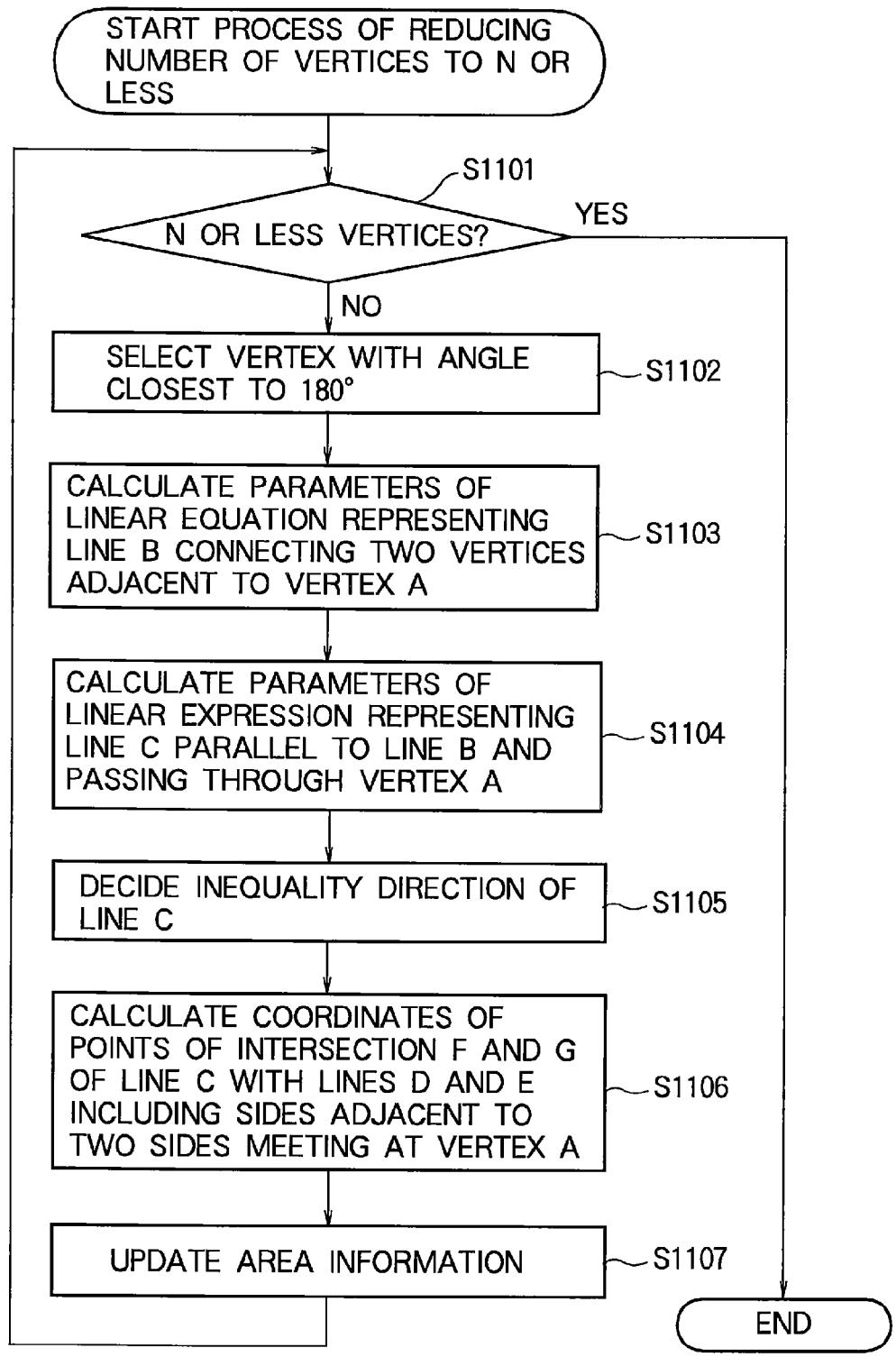
FIG. 37 is a flowchart illustrating processing for reducing the number of vertices of an area to N or less in the digital broadcast reception device according to the eighth embodiment.

FIG. 37 is a flowchart illustrating the process that reduces the number of vertices of an area to N or less in the digital broadcast reception device according to the eighth embodiment. First, in step S1101, the broadcast area map generation unit 28 checks whether the number of the vertices of the area is N or less; if it is N or less, the broadcast area map generation unit 28 terminates the process; otherwise the broadcast area map generation unit 28 advances the process to step S1102.

In step S1102, the broadcast area map generation unit 28 selects a vertex with an angle closest to 180° from among the vertices of the area and advances the process to step S1103. The vertex with an angle closest to 180° can be selected by calculating the cosine of each vertex angle as follows, where the coordinates of the k-th vertex of the area are expressed as $(x_{i,j,k}, y_{i,j,k})$, and selecting the angle with the cosine closest to −1.

$$\frac{(x_{i,j,k+1} - x_{i,j,k})(x_{i,j,k-1} - x_{i,j,k}) + (y_{i,j,k+1} - y_{i,j,k})(y_{i,j,k-1} - y_{i,j,k})}{\sqrt{(x_{i,j,k+1} - x_{i,j,k})^2 + (y_{i,j,k+1} - y_{i,j,k})^2} \sqrt{(x_{i,j,k-1} - x_{i,j,k})^2 + (y_{i,j,k-1} - y_{i,j,k})^2}} \tag{53}$$

The vertex with the angle closest to 180° will be referred to as vertex A. In the example in FIG. 36, point 601 is vertex A.

In step S1103, the broadcast area map generation unit 28 calculates parameters of a linear expression representing a line connecting the two vertices adjacent to vertex A and advances the process to step S1104. The line connecting the two vertices adjacent to vertex A will be referred to as line B. In the example in FIG. 36, line 611 is line B.

In step S1104, the broadcast area map generation unit 28 calculates parameters of a linear expression representing a line parallel to line B and passing through vertex A and advances the process to step S1105. The line parallel to line B and passing through vertex A will be referred to as line C. In the example in FIG. 36, line 612 is line C.

In step S1105, the broadcast area map generation unit 28 decides the direction ('≥' or '≤') of the inequality sign of the linear expression representing line C, and advances the process to step S1106. If the linear expression representing line C is $$c'_{i,j,k} y = a'_{i,j,k} x + b'_{i,j,k} \quad (54)$$

the direction of the inequality is decided to be '≥' when the following expression is true $$c'_{i,j,k} y_{i,j,k+1} > a'_{i,j,k} x_{i,j,k+1} + b'_{i,j,k} \quad (55)$$

and is decided to be '≤' when the following expression is true.

$$c'_{i,j,k} y_{i,j,k+1} < a'_{i,j,k} x_{i,j,k+1} + b'_{i,j,k} \quad (56)$$

In step S1106, the broadcast area map generation unit 28 calculates the coordinates of the points of intersection (referred to as intersection points F and G below) of line C with the lines (referred to as lines D and E below) including the sides adjacent to the two sides meeting at vertex A, and advances the process to step S1107. In the example in FIG. 36, lines 613 and 614 are lines D and E and points 621 and 622 are the intersection points F and G.

In step S1107, the broadcast area map generation unit 28 updates the area information and advances the process to step S1101. The update of the area information includes the addition of intersection points F and G, the deletion of vertex A and its two adjacent vertices (points 602 and 606 in FIG. 36), the addition of the linear expression representing line C, and the deletion of the linear expressions representing the two lines meeting at vertex A (the line connecting vertices 601 and 602 and the line connecting vertices 601 and 606 in FIG. 36). In the example in FIG. 36, points 621 and 622 are added as vertices of the area; points 601, 602, and 606 are deleted; the linear expression representing line 612 is added as a linear expression representing the area; the linear expression representing the line connecting points 601 and 602 and the linear expression representing the line connecting points 601 and 606 are deleted.

As described above, the digital broadcast reception device according to the eighth embodiment can reduce the number of vertices of an area to a given number or less, and accordingly can reduce memory usage in comparison with the digital broadcast reception device according to the seventh embodiment.

The configurations in the first to seventh embodiments may be combined as appropriate to provide necessary performance in the digital broadcast reception apparatus.

REFERENCE CHARACTERS

11 first antenna, 12 first tuner/demodulator unit, 13 first demultiplexer, 14 audio/video decoder, 15 graphics overlay unit, 16 video output unit, 17 audio output unit, 18 operation input unit, 19 tuning control unit, 21 second antenna, 22 second tuner/demodulator unit, 23 second demultiplexer, 24 reception mode switching unit, 25 channel scan control unit, 25a temporary storage area, 26 antenna, 27 current position detection unit, 28 broadcast area map generation unit, 29 broadcast area map storage unit, 30 broadcast area map non-generated area decision unit, 31 broadcast service list generation unit, 40 broadcast signal reception unit, 50, 60, 70 receivable areas, 51, 62 broadcast area map tables, 61, 71 non-receivable areas, 72-76 boundaries (sides) of receivable area, 80 current position at which broadcast wave from broadcasting station A1 is receivable, 81, 85 newly expanded boundaries (sides) of receivable area of broadcast wave from broadcasting station A1, 82-84 linear functions connecting current position to other vertices, 91-93 boundaries (sides) of non-receivable area, 94 slope and intercept (intersection with the Y-axis) of boundary (side) of receivable area, and inequality sign indicating whether the receivable area is above or below this side, 95 slope and intercept (intersection with the Y-axis) of boundary (side) of receivable area, and inequality sign indicating whether the receivable area is above or below this side, 96 slope and intercept (intersection with the Y-axis) of boundary (side) of non-receivable area, and inequality sign indicating whether the receivable area is above or below this side, 97 slope and intercept (intersection with the Y-axis) of boundary (side) of receivable area, and inequality sign indicating whether the receivable area is above or below this side, 101-105 vertices of receivable area.

What is claimed is:

1. A digital broadcast reception device, comprising:
   a plurality of tuner/demodulator units for tuning to physical channels and demodulating broadcast signals on the physical channels;
   a tuning control unit for controlling operation of the plurality of tuner/demodulator units;
   a current position detection unit for detecting a current position;
   a channel scan control unit that has one of the plurality of tuner/demodulator units perform tuning for program viewing or listening, and has another one of the plurality of tuner/demodulator units perform a channel scan by tuning to the physical channels sequentially and detecting receivable physical channels;
   a broadcast area map generation unit for generating or updating broadcast area maps including the receivable physical channels when the channel scan is executed, broadcast service information regarding broadcast content of the physical channels, and information of a receivable area of each of the physical channels; and
   a broadcast area map storage unit for storing the generated or updated broadcast area maps,
   wherein each said receivable area is represented as an area inside a polygon defined by vertices arranged in order, and coordinates of said vertices in an orthogonal coordinate system are stored for each said polygon in said broadcast area map storage unit,
   wherein, when the channel scan indicates that the receivable area of a particular physical channel needs to be expanded, said broadcast area map generation unit updates the receivable area information by adding to the polygon of the receivable area of the particular physical channel a new vertex corresponding to the current position when the channel scan is executed.

2. The digital broadcast reception device of claim 1, further comprising:
   a broadcast service list generation unit for generating a broadcast service list from the broadcast area maps stored in the broadcast area map storage unit and the current position detected by the current position detection unit, the broadcast service list including broadcast service information of currently receivable physical channels; and a broadcast service list display unit for displaying the broadcast service list generated by the broadcast service generation unit.

3. The digital broadcast reception device of claim 1, wherein from the broadcast area maps stored in the broadcast area map storage unit and the current position detected by the current position detection unit, the tuning control unit switches a physical channel to which the plurality of tuner/demodulator units are tuned to another physical channel.

4. The digital broadcast reception device of claim 1, wherein:
the channel scan control unit compares the results of two successive channel scans, and executes another channel scan on physical channels a reception state of which has changed by more than a prescribed reference level and physical channels having a received signal near a threshold power level; and
the broadcast area map generation unit updates the broadcast area maps stored in the broadcast area map storage unit based on most recent channel scan results.

5. The digital broadcast reception device of claim 1, wherein when the channel scan control unit decides, from a power level of the received signal in a latter of the two successive channel scans, that a broadcast signal is present on a physical channel, which the channel scan control unit decided that a broadcast service was present in a former of the two successive channel scans, the channel scan control unit decides that the same broadcast service as in the former of the two successive channel scans is present on the physical channel.

6. The digital broadcast reception device of claim 1, wherein when the channel scan control unit decides, from a power level of the received signal in a latter of the two successive channel scans, that no broadcast signal is present on a physical channel on which the channel scan control unit decided that no broadcast service was present in a former of the two successive channel scans, the channel scan control unit decides that no broadcast service is present on the physical channel.

7. The digital broadcast reception device of claim 1, wherein when the channel scan control unit decides, from a power level of the received signal in a latter of the two successive channel scans, that a broadcast signal is present on a physical channel on which the channel scan control unit decided that no broadcast service was present in a former of the two successive channel scans, the channel scan control unit executes another channel scan on the physical channel and the broadcast area map generation unit updates the broadcast area maps based on most recent channel scan results.

8. The digital broadcast reception device of claim 1, wherein the broadcast area map generation unit records vertices of polygons indicating receivable areas by their coordinates in the orthogonal coordinate system in the broadcast area map storage unit.

9. The digital broadcast reception device of claim 8, wherein the broadcast area map generation unit records vertices of polygons indicating non-receivable areas present in the receivable areas in the broadcast area map storage unit by their coordinates in the orthogonal coordinate system.

10. The digital broadcast reception device of claim 1, wherein the broadcast area map generation unit stores, in the broadcast area map storage unit, slopes of linear functions defining sides of polygons indicating the receivable areas, expressed in the orthogonal coordinate system, positions at which lines represented by the linear functions intersect a coordinate axis, and information indicating whether the receivable areas are located in a positive or negative direction on the coordinate axis with respect to the lines expressed by the linear functions.

11. The digital broadcast reception device of claim 10, wherein the broadcast area map generation unit records vertices of polygons indicating non-receivable areas present in the receivable areas in the broadcast area map storage unit by their coordinates in the orthogonal coordinate system.

12. The digital broadcast reception device of claim 10, wherein the broadcast area map generation unit stores, in the broadcast area map storage unit, slopes of linear functions defining sides of polygons indicating the non-receivable areas, expressed in the orthogonal coordinate system, positions at which lines represented by the linear functions intersect a coordinate axis, and information indicating whether the non-receivable areas are located in a positive or negative direction on the coordinate axis with respect to the lines expressed by the linear functions.

13. The digital broadcast reception device of claim 1, wherein the broadcast area map generation unit generates broadcast area map generated area information indicating areas in which broadcasting station detection processing has been executed and stores the broadcast area map generated area information in the broadcast area map storage unit.

14. The digital broadcast reception device of claim 1, further comprising:
a reception mode switching unit for switching an operating mode of the plurality of tuner/demodulator units between a first operating mode in which the plurality of tuner/demodulator units cooperatively perform diversity processing and a second operating mode in which the plurality of tuner/modulator units operate independently;
wherein a channel scan control unit has the reception mode switching unit switch the operating mode of the plurality of tuner/demodulator units to the second operating mode, has one of the plurality of tuner/demodulator units perform tuning for program viewing or listening, and has another one of the plurality of tuner/demodulator units perform a channel scan by tuning to the physical channels sequentially and detecting receivable physical channels.

15. The digital broadcast reception device of claim 14, further comprising:
a broadcast area map non-generated area decision unit for deciding, by reference to the broadcast area map generated area information stored in the broadcast area map storage unit, whether or not the current position is located in a broadcast area map non-generated area for which no area map has been generated; wherein
when the broadcast area map non-generated area decision unit decides that the current position is in the broadcast area map non-generated area, the reception mode switching unit switches the operating mode of the plurality of tuner/demodulator units to the second operating mode and the broadcast area map generation unit generates a broadcast area map and updates the broadcast area maps stored in the broadcast area map storage unit; and
when the broadcast area map non-generated area decision unit decides that the current position is in a broadcast area map generated area, the reception mode switching unit switches the operating mode of the plurality of tuner/demodulator units to the first operating mode.

16. A digital broadcast reception device, comprising:
a plurality of tuner/demodulator units for tuning to physical channels and demodulating broadcast signals on the physical channels;

a tuning control unit for controlling operation of the plurality of tuner/demodulator units;

a current position detection unit for detecting a current position;

a channel scan control unit that has one of the plurality of tuner/demodulator units perform tuning for program viewing or listening, and has another one of the plurality of tuner/demodulator units perform a channel scan by tuning to the physical channels sequentially and detecting receivable physical channels;

a broadcast area map generation unit for generating broadcast area maps including the receivable physical channels when the channel scan is executed, broadcast service information regarding broadcast content of the physical channels, and receivable area information; and a broadcast area map storage unit for storing the generated broadcast area maps, wherein each said receivable area is represented as an area inside a polygon defined by vertices arranged in order, and coordinates of said vertices in an orthogonal coordinate system are stored for each said polygon in said broadcast area map storage unit, wherein the broadcast area map generation unit stores, in the broadcast area map storage unit, slopes of linear functions defining sides of polygons indicating the receivable areas, expressed in the orthogonal coordinate system, positions at which lines represented by the linear functions intersect a coordinate axis, and information indicating whether the receivable areas are located in a positive or negative direction on the coordinate axis with respect to the lines expressed by the linear functions, wherein each side is represented by a linear function and the tuning control unit and the broadcast service list generation unit displays a list of broadcast services receivable at the current position by substituting the current coordinate values into the linear inequalities representing the sides of the polygons by which the broadcast areas are approximated and deciding that the current position is in a broadcast area if the linear inequalities of the broadcast area are all satisfied.

17. A digital broadcast reception device, comprising:

a plurality of tuner/demodulator units for tuning to physical channels and demodulating broadcast signals on the physical channels;

a tuning control unit for controlling operation of the plurality of tuner/demodulator units;

a current position detection unit for detecting a current position;

a channel scan control unit that has one of the plurality of tuner/demodulator units perform tuning for program viewing or listening, and has another one of the plurality of tuner/demodulator units perform a channel scan by tuning to the physical channels sequentially and detecting receivable physical channels;

a broadcast area map generation unit for generating broadcast area maps including the receivable physical channels when the channel scan is executed, broadcast service information regarding broadcast content of the physical channels, and receivable area information; and a broadcast area map storage unit for storing the generated broadcast area maps, wherein each said receivable area is represented as an area inside a polygon defined by vertices arranged in order, and coordinates of said vertices in an orthogonal coordinate system are stored for each said polygon in said broadcast area map storage unit, wherein the broadcast area map generation unit stores, in the broadcast area map storage unit, slopes of linear functions defining sides of polygons indicating the receivable areas, expressed in the orthogonal coordinate system, positions at which lines represented by the linear functions intersect a coordinate axis, and information indicating whether the receivable areas are located in a positive or negative direction on the coordinate axis with respect to the lines expressed by the linear functions, wherein the broadcast area map generation unit records vertices of polygons indicating non-receivable areas present in the receivable areas in the broadcast area map storage unit by their coordinates in the orthogonal coordinate system, wherein the broadcast area map non-generated area decision unit substitutes the current coordinate values into linear inequalities representing the sides of a polygon by which a broadcast area map generated area is approximated, each side being represented by a linear function, decides that the current position is not a point in the broadcast area map generated area if there is a linear inequality of the broadcast area map generated area that is not satisfied, and decides that the current position is a point in the broadcast area map generated area if all of the linear inequalities are satisfied.

18. A digital broadcast reception device, comprising:

a plurality of tuner/demodulator units for tuning to physical channels and demodulating broadcast signals on the physical channels;

a tuning control unit for controlling operation of the plurality of tuner/demodulator units;

a current position detection unit for detecting a current position;

a channel scan control unit that has one of the plurality of tuner/demodulator units perform tuning for program viewing or listening, and has another one of the plurality of tuner/demodulator units perform a channel scan by tuning to the physical channels sequentially and detecting receivable physical channels;

a broadcast area map generation unit for generating broadcast area maps including the receivable physical channels when the channel scan is executed, broadcast service information regarding broadcast content of the physical channels, and receivable area information; and a broadcast area map storage unit for storing the generated broadcast area maps, wherein each said receivable area is represented as an area inside a polygon defined by vertices arranged in order, and coordinates of said vertices in an orthogonal coordinate system are stored for each said polygon in said broadcast area map storage unit, wherein the broadcast area map generation unit records vertices of polygons indicating receivable areas by their coordinates in the orthogonal coordinate system in the broadcast area map storage unit, wherein:

the broadcast area map generation unit when updating a broadcast area map with the current position as a newly receivable position, determines a linear equation representing a line connecting two adjacent vertices of the polygon representing the receivable area, updates the broadcast area map by deleting the side through which the line represented by the linear equation passes if, as a result of substituting the coordinates of the current position into the linear equation, the linear equation is true, or as a result of substituting the coordinates of the current position into the linear equation, the linear equation is untrue and the direction of the inequality sign when the coordinates of the current position are substituted into the linear equation differs from the direction of the inequality sign when the coordinates of a vertex of the polygon other than the two adjacent vertices of the linear equation are substituted into the linear equation.

19. A digital broadcast reception device, comprising:
a plurality of tuner/demodulator units for tuning to physical channels and demodulating broadcast signals on the physical channels;
a tuning control unit for controlling operation of the plurality of tuner/demodulator units;
a current position detection unit for detecting a current position;
a channel scan control unit that has one of the plurality of tuner/demodulator units perform tuning for program viewing or listening, and has another one of the plurality of tuner/demodulator units perform a channel scan by tuning to the physical channels sequentially and detecting receivable physical channels;
a broadcast area map generation unit for generating broadcast area maps including the receivable physical channels when the channel scan is executed, broadcast service information regarding broadcast content of the physical channels, and receivable area information; and
a broadcast area map storage unit for storing the generated broadcast area maps,
wherein each said receivable area is represented as an area inside a polygon defined by vertices arranged in order, and coordinates of said vertices in an orthogonal coordinate system are stored for each said polygon in said broadcast area map storage unit,
wherein the broadcast area map generation unit records vertices of polygons indicating receivable areas by their coordinates in the orthogonal coordinate system in the broadcast area map storage unit,
wherein
when the broadcast area maps are updated with the current position as a newly receivable position, if the broadcast could not be received before moving to the current position, the broadcast area map generation unit generates a new broadcast area map instead of updating an existing broadcast area map, and
when there are a plurality of broadcast area maps with overlapping areas, identical physical channels, and identical broadcast service information, the broadcast area map generation unit combines the areas of the plurality of broadcast area maps.

20. A digital broadcast reception device, comprising:
a plurality of tuner/demodulator units for tuning to physical channels and demodulating broadcast signals on the physical channels;
a tuning control unit for controlling operation of the plurality of tuner/demodulator units;
a current position detection unit for detecting a current position;
a channel scan control unit that has one of the plurality of tuner/demodulator units perform tuning for program viewing or listening, and has another one of the plurality of tuner/demodulator units perform a channel scan by tuning to the physical channels sequentially and detecting receivable physical channels;
a broadcast area map generation unit for generating broadcast area maps including the receivable physical channels when the channel scan is executed, broadcast service information regarding broadcast content of the physical channels, and receivable area information; and
a broadcast area map storage unit for storing the generated broadcast area maps,
wherein each said receivable area is represented as an area inside a polygon defined by vertices arranged in order, and coordinates of said vertices in an orthogonal coordinate system are stored for each said polygon in said broadcast area map storage unit,
wherein the broadcast area map generation unit stores, in the broadcast area map storage unit, slopes of linear functions defining sides of polygons indicating the receivable areas, expressed in the orthogonal coordinate system, positions at which lines represented by the linear functions intersect a coordinate axis, and information indicating whether the receivable areas are located in a positive or negative direction on the coordinate axis with respect to the lines expressed by the linear functions,
wherein the broadcast area map generation unit reduces the number of vertices of the polygon representing the area of a broadcast area map by:
selecting a first vertex with an interior angle closest to 180° from the polygon representing the area of broadcast area map;
determining a linear equation representing a first line passing through the first vertex and parallel to a line passing through two vertices adjacent to the first vertex on the sides of the polygon;
determining two linear equations representing two lines passing through two sides adjacent to two sides meeting at the first vertex, the two lines being a second line and a third line;
determining coordinates of a first intersection point at which the first line and the second line intersect;
determining coordinates of a second intersection point at which the first line and the third line intersect;
deleting the first vertex and the two vertices adjacent to the first vertex on the sides of the polygon as vertices of the polygon representing the area of the broadcast area map; and
adding the first intersection point and the second intersection point.

21. A digital broadcast reception device, comprising:
a tuner/demodulator unit for tuning to physical channels and demodulating broadcast signals on the physical channels;
a tuning control unit for controlling operation of the tuner/demodulator unit; a current position detection unit for detecting a current position;
a channel scan control unit for detecting physical channels receivable by the tuner/demodulator unit; and
a broadcast area map generation unit for generating or updating broadcast area maps including the receivable physical channels, broadcast service information regarding broadcast content of the physical channels, and receivable area information of a receivable area of each of the physical channels: and
a broadcast area map storage unit for storing the generated or updated broadcast area maps,
wherein each said receivable area is represented as an area inside a polygon defined by vertices arranged in order, and coordinates of said vertices in an orthogonal coordinate system are stored for each said polygon in said broadcast area map storage unit,
wherein, when the channel scan indicates that the receivable area of a particular physical channel needs to be expanded, said broadcast area map generation unit updates the receivable area information by adding to the polygon of the receivable area of the particular physical channel a new vertex corresponding to the current position when the channel scan is executed.

22. A digital broadcast reception device, comprising:
a plurality of tuner/demodulator units for tuning to physical channels and demodulating broadcast signals on the physical channels;
a tuning control unit for controlling operation of the plurality of tuner/demodulator units;
a current position detection unit for detecting a current position;
a channel scan control unit that has one of the plurality of tuner/demodulator units perform tuning for program viewing or listening, and has another one of the plurality of tuner/demodulator units perform a channel scan by tuning to the physical channels sequentially and detecting receivable physical channels;
a broadcast area map generation unit for generating broadcast area maps including the receivable physical channels when the channel scan is executed, broadcast service information regarding broadcast content of the physical channels, and receivable area information; and
a broadcast area map storage unit for storing the generated broadcast area maps,
wherein each said receivable area is represented as an area inside a polygon defined by vertices arranged in order, and coordinates of said vertices in an orthogonal coordinate system are stored for each said polygon in said broadcast area map storage unit,
the digital broadcast reception device further comprising a broadcast area map non-generated area decision unit for deciding, by reference to the broadcast area map generated area information stored in the broadcast area map storage unit, whether or not the current position is located in a broadcast map non-generated area for which no area map has been generated,
wherein the broadcast map generation unit updates the broadcast area map by adding or deleting the vertex of said polygon of receivable area on the basis of the current position, when the broadcast area map non-generated area decision unit decides that the current position is in the broadcast area map non-generated area.

23. A digital broadcast reception device, comprising:
a tuner/demodulator unit for tuning to physical channels and demodulating broadcast signals on the physical channels;
a tuning control unit for controlling operation of the tuner/demodulator unit;
a current position detection unit for detecting a current position;
a channel scan control unit for detecting physical channels receivable by the tuner/demodulator unit; and
a broadcast area map generation unit for generating broadcast area maps including the receivable physical channels, broadcast service information regarding broadcast content of the physical channels, and receivable area information; and
a broadcast area map storage unit for storing the generated broadcast area maps,
wherein each said receivable area is represented as an area inside a polygon defined by vertices arranged in order, and coordinates of said vertices in an orthogonal coordinate system are stored for each said polygon in said broadcast area map storage unit,
the digital broadcast reception device further comprising a broadcast area map non-generated area decision unit for deciding, by reference to the broadcast area map generated area information stored in the broadcast area map storage unit, whether or not the current position is located in a broadcast map non-generated area for which no area map has been generated,
wherein the broadcast map generation unit updates the broadcast area map by adding or deleting the vertex of said polygon of receivable area on the basis of the current position, when the broadcast area map non-generated area decision unit decides that the current position is in the broadcast area map non-generated area.

* * * * *